(12) United States Patent
Kowata et al.

(10) Patent No.: US 8,012,573 B2
(45) Date of Patent: Sep. 6, 2011

(54) FIBER COMPOSITE

(75) Inventors: Sachiko Kowata, Yokohama (JP); Akira Watanabe, Yokohama (JP); Hideko Akai, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 12/809,863

(22) PCT Filed: Dec. 19, 2008

(86) PCT No.: PCT/JP2008/073241
§ 371 (c)(1),
(2), (4) Date: Jun. 21, 2010

(87) PCT Pub. No.: WO2009/081881
PCT Pub. Date: Jul. 2, 2009

(65) Prior Publication Data
US 2010/0272980 A1   Oct. 28, 2010

(30) Foreign Application Priority Data

Dec. 21, 2007  (JP) ................. 2007-330490
Dec. 25, 2007  (JP) ................. 2007-332326
May 13, 2008  (JP) ................. 2008-126172

(51) Int. Cl.
*D04H 1/00* (2006.01)

(52) U.S. Cl. .............. 428/292.1; 428/393; 264/442

(58) Field of Classification Search ............. 428/292.1, 428/393; 264/442
See application file for complete search history.

(56) References Cited

U.S. PATENT DOCUMENTS

| | | | |
|---|---|---|---|
| 4,374,702 A | 2/1983 | Turbak et al. | |
| 4,483,743 A | 11/1984 | Turbak et al. | |
| 6,103,790 A | 8/2000 | Cavaille et al. | |
| 6,117,545 A | 9/2000 | Cavaille et al. | |
| 6,267,898 B1* | 7/2001 | Fukuda et al. | 210/767 |
| 6,432,347 B1* | 8/2002 | Perez et al. | 264/444 |
| 6,468,451 B1* | 10/2002 | Perez et al. | 264/48 |
| 7,455,901 B2* | 11/2008 | Yano et al. | 428/292.1 |
| 2006/0182941 A1 | 8/2006 | Yano et al. | |
| 2009/0054552 A1 | 2/2009 | Yano et al. | |
| 2010/0272980 A1* | 10/2010 | Kowata et al. | 428/220 |

FOREIGN PATENT DOCUMENTS

| | | | |
|---|---|---|---|
| EP | 1650253 | * | 4/2006 |
| JP | 56 100801 | | 8/1981 |
| JP | 58 206601 | | 12/1983 |
| JP | 9 132601 | | 5/1997 |

(Continued)

OTHER PUBLICATIONS

Saito, Tsuguyuki et al., "Homogeneous Suspensions of Individualized Microfibrils from TEMPO-Catalyzed Oxidation of Native Cellulose", Biomacromolecules, American Chemical Society, vol. 7, No. 6, pp. 1687-1691, (May 3, 2006).

*Primary Examiner* — N. Edwards
(74) *Attorney, Agent, or Firm* — Oblon, Spivak, McClelland, Maier & Neustadt, L.L.P.

(57) ABSTRACT

To provide a cellulose fiber composite having high transparency, low water absorption and low coefficient of linear thermal expansion.
A fiber composite which comprises fibers having an average fiber diameter of at most 30 nm and a matrix material and which has a haze of at most 5 according to JIS K-7136 when the fiber composite has a thickness of 100 μm.

18 Claims, 4 Drawing Sheets

FOREIGN PATENT DOCUMENTS

| | | |
|---|---|---|
| JP | 9 509694 | 9/1997 |
| JP | 10 226702 | 8/1998 |
| JP | 11 513425 | 11/1999 |
| JP | 2002 521577 | 7/2002 |
| JP | 2005 60680 | 3/2005 |
| JP | 2006-241450 | 9/2006 |
| JP | 2006 241450 | 9/2006 |
| JP | 2006 316253 | 11/2006 |
| JP | 2006-316253 | 11/2006 |
| JP | 2007 51266 | 3/2007 |
| JP | 2008 169497 | 7/2008 |

* cited by examiner

FIBER COMPOSITE

TECHNICAL FIELD

The present invention relates to a fiber composite comprising fibers and a matrix material, and particularly, it relates to a technique to realize a fiber composite having high transparency, low water absorption and low coefficient of linear thermal expansion by employing fibers having a fiber diameter less than the wavelength of visible light.

The fiber composite of the present invention has high transparency, low water absorption and small coefficient of linear thermal expansion and is industrially useful, for example, as a substrate material for various displays, a substrate for solar cells or a window material by taking advantage of such properties.

Further, the present invention relates to a microfibrillated cellulose fiber dispersion having cellulose fibers with a microfibrillated and uniform fiber diameter uniformly dispersed so that it has a sufficient fluidity and is hardly separated even at a low viscosity, a method for microfibrillating cellulose fibers to produce such a microfibrillated cellulose fiber dispersion, and a cellulose fiber planar structure and cellulose fiber particles produced from such a microfibrillated cellulose fiber dispersion.

The present invention relates further to a polymer cellulose fiber composite obtained by combining such a cellulose fiber planar structure or cellulose fiber particles with a polymer, and a structural material, substrate, window material or vehicle body made of such a polymer cellulose fiber composite.

BACKGROUND ART

Usually, a glass plate is widely used as a substrate for displays such as liquid crystal or organic light-emitting diode. However, a glass plate has drawbacks such that its specific gravity is so large that it is difficult to reduce the weight, it is susceptible to breakage, it can hardly be bent and it is required to be thick. Accordingly, in recent years, a plastic substrate has been studied as a substitute for the glass plate. Specifically, display substrates employing e.g. polycarbonate or polyethylene terephthalate have been used.

However, such conventional plastic materials as a substitute for glass have a large coefficient of linear thermal expansion as compared with a glass plate and thus are likely to have such a problem that in a process for vapor depositing a device layer such as a thin film transistor on the substrate at a high temperature, warpage, cracking of the vapor-deposited film or semiconductor disconnection is likely to occur, and their practical use has been difficult.

That is, for such applications, a plastic material having high transparency, high heat resistance, low water absorption and low coefficient of linear thermal expansion is desired.

In recent years, composite materials employing microfibrillated fibers of cellulose such as bacteria cellulose have been actively studied. Cellulose has extended chain crystals and thus is known to exhibit low coefficient of linear thermal expansion, high modulus of elasticity and high strength. Further, it has been reported that by microfibrillating, it is possible to obtain microfibrillated and highly crystalline cellulose nanofibers having a diameter within a range of from a few nm to 200 nm and to obtain a composite having high transparency and low coefficient of linear thermal expansion by filling spaces of such fibers with a matrix material.

Patent Document 1 discloses a composite of bacteria cellulose with a photocurable resin, but by a study made by the present inventors, bacteria cellulose has an average fiber diameter of about 50 nm, i.e. the fiber diameter is large, whereby a light scattering phenomenon is likely to occur. Thus, it has been found that the haze is about 10 as measured by JIS K7136. Also disclosed is a composite comprising nanofiber cellulose fibers (hereinafter referred to simply as "NFCe") obtained from a wooden material and having a fiber diameter of less than 50 nm and a photocurable resin, but plant-derived impurities are contained in NFCe, and the composite has had a problem that it undergoes coloration when heated.

Patent Document 2 discloses a composite of chemically treated NFCe with a photocurable resin, but according to a study made of the present inventors, the porosity of NFCe is so low that at the time of combining, the matrix material is not sufficiently impregnated among fibers of nonwoven fabric, whereby there has been a problem such that the transparency of the obtainable composite material tends to be low.

Patent Document 3 discloses a composite of bacteria cellulose or cotton with a thermosetting resin. The parallel light transmittance of a material having a cellulose sheet and a resin sheet laminated and pressed as disclosed here, is 81.3% at the maximum, and although the haze of the same sample is not disclosed and is not known, when the total light transmittance of a sample having the highest light transmittance is assumed to be 88.6%, the haze is calculated to be high at a level of 8.2%.

Patent Document 4 discloses a composite of chemically modified cellulose with a cellulose ester, wherein the cellulose ester is mixed with particles of the chemically modified cellulose to obtain a composite material. However, according to a study made by the present inventors, fiberization of cellulose fibers is considered to be inadequate by high pressure homogenizer treatment as disclosed in Example 14 in Patent Document 1, grinder treatment as disclosed in Example 6 in Patent Document 2 or an ultrasonic wave method at 40 W for about 20 minutes in Example 2 in Patent Document 4. Further, after drying the cellulose fibers after microfibrillation, they are combined with acetic acid cellulose to form a composite. However, cellulose fibers once dried tend to agglomerate, and in the composite, they are dispersed as agglomerates, and it is considered that as the diameter of such agglomerates is large, the haze tends to be high.

Patent Document 5 discloses a composite material employing fine fibers of cellulose such as bacteria cellulose. Cellulose has extended chain crystals and thus is known to exhibit low coefficient of linear thermal expansion, high modulus of elasticity and high strength. Further, it has been reported that by microfibrillation, it is possible to obtain microfibrillated and highly crystalline cellulose nanofibers having a diameter within a range of from a few nm to 200 nm and to obtain a composite having high transparency and low coefficient of linear thermal expansion by filling spaces of such fibers with a matrix material.

However, bacteria cellulose has a structure wherein fibers are intricately-intertwined, since bacteria randomly move around while producing fibers. Therefore, bacteria cellulose containing water simply swells, but no fluidity will be formed. Thus, in the production of a cellulose non-woven fabric having a required size and thickness, the production efficiency tends to be poor.

Further, microfibrillated cellulose obtained by treating pulp or the like using by an attrition mill or grinder mill such as a grinder, contains thick fibers and thus had a problem such that even if spaces among such microfibrillated cellulose fibers are filled with a resin, the thick fibers scatter light, whereby no adequate transparency can be obtained.

Patent Document 6 discloses a technique wherein dried microfibrillated cellulose is immersed in water and then irradiated with ultrasonic waves of at least 10 kHz, e.g. 20 kHz, to re-disperse the cellulose. Here, referring to Patent Document 7, it is disclosed that if microfibrillated cellulose (MFC) obtained by passing through a homogenizer under high pressure is in a state suspended in water, there will be a trouble in storage or transportation, and a rotting phenomenon by microorganisms takes place, and therefore, it is required to be dried, but during the drying, MFC tends to agglomerate, and even if the dried MFC is put into water, it cannot easily be dispersed, and therefore, it is irradiated with ultrasonic waves to return it to the initial dispersed state. That is, in this Patent Document 6, ultrasonic waves, etc. are used for the purpose of re-dispersing agglomerated MFC, and it is not disclosed or suggested that microfibrillated cellulose fibers are further microfibrillated by ultrasonic waves. Further, in Example 1 in the Patent Document 6, a dispersion of cellulose after irradiated with ultrasonic waves forms precipitates by a low centrifugal force at a level of 300 rpm (15 G). Such separation by a low centrifugal force shows that cellulose fibers in the dispersion are not sufficiently and uniformly microfibrillated.

Patent Document 8 discloses a method wherein bacteria cellulose is fractured by treatment with ultrasonic waves or the like, and then the obtained aqueous dispersion is spray-dried to produce porous cellulose particles. The ultrasonic treatment in this Patent Document 8 is one for the fracturing treatment to exert a mechanical external force in order to facilitate spray drying of the aqueous dispersion of bacteria cellulose which is already in the form of fine fibers and is not one to further reduce the cellulose fiber diameter itself. Accordingly, even after the ultrasonic treatment, the dispersion is not a uniform dispersion, and the viscosity of the dispersion is high. Further, if the dispersion is diluted with water in order to lower the viscosity of the dispersion, it will be separated into water and fine gel particles.

Patent Document 9 discloses a method wherein non-wooden cellulose fibers are exposed to a high pressure after removing lignin, etc., followed by reducing the pressure to obtain fine fibers, and it is disclosed that centrifugal separation, ultrasonic waves or a pressure filtration method is employed to remove water from the dispersion of fine fibers, but there is no disclosure to obtain fine fibers by microfibrillation fibers by ultrasonic waves themselves.

Patent Document 1: JP-A-2006-241450
Patent Document 2: JP-A-2007-51266
Patent Document 3: JP-A-2006-316253
Patent Document 4: JP-A-11-513425
Patent Document 5: JP-A-2005-60680
Patent Document 6: JP-A-58-206601
Patent Document 7: JP-A-56-100801
Patent Document 8: JP-A-9-132601
Patent Document 9: JP-A-2002-521577

DISCLOSURE OF THE INVENTION

Objects to be Accomplished by the Invention

It is an object of the present invention to provide a fiber composite having a high transparency, low water absorption and low coefficient of linear thermal expansion.

Further, in order to efficiently produce a highly transparent low coefficient of linear thermal expansion composite by using cellulose fibers, a microfibrillated cellulose fiber dispersion having very fine cellulose fibers with a uniform fiber diameter uniformly dispersed and having good fluidity, i.e. a microfibrillated cellulose fiber dispersion which is not separated even at a low viscosity, is required. However, heretofore, a microfibrillated cellulose fiber dispersion which is excellent in uniform dispersibility of cellulose fibers with the fibers being sufficiently fine and uniform and which is excellent also in separation resistance at a low viscosity, has not been provided.

A further object of the present invention is to provide a microfibrillated cellulose fiber dispersion which has microfibrillated cellulose fibers with a uniform fiber diameter uniformly dispersed so that it has sufficient fluidity and which is hardly separated even at a low viscosity, a method for microfibrillating cellulose fibers to produce such a microfibrillated cellulose fiber dispersion, and a cellulose fiber planar structure and cellulose fiber particles produced from such a microfibrillated cellulose fiber dispersion.

A still further object of the present invention is to provide a polymer cellulose composite obtained by combining such a cellulose fiber planar structure or cellulose fiber particles with a polymer, and a structural material, substrate, window material or vehicle body made of such a polymer cellulose composite.

Means to Accomplish the Object

The present invention provides the following:

[1] A fiber composite which comprises fibers having an average fiber diameter of at most 30 nm and a matrix material and which has a haze of at most 5 according to JIS K 7136 when the fiber composite has a thickness of 100 μm.

[2] The fiber composite according to [1], wherein the fibers are cellulose.

[3] The fiber composite according to [1] or [2], wherein the fibers are chemically modified.

[4] The fiber composite according to any one of [1] to [3], which has a yellowness index of at most 20 according to JIS K7105 after the fiber composite having a thickness of 100 μm is heated at 190° C. under an oxygen partial pressure of at most 0.006 MPa for 1 hour.

[5] The fiber composite according to any one of [1] to [4], which has a water absorption of at most 1% according to JIS K7209 (method D) when the fiber composite has a thickness of 100 μm.

[6] The fiber composite according to any one of [1] to [5], which has a coefficient of linear thermal expansion of at least 1 ppm/K and at most 50 ppm/K.

[7] The fiber composite according to any one of [1] to [6], wherein the matrix material is a polymer material.

[8] The fiber composite according to any one of [1] to [7], which has a thickness of at least 10 μm and at most 10 cm.

[9] A process for producing the fiber composite as defined in any one of [1] to [8], which comprises a step of microfibrillating fibers by an ultrahigh-pressure homogenizer to reduce the pressure by letting the fibers jet from a pressure of at least 100 MPa and/or by ultrasonic waves having a frequency of at least 15 kHz and at most 1 MHz and an effective power density of at least 1 W/cm$^2$, to obtain fibers having an average fiber diameter of at most 30 nm, and a step of combining the fibers having an average fiber diameter of at most 30 nm and a matrix material.

[10] A substrate containing the fiber composite as defined in any one of [1] to [8].

[11] A window material containing the fiber composite as defined in any one of [1] to [8].

[12] A microfibrillated cellulose fiber dispersion which is a dispersion of fibers made of cellulose having cellulose type I crystal and having repeating units represented by the following formula (1) and/or its derivative and which is characterized in that when an acceleration of 38,900 G is exerted for 30 minutes by a centrifugal separator to such a dispersion adjusted so that its viscosity at a shear rate of 10 s$^{-1}$ as measured at 25° C. becomes to be at most 100 mPa·s, the concentration of the cellulose and/or its derivative contained in a 10% supernatant in the entire volume, is at least 50% of the concentration of the cellulose and/or its derivative in the dispersion before the dispersion is subjected to the centrifugal separator:

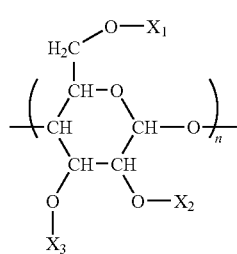

(1)

wherein each of $X_1$, $X_2$ and $X_3$ which are independent of one another, is a hydrogen atom, a $C_{1-20}$ alkylcarbonyl group, a $C_{2-6}$ alkenylcarbonyl group which may be substituted by an allyl group, an alkynylcarbonyl group, an arylcarbonyl group, a nicotinoyl group, an isonicotinoyl group or a furoyl group.

[13] A cellulose fiber planar structure which is produced from the microfibrillated cellulose fiber dispersion as defined in [12] and which has a haze of at most 50 in a thickness of 50 μm.

[14] A cellulose fiber planar structure which is produced from the microfibrillated cellulose fiber dispersion as defined in [12] and which is characterized in that it has a porosity of at least 10 vol % and at most 90 vol % and a thickness of at least 100 nm and at most 1 cm, and when it is impregnated with an oil having a refractive index of 1.52 and observed by a microscope, the volume fraction of fibers having a fiber diameter of at least 400 nm is at most 10%.

[15] Cellulose fiber particles which are produced from the microfibrillated cellulose fiber dispersion as defined in [12] and which are characterized in that they have a particle diameter of at least 1 μm and at most 1 mm, and when they are impregnated with an oil having a refractive index of 1.52 and observed by a microscope, the volume fraction of fibers having a fiber diameter of at least 400 nm is at most 10%.

[16] A polymer cellulose composite obtained by combining the cellulose fiber planar structure as defined in [13] or [14], or the cellulose fiber particles as defined in claim 15, with a polymer other than cellulose.

[17] A polymer cellulose composite obtained by laminating a layer of the cellulose fiber planar structure as defined in [13] or [14], with a planar structure layer of a polymer other than cellulose.

[18] A polymer cellulose composite comprising the cellulose fiber planar structure as defined in [13] or [14] and a polymer other than cellulose, contained in the cellulose fiber planar structure.

[19] The polymer cellulose composite according to any one of [16] to [18], having an inorganic film laminated thereon.

[20] A structural material provided with the polymer cellulose composite as defined in any one of [16] to [19].

[21] A substrate provided with the polymer cellulose composite as defined in any one of [16] to [19].

[22] A window material provided with the polymer cellulose composite as defined in any one of [16] to [19].

[23] A vehicle body provided with the polymer cellulose composite as defined in any one of [16] to [19].

[24] A method for microfibrillating cellulose fibers, which comprises irradiating a dispersion of cellulose fibers obtained from a plant-derived material and having an average minimum length of at least 10 μm and an average maximum length of at most 10 cm, with ultrasonic waves having a frequency of at least 15 kHz and at most 1 MHz and an effective power density of at least 1 W/cm$^2$, to obtain a dispersion of microfibrillated cellulose fibers having an average fiber diameter of at most 100 nm.

[25] The method for microfibrillating cellulose fibers according to [24], which includes a step of microfibrillating treatment before the irradiation with the ultrasonic waves.

[26] The method for microfibrillating cellulose fibers according to [25], wherein the step of microfibrillating treatment is a step of reducing the pressure by letting a dispersion of the material jet from a high pressure atmosphere of at least 30 MPa.

[27] The method for microfibrillating cellulose fibers according to any one of [24] to [26], which includes a step of chemically modifying the material.

Advantageous Effects of the Invention

According to the present invention, a fiber composite having high transparency, low water absorption and low coefficient of linear thermal expansion can be provided. The fiber composite of the present invention is useful as a plastic material to be substituted for glass in various industrial fields, and it is particularly useful as a substrate material for various displays, a substrate for solar cells, a window material, etc. by taking advantage of its excellent properties such as the high transparency, low water absorption and low coefficient of linear thermal expansion.

The microfibrillated cellulose fiber dispersion of the present invention contains cellulose fibers with a fine fiber diameter of nano size in a large amount and contains substantially no cellulose fibers with a fiber diameter of at least the wavelength of visible light, and it is one wherein only very fine cellulose fibers are uniformly dispersed and is a dispersion which is hardly separated even at a low viscosity and which is excellent in fluidity and is capable of maintaining the uniformly dispersed state of fibers constantly.

By such a microfibrillated cellulose fiber dispersion of the present invention, it is possible to produce a cellulose fiber planar structure and cellulose fiber particles made of homogeneous microfibrillated cellulose fibers. Further, by using such a cellulose fiber planar structure or cellulose fiber particles, it is possible to obtain a polymer cellulose composite having high transparency, small coefficient of linear thermal expansion, high modulus of elasticity and excellent surface state such as surface smoothness.

The polymer cellulose composite of the present invention obtained by combining such a cellulose fiber planar structure or cellulose fiber particles of the present invention with a polymer, is useful as a substrate material for various displays, a substrate for solar cells, a window material, etc., by taking advantage of its properties such as the high transparency and low coefficient of linear thermal expansion, and useful also for various structural materials, particularly for automobile panels excellent in the surface ornamental design or external wall panels for buildings by taking advantage of its properties such as the high modulus of elasticity, low coefficient of linear thermal expansion and surface smoothness.

BEST MODE FOR CARRYING OUT THE INVENTION

Figure 1:
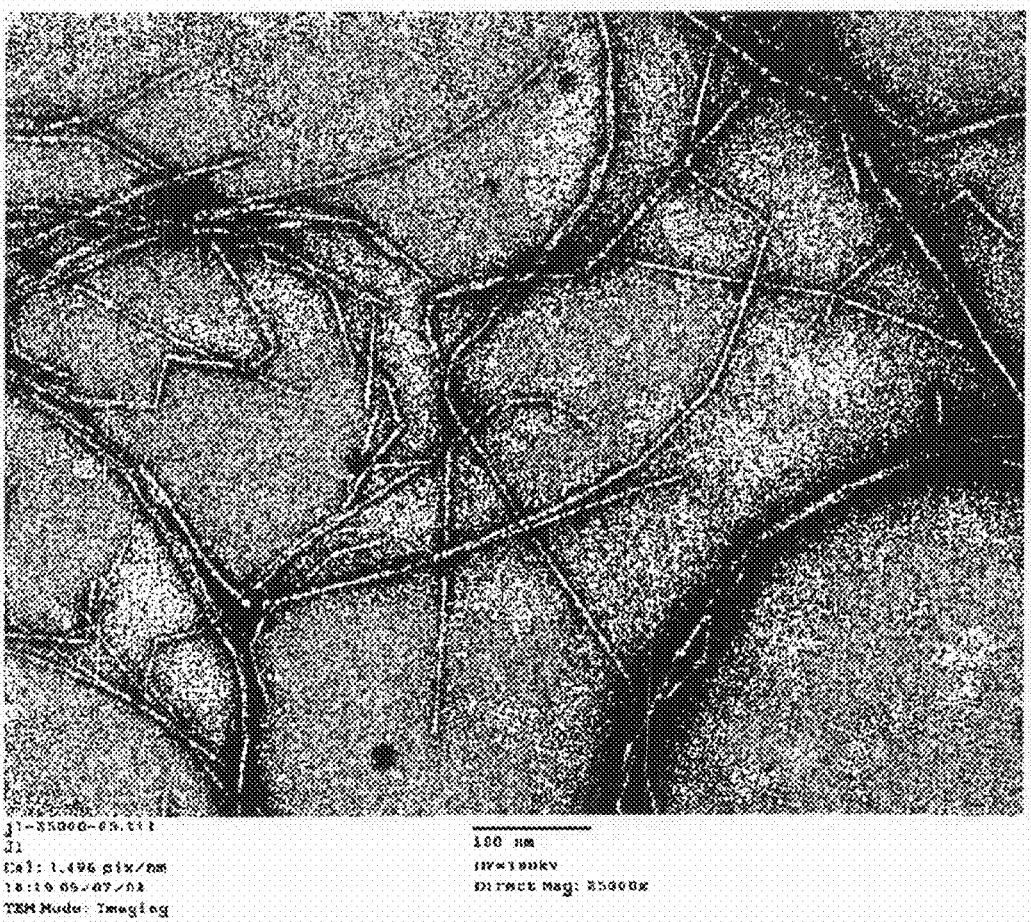
FIG. 1 is a TEM photograph (25,000 magnifications) of the cellulose dispersion treated with ultrasonic waves in Example 6.

Now, practical embodiments of the present invention will be specifically described, but it should be understood that the present invention is by no means restricted to the following practical embodiments and may be worked in various modifications within its scope.

[Fibers]

The fibers to be used in the present invention may, for example, be natural fibers, synthetic fibers or inorganic fibers. The natural fibers may, for example, be cellulose derivatives such as cellulose fibers produced by plants, sea squirt or bacteria, or acetic acid cellulose, chitin derivatives such as chitin or chitosan contained in Crustacea such as shrimps or crabs, protein fibers such as hair, wool, silk or spider silk, nucleic acids such as DNA, or natural rubber fibers such as polyisoprene. The synthetic fibers may be various polymer fibers including, for example, addition polymerization type polymer fibers such as polystyrene, polyacrylonitrile or polymethyl methacrylate, polyamide fibers such as nylon, polyester fibers such as polyethylene terephthalate or polyethylene naphthalate, polyurethane fibers, phenol resin fibers, melamine resin fibers, polyimide fibers or aramid fibers. The inorganic fibers may, for example, be glass fibers, metal oxides of e.g. aluminum, magnesium, calcium or titanium, pure metals or alloys, needle crystals of a compound containing a metal, carbon nanotubes or carbon fibers. Among them, cellulose fibers have a crystal diameter at a level of a few nm and thus are preferably employed.

<Cellulose Type I Crystal>

The cellulose fibers of the present invention are preferably ones having a cellulose type I crystal structure.

The cellulose type I crystal structure is one disclosed, for example, in "Dictionary of Cellulose", published by Asakura Publishing Co., Ltd., New Edition, First Print, p. 81-p. 86 or p. 93-p. 99, and most natural celluloses have a cellulose type I crystal structure. Whereas, cellulose fibers having a structure other than the cellulose type I crystal structure, such as cellulose type II, III and IV structures, are ones derived from cellulose having a cellulose type I crystal structure.

The type I crystal structure of cellulose fibers can be identified by typical peaks at two positions in the vicinity of $2\theta=14\text{-}17°$ and in the vicinity of $2\theta=22\text{-}23°$ in the diffraction profile obtainable by measurement of its wide angle X-ray diffraction image.

<Repeating Units>

The cellulose fibers of the present invention is made of cellulose containing repeating units represented by the following formula (1) and/or its derivative, preferably cellulose containing at least 50% of repeating units represented by the above formula (1), particularly preferably composed solely of repeating units represented by the above formula (1), and/or its derivative.

Cellulose is preferably one having such repeating units, whereby the crystallinity becomes high, and high heat resistance, high modulus of elasticity, high strength and low coefficient of linear thermal expansion can be accomplished, such being desirable.

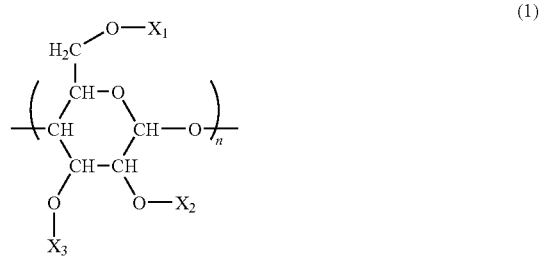

(1)

In the above formula (1), each of $X_1$, $X_2$ and $X_3$ which are independent of one another, is a hydrogen atom; a $C_{1\text{-}20}$ alkylcarbonyl group such as an acetyl group, a propionyl group, a butyryl group, a 2-butyryl group, a pentanoyl group, a hexanoyl group, a heptanoyl group, an octanoyl group, a nonanoyl group, a decanoyl group, an undecanoyl group, a dodecanoyl group, a myristoyl group, a palmitoyl group, a stearoyl group or a pivaloyl group; a $C_{2\text{-}6}$ alkenylcarbonyl group which may be substituted by an allyl group, such as an acryloyl group, a methacryloyl group or a cinnamoyl group; an alkynylcarbonyl group such as a propioloyl group; an arylcarbonyl group such as a benzoyl group or a naphthoyl group; a nicotinoyl group, an isonicotinoyl group, a furoyl group or a cinnamoyl group, but each of $X_1$, $X_2$ and $X_3$ is preferably a hydrogen atom. In such a case, the crystallinity becomes high, and high heat resistance, high modulus of elasticity, high strength and low coefficient of linear thermal expansion can be accomplished, such being desirable. In a case where hydrophobicity is required, each of $X_1$, $X_2$ and $X_3$ which are independent of one another, may partially be an acetyl group, a propionyl group, a butyryl group, a 2-butyryl group, a pentanoyl group, a hexanoyl group, a heptanoyl group, an octanoyl group, a nonanoyl group, a decanoyl group, an undecanoyl group, a dodecanoyl group, a myristoyl group, a palmitoyl group, a stearoyl group, a pivaloyl group, a benzoyl group, a naphthoyl group, a nicotinoyl group, an isonicotinoyl group, a furoyl group or a cinnamoyl group. Further, in a case where the after-mentioned polymer cellulose complex is combined with a (meth)acrylic resin, each of $X_1$, $X_2$ and $X_3$ which are independent of one another, is preferably an acryloyl group, a methacryloyl group or a propioloyl group.

Here, the chemical structure of the repeating units of cellulose can be confirmed by solid state NMR.

[Cellulose Fibers]

The cellulose fibers in the present invention are preferably in the form of a cellulose fiber planar structure, a cellulose nonwoven fabric or cellulose fiber particles. The cellulose fiber planar structure is preferably a sheet i.e. a cellulose fiber planar structure having little pores, or a nonwoven fabric (a porous cellulose fiber planar structure, which may be hereinafter referred to as "cellulose nonwoven fabric").

[Cellulose Fiber Planar Structure]

As a typical example of the cellulose fiber planar structure, a cellulose nonwoven fabric will be described. The cellulose nonwoven fabric in the present invention (which may be hereinafter referred to as "the cellulose nonwoven fabric of the present invention") is a nonwoven fabric composed mainly of cellulose and is an assembly of cellulose fibers. The cellulose nonwoven fabric can be obtained by a method of forming a cellulose dispersion into a membrane by a paper making or coating technique, or a method of drying a gelled membrane.

<Thickness>

The thickness of the cellulose nonwoven fabric of the present invention is not particularly limited, but it is preferably at least 100 nm, more preferably at least 1 μm, further preferably at least 10 μm, particularly preferably at least 50 μm, most preferably at least 80 μm and preferably at most 10 cm, more preferably at most 1 cm, further preferably at most 1 mm, particularly preferably at most 250 μm. The thickness of the cellulose nonwoven fabric is at least the above lower limit and preferably thick from the viewpoint of the stability for production and strength and is at most the above upper limit and preferably thin from the viewpoint of the productivity, uniformity and impregnation property with a resin.

[Cellulose Fiber Particles]

The cellulose fiber particles of the present invention (which may be hereinafter referred to as "the cellulose particles") are ones produced by using the above-described microfibrillated cellulose fiber dispersion of the present invention. Specifically, the cellulose particles of the present invention are produced by granulating the above-described microfibrillated cellulose fiber dispersion of the present invention into particles by a suitable method.

<Method for Producing Cellulose Fiber Particles>

As a method for producing the cellulose particles of the present invention by using the microfibrillated cellulose fiber dispersion of the present invention, a method may be mentioned wherein the microfibrillated cellulose fiber dispersion of the present invention is sprayed from e.g. spray nozzles to remove the dispersion medium for granulation by means of e.g. a known spray drying apparatus. Such a spraying method may specifically be a method by means of a rotating disk, a method by means of a pressure nozzle or a method by means of a twin-fluid nozzle. The particles obtained by spray drying may further be dried by using another drying apparatus. In such a case, infrared rays or microwaves may be employed as the heat energy source.

Otherwise, the microfibrillated cellulose fiber dispersion of the present invention may be freeze-dried, followed by pulverization to obtain cellulose particles of the present invention. In such a case, specifically, a method may be mentioned wherein the microfibrillated cellulose fiber dispersion of the present invention is cooled by liquid nitrogen or the like, followed by pulverization by means of a grinder or a rotary knife.

Here, chemical modification may be applied to such cellulose particles. In such a case, the method for chemical modification may be the same as the after-mentioned method for chemical modification of a cellulose fiber planar structure.

<Particle Diameter of Cellulose Fiber Particles>

The particle diameter of the cellulose particles of the present invention is not particularly limited, but the particle diameter is preferably at least 1 μm and at most 1 mm. Such a particle diameter is more preferably at least 5 μm and at most 100 μm, particularly preferably at least 5 μm and at most 50 μm.

If the particle diameter of the cellulose particles is too large, when combined with a polymer, the cellulose particles tend to cause dispersion failure, and if the particle size is too small, the cellulose particles tend scatter, whereby the handling tends to be difficult.

<Thick Fiber Content>

The cellulose particles of the present invention are preferably such that when they are impregnated with an oil having a refractive index of 1.52 and observed by a microscope, the volume fraction of fibers having a fiber diameter of at least 400 nm (the thick fiber content) is at most 10%.

Such a thick fiber content can be measured in the same manner as for the after-mentioned thick fiber content in the cellulose fiber planar structure.

If the thick fiber content is too high, cellulose fibers having a fiber diameter larger than the wavelength of visible light are substantially present, and the transparency of the fibers themselves will be poor, or a polymer cellulose composite having high transparency cannot be obtained.

The lower the thick fiber content, the better, and it is more preferably at most 5%, particularly preferably 1%.

<Fiber Diameter>

The fiber diameter of the fibers of the present invention is preferably small. Specifically, the fibers of the present invention preferably do not contain ones having a fiber diameter of 1,500 nm or larger, more preferably do not contain ones having a fiber diameter of 1,000 nm or larger, particularly preferably do not contain ones having a fiber diameter of 500 nm or larger.

A nonwoven fabric not containing fibers having a fiber diameter of 1,500 nm or larger, is preferred in that when it is combined with a matrix material such as a resin, it is possible to obtain a composite having high transparency and lower coefficient of linear thermal expansion.

Here, the fiber diameter of fibers can be ascertained by SEM observation.

Further, the fiber diameter of the fibers of the present invention as observed by SEM is preferably from 4 to 30 nm on average. If the average fiber diameter of the fibers exceeds 30 nm, it becomes close to 1/10 of the wavelength of visible light, whereby refraction and scattering of visible light tend to occur at the interface with the matrix material, and the transparency decreases, such being undesirable. Further, fibers having a fiber diameter of 4 nm or smaller cannot substantially be produced. From the viewpoint of transparency, the average fiber diameter of the fibers is more preferably from 4 to 20 nm.

The fiber diameter can be measured by a microscope such as SEM. Specifically, the surface or cross section of the fiber nonwoven fabric is observed by e.g. SEM or TEM, and among the measured values at randomly selected 12 points, an average of the measured values at 10 points excluding the largest value and the smallest value, is obtained. Here, in the measurement of the fiber diameter in a composite such as a cellulose fiber planar structure or cellulose fiber particles, the composite is fractured directly, or after cooled with liquid nitrogen or the like as the case requires, to expose the fracture surface, whereupon the fracture surface is observed by e.g. SEM or TEM. The fiber diameter can be obtained by averaging the measured values at 10 points excluding the largest value and the smallest value, among the measured values at randomly selected 12 points.

Otherwise, the composite such as the cellulose fiber planar structure or cellulose fiber particles is impregnated with the after-mentioned oil having a refractive index of 1.52 and observed by a microscope, whereby the fiber diameter can be ascertained by actually measuring the diameter of the fibers present in the interior of the composite.

<Thick Fiber Content>

The cellulose fiber planar structure of the present invention is preferably such that when it is impregnated with an oil having a refractive index of 1.52 and observed by a microscope, the volume fraction of fibers having a fiber diameter of at least 400 nm (this proportion may be hereinafter referred to as "the thick fiber content") is at most 10%.

Such a thick fiber content can be measured by the method specifically described in Examples given hereinafter.

If such a thick fiber content is too large, cellulose fibers having a fiber diameter larger than the wavelength of visible light are present in a large amount, and the transparency of the fibers themselves will be poor, or a polymer cellulose composite having high transparency cannot be obtained.

The smaller the thick fiber content, the better, and it is preferably at most 5%, particularly preferably at most 0%.

<Fiber Length>

The length of fibers is not particularly limited, but it is preferably at least 100 nm on average. If the average length of fibers is shorter than 100 nm, the strength is likely to be inadequate.

<Yellowness>

The color of the fibers and the cellulose nonwoven fabric of the present invention is preferably white. As mentioned above, the cellulose nonwoven fabric of the present invention is constituted by cellulose fibers having a small fiber diameter, but because of the presence of spaces, the cellulose nonwoven fabric itself does not become substantially transparent, and after it is impregnated and combined with the matrix material such as a resin, the obtained composite becomes transparent. At that time, the composite is preferably colorless. Therefore, the nonwoven fabric itself is preferably white.

By the nature of cellulose, the nonwoven fabric will not be tinged with blue or red, but may sometimes be tinged with yellow attributable to the raw material or tinged with yellow by subsequent chemical modification. Especially when a raw material derived from wood is employed, the nonwoven fabric may be tinged with yellow depending upon the refining degree. If the fibers and the nonwoven fabric are tinged with yellow, when they are combined with a matrix material, the obtained composite, even though it is transparent, tends to be yellowish, such being undesirable.

Such yellowness can be evaluated by measuring the yellowness index (hereinafter YI) in accordance with JIS K7105. The larger the YI value, the stronger the yellowness. The YI value of the fibers and the cellulose nonwoven fabric of the present invention is preferably at most 15, more preferably at most 10, further preferably at most 5. The YI value can be measured in accordance with JIS K7105 by using, for example, a measuring instrument such as a color computer manufactured by Suga Test Instruments Co., Ltd.

<Porosity>

Among the cellulose fiber planar structures of the present invention, one having a porosity of at least 35 vol % will be referred to as a cellulose nonwoven fabric, and one having a porosity of less than 35 vol % will be referred to as a cellulose sheet.

The cellulose nonwoven fabric of the present invention preferably has a porosity of at least 35 vol %, more preferably from 35 vol % to 60 vol %. If the porosity of the cellulose nonwoven fabric is small, the chemical modification which will be described hereinafter, tends to hardly proceed, or a matrix material such as a resin tends to be hardly impregnated and a non-impregnated portion will remain when it is formed into a composite, whereby light scattering is likely to occur at the interface, and the haze tends to be high, such being undesirable. Further, if the porosity of the cellulose nonwoven fabric is high, when it is formed into a composite, a sufficient reinforcing effect by the cellulose fibers cannot be obtained, and the coefficient of linear thermal expansion tends to be large, such being undesirable.

The porosity here is meant for the volume ratio of void spaces in the nonwoven fabric, and the porosity can be obtained by the following formula from the area, thickness and weight of the cellulose nonwoven fabric.

$$\text{Porosity(vol \%)} = \{(1 - B/(M \times A \times t)\} \times 100$$

Here, A is the area ($cm^2$) of the nonwoven fabric, t (cm) is the thickness, B is the weight (g) of the nonwoven fabric, and M is the density of the cellulose. In the present invention, it is assumed that $M = 1.5 \text{ g/cm}^3$. For the thickness of the cellulose nonwoven fabric, measurements are carried out at ten points at various positions of the nonwoven fabric by means of a thickness meter (PDN-20, manufactured by PEACOK), and an average value thereof is adopted.

Further, in a case where the porosity of a nonwoven fabric in a composite is to be obtained, it is also possible to obtain the porosity by a spectroscopic analysis or by analyzing the SEM image of the cross section of the composite.

<Chemical Modification>

The fibers in the fiber composite of the present invention are preferably fibers which are chemically modified. Such chemical modification means that the surface of fibers is reacted with and chemically modified by a chemical modifier, and in a case where the fibers are cellulose, hydroxy groups in the cellulose are reacted with and chemically modified by the chemical modifier. The chemical modification will be described with reference to a case where the fibers are cellulose, as a typical example, but the chemical modification is not limited thereto.

(Types)

The functional group to be introduced into the cellulose by the chemical modification may, for example, be an acyl group such as an acetyl group, an acryloyl group, a methacryloyl group, a propionyl group, a propioloyl group, a butyryl group, a 2-butyryl group, a pentanoyl group, a hexanoyl group, a heptanoyl group, an octanoyl group, a nonanoyl group, a decanoyl group, an undecanoyl group, a dodecanoyl group, a myristoyl group, a palmitoyl group, a stearoyl group, a pivaloyl group, a benzoyl group, a naphthoyl group, a nicotinoyl group, an isonicotinoyl group, a furoyl group or a cinnamoyl group, an isocyanate group such as 2-methacryloyloxyethyl isocyanoyl group, an alkyl group such as a methyl group, an ethyl group, a propyl group, a 2-propyl group, a butyl group, a 2-butyl group, a tert-butyl group, a pentyl group, a hexyl group, a heptyl group, an octyl group, a nonyl group, a decyl group, an undecyl group, a dodecyl group, a myristyl group, a palmityl group or a stearyl group, an oxirane group, an oxetane group, a thiirane group, or a thietane group. Among them, particularly preferred is a $C_{2-12}$ acyl group such as an acetyl group, an acryloyl group, a methacryloyl group, a benzoyl group or a naphthoyl group, or a $C_{1-12}$ alkyl group such as a methyl group, an ethyl group or a propyl group.

(Method for Chemical Modification)

The method for chemical modification is not particularly limited and may, for example, be a method of reacting the cellulose with the following chemical modifier. Also with respect to the reaction conditions, there is no particular restriction, and as the case requires, it is possible to use a solvent, a catalyst, etc. or to carry out heating, pressure reduction, etc.

Types of the chemical modifier may be one or more selected from the group consisting of an acid, an acid anhydride, an alcohol, a halogenating reagent, an isocyanate, an alkoxysilane or a cyclic ether such as oxirane (epoxy)

The acid may, for example, be acetic acid, acrylic acid, methacrylic acid, propanoic acid, butanoic acid, 2-butanoic acid or pentanoic acid.

The acid anhydride may, for example, be acetic anhydride, acrylic anhydride, methacrylic anhydride, propanoic anhydride, butanoic anhydride, 2-butanoic anhydride or pentanoic anhydride.

The alcohol may, for example, be methanol, ethanol, propanol or 2-propanol.

The halogenating reagent may, for example, be an acetyl halide, an acryloyl halide, a methacryloyl halide, a propanoyl halide, a butanoyl halide, a 2-butanoyl halide, a pentanoyl halide, a benzoyl halide or a naphthoyl halide.

The isocyanate may, for example, be methyl isocyanate, ethyl isocyanate or propyl isocyanate.

The alkoxysilane may, for example, be methoxysilane or ethoxysilane.

The cyclic ether such as an oxirane (epoxy) may, for example, be ethyloxirane or ethyloxetane.

Among them, particularly preferred is acetic anhydride, acrylic anhydride, methacrylic anhydride, a benzoyl halide or a naphthoyl halide.

Such chemical modifiers may be used alone or in combination as a mixture of two or more of them.

(Chemical Modification Ratio)

The chemical modification ratio here is meant for the proportion of those chemically modified among the entire hydroxy groups in the cellulose, and the chemical modification ratio can be measured by the following titration method.

⟨Measuring Method⟩

0.05 g of the cellulose nonwoven fabric is accurately weighed, and 6 ml of methanol and 2 ml of distilled water are added thereto. The mixture is stirred at from 60 to 70° C. for 30 minutes, and then, 10 ml of a 0.05 N sodium hydroxide is added thereto. The mixture is stirred at from 60 to 70° C. for 15 minutes and further stirred at room temperature for 1 day. Phenolphthalein is added thereto, followed by titration with a 0.02 N hydrochloric acid aqueous solution.

From the amount Z (ml) of the 0.02 N hydrochloric acid aqueous solution required for the titration here, the mol Q of substituents introduced by the chemical modification is obtained by the following formula.

$$Q(\text{mol})=0.05(N)\times 10(\text{ml})/1000-0.02(N)\times Z(\text{ml})/1000$$

The relation between the mol Q of such substituents and the chemical modification ratio X (mol %) is represented by the following formula (cellulose=$(C_6O_5H_{10})_n$=$(162.14)_n$, the number of hydroxy groups per repeating unit=3, molecular weight of OH=17). In the following, T is the molecular weight of the substituent.

$$\frac{\text{Amount of sample}}{162.14+(T-17)\times\frac{3X}{100}}=\frac{Q}{\frac{3X}{100}}$$

The above equation can be solved as follows.

$$X=\frac{100}{3}\times\frac{162.14\times Q}{\text{Amount of sample}-Q\times(T-17)\}}$$

In the present invention, the chemical modification ratio of the cellulose fibers is preferably at least 0 mol %, more preferably at least 8 mol %, further preferably at least 15 mol %, based on the entire hydroxy groups in the cellulose. Further, the chemical modification ratio is preferably at most 65 mol %, more preferably at most 50 mol %, further preferably at most 40 mol %, based on the entire hydroxy groups in the cellulose.

If such a chemical modification ratio is too low, when heated by post treatment after forming a composite, the composite may sometimes undergo coloration. If the chemical modification ratio is too high, the cellulose structure is likely to be broken, whereby the crystallinity tends to be low, and there will be a problem such that the coefficient of linear thermal expansion of the obtainable cellulose fiber composite tends to be large, such being undesirable. Further, if the chemical modification ratio is too low, the hydrophilicity of the nonwoven fabric tends to be high, and the water absorption tends to be high, such being undesirable. Especially in a case where a wood material is used as the cellulose material, if the chemical modification ratio is low, when heated by post treatment after forming a composite, the composite is likely to undergo coloration, or even if the chemical modification ratio is high, the nonwoven fabric is likely to undergo coloration after the chemical modification reaction, such being undesirable.

[Method for Producing Cellulose Nonwoven Fabric]

The method for producing the cellulose nonwoven fabric of the present invention is not particularly limited. However, in a case where a chemically modified cellulose nonwoven fabric is to be produced, it is preferred that cellulose is formed into a nonwoven fabric, and then chemically modified, and it is more preferred that cellulose is washed with an organic solvent, then formed into a nonwoven fabric and thereafter, chemically modified.

At the time of producing a nonwoven fabric, a cellulose material is refined or microfibrillated, as the case requires, and then a dispersion of such cellulose (usually an aqueous dispersion of cellulose) is subjected to filtration or coating to form a membrane, or a gelled membrane is formed, followed by drying to form a nonwoven fabric. Before carrying out such drying, the formed membrane is preferably washed with or subjected to dipping treatment with an organic solvent such as an alcohol.

As mentioned above, the chemical modification may be carried out after forming such a nonwoven fabric, or chemical modification may be applied to the cellulose before forming it into a nonwoven fabric. The former is preferred. In such a case, cellulose substituted by an organic solvent such as an alcohol is formed into a nonwoven fabric, which is then chemically modified.

After completion of the chemical modification, it is preferred that the obtained nonwoven fabric is thoroughly washed with water, and then remaining water is substituted by an organic solvent such as an alcohol, followed by drying.

Such a method for producing a nonwoven fabric will be described in further detail.

<Production of Nonwoven Fabric>

For the production of a nonwoven fabric, microfibrillated cellulose fibers are used.

Wood such as soft wood or hard wood, or cotton such as cotton linter or cotton lint, is refined by common bleaching with chlorine or by extraction with an acid, alkali or various organic solvents and then subjected to microfibrillation treatment to obtain fractured cellulose.

<Material>

Specifically, a plant-derived material may, for example, be a wood material such as soft wood or hard wood, a cotton such as cotton linter or cotton lint, kenaf or hemp, or ramie. The plant-derived material is economically preferred from the high practical usefulness in view of the productivity and costs as compared with a non-plant-derived cellulose such as bacterial cellulose. Further, cellulose fibers obtainable from a plant-derived material have high crystallinity and tend to have a low coefficient of linear thermal expansion, such being desirable. Among plant-derived materials, cotton is preferred from such a viewpoint that microfibrillated fibers can easily be obtained, but the production quantity is poor as compared with a wood material, such being economically not preferred. On the other hand, a wood material such as soft wood or hard wood has a merit such that microfibrils are very fine at a level of about 4 nm and have a linear fiber form free from branches, whereby scattering of light scarcely occurs. Further, it is a living resource of the largest quantity on earth and is a resource of persistent form which is produced in an amount as large as at least 70,000,000,000 ton per year, and therefore, its contribution to reduction of carbon dioxide influential over the global warming, is substantial, and it is very preferred economically as well as from its performance.

In the present invention, such a plant-derived material is used which has an average minimum length of at least 10 μm and an average maximum length of at most 10 cm.

Here, the "average minimum length" is an average value of lengths of portions having the minimum lengths (or diameters) of the raw material chips (such raw material chips may have various shapes such as fiber shapes or particle shapes), and the "average maximum length" is an average value of lengths of the portions having the maximum lengths (or diameters) of the raw material chips. They can be measured as follows.

〈Method for Measuring Minimum Length or Maximum Length〉

The minimum length or the maximum length can be measured by e.g. a ruler or a vernier caliper with respect to the size of from about 1 mm to 10 cm. With respect to a size of from about 10 μm to 1 mm, the minimum length or the maximum length can be measured by observation by an optical microscope. The average is an average of lengths at 10 points randomly sampled.

If the average minimum length of the material is too small, the removal rate of the cleaning liquid in the step of refining the cellulose tends to be slow, such being inefficient, and if the average maximum length of the material is too large, the handling efficiency tends to be poor, or the efficiency for refining tends to be low. Preferably, the average minimum length of the material is at least 50 μm, and the average maximum length of the material is at most 5 cm. More preferably, the average minimum length of the material is from 50 to 100 μm, and the average maximum length of the material is from 100 to 500 μm.

Accordingly, in the present invention, the above-mentioned plant-derived material is used as cut or fractured into such chips having a proper size, as the case requires.

In a case where the after-mentioned surface treatment such as refining of the material is to be carried out, such cutting or fracturing of the material may be carried out at any timing of before, during or after the treatment. For example, before the refining treatment, it can be carried out by using a percussion pulverizer or a shearing pulverizer, and during or after the refining treatment, it can be carried out by using a refiner or the like.

<Refining Treatment>

In the present invention, prior to the treatment with ultrasonic waves, the material is preferably subjected to refining treatment in an aqueous medium to remove substances other than cellulose in the material, such as lignin, hemicellulose, a resin (rosin), etc.

The aqueous medium to be used for the refining treatment is usually water, but it may be an aqueous solution of an acid or base, or another treating agent, and in such a case, washing treatment with water may be finally carried out.

Further, during the refining treatment, a temperature or pressure may be applied, or the material may be ruptured into wood chips or wood powder, and such rupturing may be carried out at any timing of before, during or after the refining treatment, as mentioned above.

The acid or base, or another treating agent, to be used for the refining treatment of the material is not particularly limited. However, it may, for example, be sodium carbonate, sodium hydrogencarbonate, sodium hydroxide, potassium hydroxide, magnesium hydroxide, sodium sulfide, magnesium sulfide, sodium hydrosulfide, sodium sulfite, calcium sulfite, magnesium sulfite, ammonium sulfite, sodium sulfate, sodium thiosulfate, sodium oxide, magnesium oxide, calcium oxide, acetic acid, oxalic acid, sodium hypochlorite, calcium hypochlorite, sodium chlorite, sodium chlorate, chlorine dioxide, chlorine, sodium perchlorate, sodium thiosulfate, hydrogen peroxide, ozone, hydrosulfite, anthraquinone, dihydrohydroxyanthracene, tetrahydroanthraquinone, anthrahydroquinone, an alcohol such as ethanol, methanol or 2-propanol, or a water-soluble organic solvent such as acetone. These treating agents may be used alone or in combination as a mixture of two or more of them.

Further, as the case requires, bleaching treatment may be carried out with chlorine, ozone, sodium hypochlorite, hydrogen peroxide or chlorine dioxide.

Further, two or more refining treatments may be carried out by using two or more treating agents. In such a case, it is preferred to carry out cleaning treatment with water between the refining treatments employing different treating agents.

The temperature and pressure for the above refining treatment are not particularly limited. The temperature is selected within a range of from 0° C. to 100° C., and in the case of treatment under a pressure exceeding 1 atm, the temperature is preferably from 100° C. to 200° C. Further, the cellulose surface may be chemically modified by the above-mentioned chemical modifier such as an organic acid such as acetic anhydride, and such chemical modification may be carried out after the refining treatment.

<Microfibrillation Treatment>

As a disperser for microfibrillating cellulose, it is preferred to employ a blender-type disperser such as a mixer having a rotary blade, a high speed rotating homogenizer such as Clearmix manufactured by M Technique Co., Ltd. wherein a blade or screw is rotated at a high speed, and cellulose receives a shearing force when discharged from a slit, a high pressure homogenizer whereby cellulose receives a shearing force when discharged from fine pores under high pressure, an ultrahigh pressure homogenizer such as Altimizer, manufactured by Sugino Machine Ltd. of a type wherein the material is compressed under high pressure, whereupon the pressure is released, a counter-colliding type disperser such as MASSCOMIZER-X, (manufactured MASUKO SANGYO CO., LTD.), a method wherein cellulose fibers are put into a container such as a ball mill or a beads mill together with ceramic beads, so that microfibrillation is carried out by the energy produced by the collision of the beads, or an ultrasonic homogenizer of a horn type with a high energy density. Particularly, an ultrahigh pressure homogenizer designed to reduce the pressure by letting a cellulose dispersion jet through fine pores from a high pressure atmosphere of at least 100 MPa, is effective to uniformly fracture the cellulose fibers.

Specifically, a cellulose dispersion is pressurized by a pressurizing machine to a pressure of at least 100 MPa, preferably at least 150 MPa, more preferably at least 200 MPa, further preferably at least 220 MPa, and then jetted from nozzles having a pore diameter of at least 50 μm, preferably at least 100 μm, more preferably at least 150 μm and at most 800 μm, preferably at most 500 μm, more preferably at most 350 μm, to reduce the pressure so that the pressure difference becomes at least 50 MPa, preferably at least 80 MPa, more preferably at least 90 MPa. By a cleaving phenomenon caused by this pressure difference, the cellulose fibers will be finely microfibrillated. This jetting operation may be repeated a plurality of times, as the case requires. It is usually at least once, preferably at least three times, more preferably at least five times, further preferably at least ten times. It is usually at most 100 times, preferably at most 50 times, more preferably at most 20 times, further preferably at most 15 times. The larger the repeating times, the higher the microfibrillating degree. However, if the number of repeating times is too high, the cost and energy consumption will be high, such being undesirable.

<Treatment with Ultrasonic Waves>

As another means, an ultrasonic wave homogenizer having a frequency of at least 15 kHz to 1 MHz and an effective power density of at least 1 W/cm$^2$ is also effective to fracture cellulose fibers. Specifically, a suspension of cellulose fibers is irradiated with ultrasonic waves having a frequency of at least 15 kHz, preferably at least 20 kHz and at most 1 MHz, preferably at most 500 kHz, more preferably at most 100 kHz. If the frequency of the ultrasonic waves is too small, cavitation tends to be hardly formed, and if it is too large, the physical action tends to be hardly obtainable. Further, as the output of the ultrasonic waves, the effective power density is at least 1 W/cm$^2$, preferably at least 10 W/cm$^2$, more preferably at least 20 W/cm$^2$, further preferably at least 50 W/cm$^2$. If the output of the ultrasonic waves is small, the microfibrillating efficiency tends to be extremely low, and in order to carry out fracturing sufficiently, irradiation for a long period of time will be required, such being practically undesirable. Further, the effective power density is preferably at most 500 W/cm$^2$ from the viewpoint of the durability of the vibrator or horn. The effective power density of ultrasonic waves can be calculated from the temperature increase of 500 mL of water. That is, 500 mL of water is put in a container, and the increased temperature is measured when irradiated with ultrasonic waves, and it is obtained by calculation in accordance with the following equation (X).

$$P = (T/s) \times 4.18 \times 500/A \qquad (X)$$

Here, P is the effective power density (W/cm$^2$) of ultrasonic waves, T is the increased temperature (° C.), s is the irradiation time (seconds) of ultrasonic waves, and A is the vibration surface area (cm$^2$) of ultrasonic waves, i.e. in the case of a horn type, A is the area of its end surface, and in a case where a nodular vibration surface is present, A is its surface. In the case of a bath type or the like, a surface on which the vibrator is attached, will vibrate, and A corresponds to the area of the vibration surface.

As the ultrasonic irradiation method, various methods may be employed. For example, it is possible to employ a method wherein cellulose fibers are directly microfibrillated by inserting a horn to transmit vibration of the ultrasonic vibrator directly in the above cellulose dispersion, a method of microfibrillating cellulose by installing an ultrasonic vibrator at the bottom of the container containing the cellulose dispersion or at a part of the wall of the container, or a method wherein a liquid such as water is put in a container having an ultrasonic vibrator mounted, and a container containing the cellulose dispersion is dipped therein, so that the ultrasonic vibration is indirectly exerted to the cellulose dispersion via the liquid such as water to carry out microfibrillating. Among them, the method of directly inserting the horn in the cellulose dispersion is capable of directly transmitting the ultrasonic energy, and thus it is efficient and can suitably be employed. The microfibrillating treatment may be carried out by a batch type treating method wherein a predetermined amount of the cellulose dispersion is subjected to ultrasonic treatment for a predetermined time, and then the entire amount is replaced. Otherwise, it is possible to employ a method of continuously applying ultrasonic waves by circulating a predetermined amount of the cellulose dispersion in a treatment container having an ultrasonic vibrator installed at its bottom or wall or in the vicinity of a horn. A plurality of ultrasonic vibrators may be installed in one treating container, or a plurality of treating containers each having one vibrator installed, may be connected one another. Particularly, in a case where the cellulose dispersion is continuously circulated for treatment, it is preferred from the viewpoint of efficiency to employ a method of connecting in series the treating containers each having a vibrator. In such a case, the plurality of vibrators may have the same frequency, or the frequency may be varied. In the ultrasonic treatment, the given energy is converted to heat, whereby the temperature of the cellulose dispersion is raised. Accordingly, in order to carry out the microfibrillating treatment under a constant treating condition, it is preferred to maintain the temperature of the cellulose dispersion to be constant by cooling or heating. The temperature is preferably from 1° C. to 80° C., more preferably from 10° C. to 60° C., further preferably from 15° C. to 40° C. If it is lower than 1° C., when water is used as a solvent, it will be frozen. With solid ice, cavitation hardly takes place. Otherwise, in a case where water and ice are present as mixed, cavitation takes place on the surface of ice, whereby the energy is consumed, and the effect for microfibrillating cellulose decreases. If the temperature is 80° C. or higher, fine steam is likely to form on the ultrasonic vibrator surface, whereby the energy efficiency deteriorates, such being problematic.

In the present invention, the concentration of cellulose in the cellulose dispersion to be irradiated with ultrasonic waves is preferably from 0.01 to 10 wt %, more preferably from 0.1 to 5 wt %, particularly preferably from 0.2 to 2 wt %. If the concentration of cellulose in the cellulose dispersion to be irradiated with ultrasonic waves is too low, such being inefficient, and if it is too high, the viscosity tends to be high, and the microfibrillation treatment tends to be non-uniform. Therefore, in the present invention, water and/or an organic solvent is added, as the case requires, so that the concentration of cellulose in the cellulose dispersion to be supplied to the ultrasonic treatment will be the above predetermined concentration.

As an organic solvent being the dispersion medium of the cellulose dispersion, it is possible to employ one or more members selected from the group consisting of an alcohol such as methanol, ethanol, isopropyl alcohol, n-propyl alcohol or -butanol, a ketone such as acetone or methyl ethyl ketone, and other water-soluble organic solvents. Preferably, however, the dispersing medium is a mixed liquid of an organic solvent and water, or water. Particularly preferably water.

Further, the fiber diameter of cellulose fibers in the cellulose dispersion to be irradiated with ultrasonic waves is preferably at most 10 μm, particularly preferably at most 2 μm. It is further preferably at most 1 μm.

Here, the fiber diameter of cellulose fibers in the cellulose dispersion prior to the ultrasonic treatment can be ascertained by an optical microscope. The fiber diameter of microfibrillated cellulose fibers of nano size formed by the ultrasonic treatment or the like can be obtained by measuring it by observation by SEM, TEM or the like after drying to remove the dispersion medium in the dispersion.

The treating time by irradiation with ultrasonic waves may be such a time that cellulose fibers in the dispersion will be microfibrillated to the desired microfibrillating degree, and it is suitably set depending on the output or frequency of the ultrasonic waves employed, the fiber diameter of the cellulose fibers before irradiation with ultrasonic waves, etc.

The ultrasonic waves may be applied continuously or intermittently with prescribed intervals. For example, it may be a method wherein application of ultrasonic waves for from 0.1 to 0.9 second and pausing for from 0.9 to 0.1 second are alternately repeated.

The principle for microfibrillating of cellulose fibers by the treatment with ultrasonic waves is not completely understood, but the following phenomenon is considered to take place.

That is, when ultrasonic waves are applied in such a state that cellulose fibers are suspended and dispersed in a liquid such as water, ultrasonic waves generated from the ultrasonic vibrator will impinge on the cellulose fibers to cause cavitation at the interface between the cellulose fibers and water. The formed cavities will rapidly shrink and disappear, but at that time, a large shearing force will be formed around them, whereby microfibrillated cellulose fibers will be peeled from the surface of the cellulose fibers to form microfibrillated cellulose fibers.

Particularly, in the present invention, it is preferred that prior to the above treatment with ultrasonic waves, cellulose fibers are preliminarily fiberized to some extent by various microfibrillating methods. That is, the smaller the fiber diameter of cellulose fibers to be subjected to ultrasonic treatment, the larger the surface area of cellulose fibers to receive ultrasonic waves, whereby the efficiency for irradiation with ultrasonic waves will be improved, and it becomes possible to carry out efficient fracturing thereby to obtain microfibrillated cellulose fibers or nano size efficiently. Accordingly, the fiber diameter of cellulose fibers to be subjected to ultrasonic treatment is preferably at most 10 μm, particularly preferably at most 2 μm.

The method for such microfibrillating treatment prior to the ultrasonic treatment is not particularly limited, but may, for example, be a method wherein ceramic beads having a diameter of about 1 mm are put in a microfibrillated cellulose fiber dispersion having a concentration of from 0.1 to 10 wt %, e.g. about 1 wt %, and vibration is exerted by means of e.g. a paint shaker or a beads mill to microfibrillate the cellulose.

Further, it is possible to adopt, for example, a method wherein such a microfibrillated cellulose fiber dispersion is passed through a slit rotating at a high speed or a blender type dispersing machine to exert a shearing force for microfibrillation, a method (high pressure homogenizer method) wherein, as mentioned above, the microfibrillated cellulose fiber dispersion is subjected to rapid pressure reduction from a pressure of about 14 MPa to generate a shearing force among cellulose fibers for microfibrillation, or a method of employing e.g. a counter-collision type dispersing machine such as MASSCOMIZER-X (manufactured by MASUKO SANGYO CO., LTD.).

It is particularly preferred to carry out the high pressure homogenizer treatment to conduct microfibrillation by rapidly reducing the pressure from a pressure of at least 30 MPa, followed by the ultrasonic treatment, whereby the microfibrillating efficiency will be remarkably improved. That is, by the above high pressure homogenizer treatment, the cellulose fibers having a fiber diameter at a level of a few hundreds μm are microfibrillated to few μm or less, whereby the efficiency for irradiation with ultrasonic waves will be improved.

In a case where microfibrillation is thus carried out by reducing the pressure by letting a dispersion of the material jet from a high pressure atmosphere, a liquid such as an aqueous dispersion, preferably an aqueous suspension, of cellulose material having a cellulose concentration (solid content concentration) of from 0.2 wt % to 10 wt %, particularly from 0.3 wt % to 6 wt %, is permitted to jet from the high pressure atmosphere of at least 100 MPa. If the cellulose concentration in the dispersion to be subjected to such microfibrillating treatment is too low, the amount of the liquid tends to be too large as compared with the amount of cellulose to be treated, whereby the efficiency tends to be poor, and if the cellulose concentration is too high, jetting from fine pores tends to be difficult. Therefore, the concentration of the dispersion of the material to be subjected to the microfibrillation treatment is optionally adjusted, for example, by adding water as the case requires.

As a means to jet the dispersion of the material, it is preferred to employ a high pressure homogenizer as mentioned above. Specifically, the dispersion of the material is pressurized by a pressurizing machine to a pressure of at least 30 MPa, preferably at least 100 MPa, more preferably at least 150 MPa, further preferably at least 220 MPa and then jetted from nozzles having a pore diameter of at least 50 μm thereby to reduce the pressure so that the pressure difference will be at least 30 MPa, preferably at least 80 MPa, more preferably at least 90 MPa. Cellulose fibers are microfibrillated by a cleaving phenomenon caused by this pressure difference. Here, if the pressure under a high pressure condition is low, or if the pressure difference from the high pressure to the reduced pressure condition is small, the microfibrillating efficiency tends to be low, and it becomes necessary to increase the number of repeated jetting times to obtain the desired fiber diameter, such being undesirable. Further, also in a case where the pore diameter of fine pores to jet the dispersion of the material is too large, no adequate microfibrillating effect can be obtained, and in such a case, even if the jetting treatment is repeated, cellulose fibers having a desired fiber diameter may not be obtained.

Jetting of the dispersion of the material may be repeated a plurality of times, as the case requires, whereby cellulose fibers having a desired fiber diameter may be obtained by increasing the microfibrillating degree. The number of such repetition (pass number) is usually at least once, preferably at least three times and usually at most 20 times, preferably at most 15 times. The larger the pass number, the higher the microfibrillating degree. However, if the pass number is too large, the cost increases, such being undesirable.

The high pressure homogenizer is not particularly limited. As a specific apparatus, it is possible to employ "Ultimaizer" manufactured by GAULIN or Sugino Machine Ltd.

As the high pressure condition at the time of jetting is high, it is possible to increase the microfibrillating degree by a larger cleaving phenomenon by the pressure difference, but the upper limit in the specification for the apparatus is usually at most 245 MPa.

Likewise, although the pressure difference from the high pressure condition to the reduced pressure condition is preferably large, the upper limit of the pressure difference is usually at most 245 MPa, by jetting from a high pressure condition by a pressurizing machine to an atmospheric pressure level.

Further, if the diameter of a fine pore to jet the dispersion of the material is small, a high pressure condition can easily be created, but if the diameter is too small, the jetting efficiency tends to be poor. Such a pore diameter is usually from 50 μm to 800 μm, preferably from 100 μm to 500 μm, more preferably from 150 μm to 350 μm.

The temperature (the temperature of the dispersion of the material) at the time of jetting is not particularly limited, but it is usually at least 5° C. and at most 100° C. If the temperature is too high, deterioration of the apparatus, specifically the feed pump, the high pressure sealing member, etc. tends to be accelerated, such being undesirable.

The number of jetting nozzles may be one or two, and the jetted cellulose may be impinged on wall, a ball or a ring provided at the jetting position. Further, in a case where two nozzles are used, the respective cellulose materials may be impinged on each other at the jetted position.

Only by treatment by such a high pressure homogenizer, it is possible to obtain the microfibrillated cellulose fiber dispersion of the present invention. In such a case, however, the number of repetition becomes large in order to obtain a sufficient microfibrillating degree, whereby the treating efficiency tends to be poor. Therefore, it is preferred to carry out the after-described ultrasonic treatment after from 1 to about 5 times of high pressure homogenizer treatment, to accomplish the microfibrillation.

<Solvent Content>

In the present invention, it is preferred to apply the above-described ultrasonic treatment to a cellulose fiber dispersion obtained without drying the above plant-derived material to a solvent content of at most 10 wt %.

Here, "without drying to a solvent content of at most 10 wt %" means that after the plant-derived material is once made in a wet state with a solvent such as water, without via a step of drying to a solvent content of at most 10 wt %, microfibrillating treatment by irradiation with ultrasonic waves is carried out while always maintaining the state wet with a solvent such as water with a solvent content of at least 10 wt %.

If ultrasonic waves are applied to a cellulose dispersion in a state dried to a solvent content of at most 10 wt %, cellulose fibers will be firmly agglomerated by hydrogen bond and may hardly be fiberized.

Here, the "solvent content" is the "proportion of the solvent to the total of the solvent such as water and the solid content such as the cellulose material or cellulose fibers".

In the present invention, it is preferred to carry out ultrasonic treatment while maintaining such a solvent content to be at least 20 wt %, particularly at least 50 wt %.

Such a solvent content can be obtained by a method in accordance with JAPAN TAPPI No. 56.

[Microfibrillated Cellulose Fiber Dispersion]

The microfibrillated cellulose fiber dispersion of the present invention is a dispersion of fibers (hereinafter sometimes referred to as "cellulose fibers of the present invention") made of cellulose having cellulose type I crystal and having repeating units represented by the following formula (1) and/or its derivative and is characterized in that when an acceleration of 38,900 G is exerted for 30 minutes by a centrifugal separator to such a dispersion adjusted so that its viscosity at a shear rate of 10 s$^{-1}$ as measured at 25° C. becomes to be at most 100 mPa·s, the concentration of the cellulose and/or its derivative contained in a 10% supernatant in the entire volume, is at least 50% of the concentration of the cellulose and/or its derivative in the dispersion before the dispersion is subjected to the centrifugal separator:

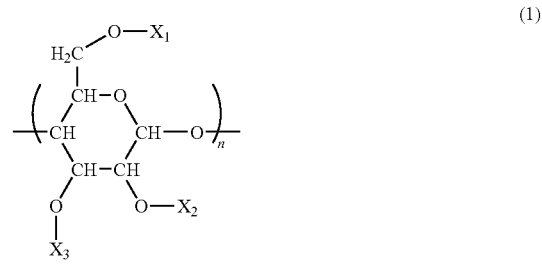

(1)

wherein each of $X_1$, $X_2$ and $X_3$ which are independent of one another, is a hydrogen atom, a $C_{1-20}$ alkylcarbonyl group, a $C_{2-6}$ alkenylcarbonyl group which may be substituted by an allyl group, an alkynylcarbonyl group, an arylcarbonyl group, a nicotinoyl group, an isonicotinoyl group or a furoyl group.

<Microfibrillating Degree>

The cellulose fibers contained in the microfibrillated cellulose fiber dispersion of the present invention are characterized in that when an acceleration of 38,900 G is exerted for 30 minutes by a centrifugal separator to such a dispersion adjusted so that its viscosity at a shear rate of 10 s$^{-1}$ as measured at 25° C. becomes to be at most 100 mPa·s, the concentration of the cellulose and/or its derivative contained in a 10% supernatant in the entire volume, is at least 50% of the concentration of the cellulose and/or its derivative in the dispersion before the dispersion is subjected to the centrifugal separator (hereinafter the ratio (%) of the concentration of the cellulose and/or its derivative contained in the above supernatant after the centrifugal separation to the concentration of the cellulose and/or its derivative in the dispersion before the centrifugal separation may be referred to as the "cellulose remaining ratio", and the "concentration of the cellulose and/or its derivative" may simply be referred to as the "cellulose concentration").

The cellulose remaining ratio being large shows that the cellulose fibers in the dispersion are sufficiently fractured to very fine fibers. The reason is as follows.

That is, when a large acceleration is exerted by a centrifugal separator, cellulose fibers having a specific gravity larger than the dispersing medium such as water in the dispersion will settle out. However, with cellulose fibers having a small fiber diameter, the settling speed by a centrifugal force tends to be small, and such fibers tend to hardly settle out in a predetermined time. However, fibers having a large fiber diameter settle out at an early stage, since the centrifugal force exerted to such fibers becomes large. According to such a settling theory by a centrifugal force, depending upon the amount of fibers to settle out within a predetermined time, there will be difference in concentration between the initial concentration and the cellulose concentration in the supernatant after the centrifugal separation. Accordingly, it becomes possible to evaluate whether or not fibers having a small fiber diameter are substantially contained, in terms of a numerical value, by measuring the concentration of cellulose contained in the supernatant after a predetermined time of applying the above-mentioned constant centrifugal force to the dispersion.

However, in a case where the viscosity of the dispersion is high, the cellulose fibers will agglomerate to take a gel structure, and even if thick fibers are contained, such a gel structure will not settle out by the centrifugal separation. Therefore, the microfibrillating degree cannot be ascertained by the cellulose remaining ratio. Accordingly, the evaluation by centrifugal separation as described above is carried out with respect to a dispersion having a low viscosity and a relatively low cellulose fiber concentration with a viscosity at a shear rate of 10 (steady shear viscosity) being at most 100 mPa·s, e.g. from 1 to 100 mPa·s.

Here, the steady shear viscosity of the cellulose fiber dispersion can be measured by means of a viscosity measuring apparatus (ARES100FRT manufactured by RHEOMETRIC SCIENTIFIC). Specifically, it can be measured by the method disclosed in Examples given hereinafter.

Further, the cellulose remaining ratio is also specifically measured by the method disclosed in Examples given hereinafter.

If this cellulose remaining ratio is too small, it is not possible to accomplish the object of the present invention to provide a microfibrillated cellulose fiber dispersion having cellulose fibers with fine and uniform fiber diameter uniformly dispersed.

In the present invention, the cellulose remaining ratio is at least 50%, preferably at least 70%, more preferably at least 80%.

Still further, the microfibrillated cellulose fiber dispersion of the present invention is preferably such that when an acceleration of 38,900 G is exerted for 30 minutes by a centrifugal separator to such a dispersion adjusted so that its viscosity at a shear rate of 10 s$^{-1}$ as measured at 25° C. becomes to be at most 100 mPa·s, the concentration of the cellulose and/or its derivative contained in a 10% supernatant in the entire volume, is at least 50%, more preferably at least 60%, particularly preferably at least 70%.

<Visible Light Transmittance>

The microfibrillated cellulose fiber dispersion of the present invention has a high light transmittance of visible light, since the fiber diameter of cellulose fibers in the dispersion is very small. That is, with a cellulose dispersion containing thick fibers, light is scattered by such thick fibers, whereby the light transmittance tends to be low, and it looks turbid. Especially, light with a short wavelength is likely to be scattered, whereby the transmittance tends to be low. However, by the microfibrillated cellulose fiber dispersion of the present invention, it is possible to obtain a high transmittance even with light having a wavelength of 400 nm.

Thus, the microfibrillated cellulose fiber dispersion of the present invention has a light transmittance with a wavelength of 400 nm of usually at least 60%, preferably at least 70%, more preferably at least 80%, and a light transmittance with a wavelength of 550 nm of usually at least 70%, preferably at least 80%, more preferably at least 85%. Further, the light transmittance with a wavelength of 800 nm is usually at least 80%, preferably at least 85%, further preferably at least 88%.

Here, the visible light transmittance of the microfibrillated cellulose fiber dispersion is specifically measured by the method disclosed in Examples given hereinafter.

<Fiber Length>

The length of cellulose fibers in the microfibrillated cellulose fiber dispersion of the present invention is not particularly limited, and the average length is preferably at least 100 nm. If the average length of the fibers is too short, the strength of e.g. a cellulose fiber planar structure made thereof is likely to be inadequate. Here, the fiber length of the cellulose fibers can be measured in the same manner as the above-mentioned fiber diameter of the cellulose fibers.

<Dispersion Medium>

The dispersion medium of the microfibrillated cellulose fiber dispersion of the present invention is usually water, but it may be one member, or a mixed solvent of two or more members, selected from organic solvents which will be exemplified in the section for ultrasonic treatment given hereinafter. Otherwise, it may be a mixed solvent of water with one or more of such organic solvents.

Further, such a dispersion medium may further contain one or more of a surfactant, a paper-reinforcing agent, a softening agent, a sizing agent, etc.

The surfactant may, for example, be an anionic surfactant such as a fatty acid salt, an alkyl sulfate, a polyoxyethylene alkyl ether sulfate, an alkylbenzene sulfonate, an alkylnaphthalene sulfonate, an alkyl sulfosuccinate, an alkyl diphenyl ether disulfonate, an alkyl phosphate, a naphthalenesulfonic acid/formalin condensate or a special polycarboxylic acid type polymer surfactant; a nonionic surfactant such as a polyoxyethylene alkyl ether, a polyoxyalkylene alkyl ether, a polyoxyethylene derivative, a sorbitan fatty acid ester, a polyoxyethylene sorbitan fatty acid ester, a polyoxyethylene sorbitol fatty acid ester, a glycerol fatty acid ester, a polyoxyethylene fatty acid ester, a polyoxyethylenealkylamine or an alkylalkanolamide; a cationic surfactant such as an alkylamine salt or a quaternary ammonium salt; or an amphoteric surfactant such as an alkylbetain or amine oxide.

The paper-reinforcing agent may, for example, be a Hoffmann type, an anion type, a starch graphite type, a liquid cation starch or a PAM type.

The softening agent may, for example, be FS8006, manufactured by Seiko PMC Corporation.

The sizing agent may, for example, be an alkylketene dimer or the like, rosin, modified rosin or the like, styrene, a styrene arylate type polymer or the like or a fatty acid type derivative or the like.

The cellulose concentration in the cellulose dispersion to be subjected to the microfibrillation is preferably at least 0.05 wt %, more preferably at least 0.1 wt %, further preferably at least 0.3 wt %. If the cellulose concentration is too low, it takes too much time for filtration or coating. Further, the cellulose concentration is preferably at most 10 wt %, more preferably at most 3 wt %, further preferably at most 2.0 wt %. If the cellulose concentration is too high, the viscosity is likely to be too high, or a uniform microfibrillated cellulose tends to be hardly obtainable, such being undesirable.

In a case where the nonwoven fabric is to be obtained by filtration, the concentration of the cellulose dispersion is preferably at least 0.01 wt %, more preferably at least 0.05 wt %, further preferably at least 0.1 wt %. If the concentration is too low, it takes too much time for filtration such being undesirable. On the other hand, the concentration of the cellulose dispersion is preferably at most 1.5 wt %, more preferably at most 1.2 wt %, further preferably at most 1.0 wt %. If the concentration is too high, a uniform nonwoven fabric tends to be hardly obtainable, such being undesirable.

Further, as the filter fabric for the filtration, it is important that the microfibrillated cellulose will not pass therethrough, and the filtration speed should not be too slow. As such a filter fabric, a nonwoven fabric, woven fabric or porous membrane made of an organic polymer is preferred. The organic polymer is preferably a noncellulose type organic polymer such as polyethylene terephthalate, polyethylene, polypropylene or polytetrafluoroethylene (PTFE).

Specifically, it may, for example, be a porous membrane of polytetrafluoroethylene having a pore diameter of from 0.1 to 5 μm, e.g. 1 μm, or a woven fabric of polyethylene terephthalate or polyethylene having a pore diameter of from 0.1 to 5 μm, e.g. 1 μm.

The cellulose nonwoven fabric of the present invention preferably has a porosity within a certain range, and as a method to obtain a nonwoven fabric having such a porosity, a method may, for example, be mentioned wherein in the step of forming a membrane by filtration, water in the nonwoven fabric is finally substituted by an organic solvent such as an alcohol. That is, water is removed by filtration to bring the cellulose content to be from 5 to 99 wt %, whereupon an organic solvent such as an alcohol is added. Otherwise, after introducing the cellulose dispersion into the filtration apparatus, an organic solvent such as an alcohol is gently introduced to the upper portion, whereby it is also possible to substitute water by the organic solvent such as an alcohol at the final stage of the filtration.

The organic solvent such as an alcohol to be used here is not particularly limited, but it may, for example, be one or more organic solvents selected from alcohols such as methanol, ethanol, 1-propanol, 2-propanol, 1-butanol and 2-butanol, acetone, methyl ethyl ketone, tetrahydrofuran, cyclohexane, toluene and carbon tetrachloride. In a case where a non-water soluble organic solvent is to be used, it is preferred to mix it with a water-soluble organic solvent, or to substitute water with a water-soluble organic solvent, which is then substituted by the non-water soluble organic solvent.

<Chemical Modification>

The chemical modification may be applied to the cellulose before it is formed into a nonwoven fabric, or the chemical modification may be applied after it is formed into a nonwoven fabric.

In a case where the chemical modification is applied to cellulose before it is formed into a nonwoven fabric, the chemical modification may be applied to crude cellulose as a raw material, or the chemical modification may be applied to cellulose after refining. The chemical modification may be applied to microfibrillated cellulose, but it is preferred to apply the chemical modification to cellulose after refining, so that the chemical modifier can be efficiently reacted.

In such a case, a usual method may be employed for the chemical modification. However, cellulose after refining is usually in a water-containing state, and it is important that such water is substituted by e.g. a solvent for the reaction to prevent a reaction of the chemical modifier with water as much as possible. On the other hand, if drying is carried out to remove water here, the subsequent microfibrillation tends to hardly proceed, and therefore, it is not desirable to adopt a drying step here. For the chemical modification, a usual method may be employed. That is, the chemical modification can be carried out by reacting cellulose with a chemical modifier in accordance with a usual method. At that time, a solvent or a catalyst may be used as the case requires, and heating, reduction of the pressure, etc. may be carried out. As the catalyst, it is preferred to use a basic catalyst such as pyridine, triethylamine, sodium hydroxide or sodium acetate, or an acidic catalyst such as acetic acid, sulfuric acid or perchloric acid.

The temperature condition is preferably from 10 to 130° C., since yellowing or decrease in the polymerization degree of the cellulose is likely to result if it is too high, and the reaction rate tends to decrease, if it is too low. The reaction time is from a few minutes to a few tens hours, although it depends also on the chemical modifier or the chemical modification ratio.

After the chemical modification is thus conducted, it is preferred to sufficiently clean the cellulose with water to terminate the reaction. If a non-reacted chemical modifier remains, it may cause coloration later, or it may create a problem when the cellulose is combined with a resin, such being undesirable. Thereafter, if the chemically modified cellulose is crude cellulose, refining is carried out and fracturing is further carried out, followed by forming into a nonwoven fabric, and if it is microfibrillated cellulose, it is simply formed into a nonwoven fabric. At the time of forming into a nonwoven fabric, at the end of the filtration, substitution by an organic solvent is carried out.

As mentioned above, the chemical modification of a nonwoven fabric may be carried out after production of a nonwoven fabric, by the substitution by an organic solvent such as an alcohol, followed by drying the nonwoven fabric or without drying it. However, it is preferred to carry out the chemical modification after drying the nonwoven fabric, whereby the reaction rate for the chemical modification becomes high. Such drying may be drying by circulating air, drying under reduced pressure or drying under elevated pressure. Further, heating may be carried out.

Also for the chemical modification of the nonwoven fabric, a usual method may be employed, as described above.

After carrying out the chemical modification, it is preferred to sufficiently clean the nonwoven fabric with water to terminate the reaction. If a non-reacted chemical modifier remains, it may cause coloration later, or it may cause a problem at the time of combining the nonwoven fabric with a resin, such being undesirable. Further, after cleaning the nonwoven fabric sufficiently with water, it is preferred to substitute the remaining water by an organic solvent such as an alcohol. In this case, the substitution can easily be carried out by immersing the nonwoven fabric in the organic solvent such as an alcohol.

<Drying>

In a case where the chemical modification is carried out before forming into a nonwoven fabric or in a case where the chemical modification is carried out after forming into a nonwoven fabric, the nonwoven fabric is finally dried, and the drying may be done by circulating air, drying under reduced pressure or drying under elevated pressure. Further, heat drying may be employed. In the case of heating, the temperature is preferably at least 50° C., more preferably at least 80° C. and preferably at most 250° C., more preferably at most 150° C. If the heating temperature is too low, it takes time for drying, or the drying is likely to be inadequate, and if the heating temperature is too high, the nonwoven fabric is likely to undergo coloration or decomposition. Further, in the case of pressurizing, the pressure is preferably at least 0.01 MPa, more preferably at least 0.1 MPa and preferably at most 5 MPa, more preferably at most 1 MPa. If the pressure is too low, the drying is likely to be inadequate, and if the pressure is too high, the cellulose nonwoven fabric is likely to be crushed or decomposed.

[Matrix Material]

The above-described cellulose nonwoven fabric and cellulose particles of the present invention are combined with a matrix material to form a cellulose fiber composite of the present invention.

In the present invention, the matrix material is a material to fill void spaces of the cellulose nonwoven fabric of the present invention or a material to be kneaded with granulated cellulose particles, and it is preferably a polymer material.

In the present invention, the polymer material suitable as the matrix material is at least one type of resin obtained from e.g. a thermoplastic resin which becomes a flowable liquid when heated, a thermosetting resin which undergoes polymerization when heated, or an active energy ray curable resin which is polymerized and cured when irradiated with active energy rays such as ultraviolet rays or electron rays. Specific matrix materials will be exemplified below, but it should be understood that the matrix material to be used in the present invention is by no means limited thereto. Further, thermoplastic resins, thermosetting resins and photocurable resins in the present invention may be used in combination as a mixture of two or more of them.

In the present invention, among the following polymer materials, amorphous synthetic polymers are particularly preferred in order to obtain polymer cellulose composites having excellent transparency and high durability. Among them, with respect to the amorphous degree, one having a crystallinity of at most 10%, particularly preferably at most 5%, is preferred. Further, in order to obtain a composite having low water absorption, it is preferred to select a polymer material having little hydrophilic functional groups such as hydroxy groups, carboxy groups or amino groups.

<Thermoplastic Resin>

The thermoplastic resin may, for example, be a styrene resin, an acrylic resin, an aromatic polycarbonate resin, an aliphatic polycarbonate resin, an aromatic polyester resin, an aliphatic polyester resin, an aliphatic polyolefin resin, a cyclic olefin resin, a polyamide resin, a polyphenylene ether resin, a thermoplastic polyimide resin, a polyacetal resin, a polysulfone resin or an amorphous fluororesin.

The styrene resin may, for example, be a polymer or copolymer of e.g. styrene, chlorostyrene, divinylbenzene or α-methylstyrene.

The acrylic resin may be a polymer or copolymer of e.g. (meth)acrylic acid, (meth)acrylonitrile, a (meth)acrylate or a (meth)acrylamide. Here, "(meth)acryl" means "acryl and/or methacryl". The (meth)acrylate may, for example, be an alkylester of (meth)acrylic acid, a (meth)acrylic acid monomer having a cycloalkyl ester group or a (meth)acrylic acid alkoxyalkyl ester. The (meth)acrylic acid alkyl ester may, for example, be methyl(meth)acrylate, ethyl(meth)acrylate, butyl(meth)acrylate, 2-ethylhexyl(meth)acrylate, cyclohexyl (meth)acrylate, benzyl(meth)acrylate, lauryl (meth)acrylate, stearyl(meth)acrylate or hydroxyethyl(meth)acrylate. The (meth)acrylic acid monomer having a cycloalkyl group may, for example, be cyclohexyl (meth)acrylate or isobornyl (meth)acrylate. The (meth)acrylic acid alkoxyalkyl ester may, for example, be 2-methoxyethyl(meth)acrylate, ethoxyethyl(meth)acrylate or 2-butoxyethyl(meth)acrylate. The (meth)acrylamide may, for example, be an N-substituted (meth)acrylamide such as (meth)acrylamide, N-methyl (meth)acrylamide, N-ethyl(meth)acrylamide, N,N-dimethyl (meth)acrylamide, N,N-diethyl (meth)acrylamide, N-isopropyl(meth)acrylamide or N-t-octyl(meth)acrylamide.

The aromatic polycarbonate resin is a copolymer produced by a reaction of at least one bisphenol which may contain a trihydric or higher polyhydric phenol as a copolymerization component, with a carbonic acid ester such as a bisalkyl carbonate, a bisaryl carbonate or phosgene. As the case requires, in order to obtain an aromatic polyester carbonate, an aromatic dicarboxylic acid such as terephthalic acid or isophthalic acid, or its derivative (such as an aromatic dicarboxylic acid diester or an aromatic dicarboxylic acid chloride) may be used as a copolymerization component.

The above bisphenol may, for example, be bisphenol A, bisphenol C, bisphenol E, bisphenol F, bisphenol M, bisphenol P, bisphenol S or bisphenol Z (with respect to the abbreviations, see catalogue of reagents by Aldrich Co.). Among them, bisphenol A or bisphenol Z is preferred, and bisphenol A is particularly preferred. The copolymerizable trihydric phenol may, for example, be 1,1,1-(4-hydroxyphenyl)ethane or phloroglucinol.

The aliphatic polycarbonate resin is a copolymer produced by a reaction of an aliphatic diol component and/or an alicyclic diol component, with a carbonic acid ester such as a bisalkyl carbonate or phosgene. The alicyclic diol may, for example, be cyclohexanedimethanol or isosorbide.

The aromatic polyester resin may be a copolymer of a diol such as ethylene glycol, propylene glycol or 1,4-butanediol, with an aromatic carboxylic acid such as terephthalic acid. Further, it may be a copolymer of a diol such as bisphenol A with an aromatic carboxylic acid such as terephthalic acid or isophthalic acid, like a polyarylate.

The aliphatic polyester resin may, for example, be a copolymer of the above-mentioned diol with an aliphatic dicarboxylic acid such as succinic acid or valeric acid, or a copolymer of the diol with a hydroxydicarboxylic acid such as glycolic acid or lactic acid.

The aliphatic polyolefin resin may specifically be, for example, a homopolymer of an α-olefin having from about 2 to 8 carbon atoms, such as ethylene, propylene or 1-butene, or a binary or ternary copolymer of such an α-olefin with other α-olefin having from about 2 to 18 carbon atoms, such as ethylene, propylene, 1-butene, 3-methyl-1-butene, 1-pentene, 4-methyl-1-pentene, 4,4-dimethyl-1-pentene, 1-hexene, 4-methyl-1-hexene, 1-heptene, 1-octene, 1-decene or 1-octadecene; specifically, an ethylene resin, e.g. an ethylene homopolymer such as a branched low density polyethylene or a linear high density polyethylene, an ethylene/propylene copolymer, an ethylene/1-butene copolymer, an ethylene/propylene/1-butene copolymer, an ethylene/4-methyl-1-pentene copolymer, an ethylene/1-hexene copolymer, an ethylene/1-heptene copolymer or an ethylene/1-octene copolymer, a propylene resin such as a propylene homopolymer, a propylene/ethylene copolymer or a propylene/ethylene/1-butene copolymer, a 1-butene resin such as a 1-butene homopolymer, a 1-butene/ethylene copolymer or a 1-butene/propylene copolymer, or a 4-methyl-1-pentene resin such as 4-methyl-1-pentene homopolymer or a 4-methyl-1-pentene/ethylene copolymer, as well as a copolymer of ethylene with another α-olefin, a copolymer of 1-butene with another α-olefin, or a binary or ternary copolymer with a non-conjugated diene such as 1,4-hexadiene, 4-methyl-1,4-hexadiene, 5-methyl-1, 4-hexadiene, 6-methyl-1,5-heptadiene, 1,4-octadiene, 7-methyl-1,6-octadiene, cyclohexadiene, cyclooctadiene, dicyclopentadiene, 5-methylene-2-norbornene, 5-ethylidene-2-norbornene, 5-butylidene-2-norbornene or 5-isopropenyl-2-norbornene, specifically an olefin rubber such as an ethylene/propylene copolymer, an ethylene/propylene/non-conjugated diene copolymer, an ethylene/1-butene copolymer or an ethylene/1-butene/non-conjugated diene copolymer. These olefin polymers may be used in combination as a mixture of two or more of them.

The cyclic olefin resin is a polymer or copolymer containing a cyclic olefin structure in the polymer chain, such as norbornene or cyclohexadiene. For example, it may be a norbornene resin made of repeating units of a norbornene structure, or a copolymer having a norbornene structure and methylene structure. Commercial products include, for example, "ARTON" manufactured by JSR, "ZEONEX" and "ZEONOR" manufactured by ZEON CORPORATION, "APEL" manufactured by Mitsui Chemicals, Inc. and "TOPAS" manufactured by Ticona.

The polyamide resin may, for example, be an aliphatic amide resin such as 6,6-nylon, 6-nylon, 11-nylon, 12-nylon, 4,6-nylon, 6,10-nylon or 6,12-nylon, or an aromatic polyamide made of an aromatic diamine such as phenylenediamine and an aromatic dicarboxylic acid or its derivative such as terephthaloyl chloride or isophthaloyl chloride.

The polyphenylene ether resin may, for example, be poly (2,6-dimethyl-1,4-phenylene ether), poly(2-methyl-6-ethyl-1,4-phenylene ether) or poly(2,6-dichloro-1,4-phenylene ether). Further, a copolymer of 2,6-dimethylphenol with another phenol may also be mentioned.

The polyimide resin may, for example, be a pyromellitic acid type imide being a copolymer of polymellitic anhydride, 4,4'-diaminodiphenyl ether, etc., a trimellitic acid type polyimide being a copolymer comprising anhydrous trimellitic acid chloride, an aromatic diamine such as p-phenylenediamine and a diisocyanate compound, a biphenyl type polyimide comprising biphenyl tetracarboxylic acid, 4,4'-diaminodiphenyl ether, p-phenylenediamine, etc., a benzophenone type polyimide comprising benzophenone tetracarboxylic acid, 4,4'-diaminodiphenyl ether, etc., or a bismaleimide type polyimide comprising bismaleimide, 4,4'-diaminodiphenylmethane, etc.

The polyacetal resin may, for example, be a homopolymer having an oxymethylene structure as a unit structure, or a copolymer containing an oxyethylene unit.

The polysulfone resin may, for example, be a copolymer of 4,4'-dichlorodiphenylsulfone, bisphenol A, etc.

The amorphous fluororesin may, for example, be a homopolymer or copolymer of tetrafluoroethylene, hexafluoropropylene, chlorotrifluoroethylene, vinylidene fluoride, vinyl fluoride or a perfluoroalkyl vinyl ether.

These thermoplastic resins may be used alone or in combination as a mixture of two or more of them.

<Curing Resin>

A thermosetting resin or an active energy ray curable resin means a precursor before being cured or a resin to be cured. Here, the precursor means a substance which is liquid, semisolid or solid at room temperature and which shows fluidity at room temperature or when heated. Such a resin undergoes a polymerization reaction or crosslinking reaction by the effect of a curing agent, a catalyst, heat or active energy rays to form a three dimensional network structure while increasing the molecular weight, thereby to form a non-soluble non-fusible resin. Further, a resin cured product means a resin obtained by curing of the above thermosetting resin precursor or photo-curable resin precursor.

<<Thermosetting Resin>>

In the present invention, the thermosetting resin is not particularly limited, but it may, for example, be a precursor such as an epoxy resin, an oxetane resin, an acrylic resin, a phenol resin, a urea resin, a melamine resin, an unsaturated polyester resin, a silicone resin, a polyurethane resin or a diallylphthalate resin.

The above epoxy resin precursor (which may be referred to as an epoxy monomer) is an organic compound having at least one epoxy group. The number of epoxy groups in the epoxy resin precursor is preferably from 1 to 7 per molecule, more preferably 2 or more per molecule. Here, the number of epoxy groups per molecule of the precursor can be obtained by dividing the total number of epoxy groups in the epoxy resin precursor by the total number of molecules in the epoxy resin. The above epoxy resin precursor is not particularly limited, and for example, the following epoxy resins may be mentioned. These epoxy resins may used alone or in combination as a mixture of two or more of them. Such an epoxy resin can be obtained by curing an epoxy resin precursor by using a curing agent.

It may, for example, be a precursor, such as a bisphenol type epoxy resin such as a bisphenol A type epoxy resin, a bisphenol F type epoxy resin, a bisphenol AD type epoxy resin or a bisphenol S type epoxy resin; a novolac type epoxy resin such as a phenol novolac epoxy resin or a cresol novolac type epoxy resin; an aromatic epoxy resin such as triphenolmethane triglycidyl ether, or their hydrogenated products or bromides. Further, an alicyclic epoxy resin such as 3,4-epoxycyclohexylmethyl-3,4-epoxycyclohexane carboxylate, 3,4-epoxy-2-methylcyclohexyl-3,4-epoxy-2-methylcyclohexane carboxylate, bis(3,4-epoxycyclohexyl)adipate, bis(3, 4-epoxycyclohexyl)methyl adipate, bis(3,4-epoxy-6-methylcyclohexyl)methyl adipate or bis(2,3-epoxycyclopentyl) ether, may be mentioned. Further, an aliphatic epoxy resin such as a diglycidyl ether of 1,4-butanediol, a diglycidyl ether of 1,6-hexanediol, a triglycidyl ether of glycerol, a triglycidyl ether of trimethylolpropane, a diglycidyl ether of polyethylene glycol, a diglycidyl ether of polypropylene glycol, a polyglycidyl ether of a long chain polyol including a polyoxyalkylene glycol containing a $C_{2-9}$ (preferably $C_{2-4}$) alkylene group or a polytetramethylene ether glycol, may, for example, be mentioned. Further, a glycidyl ester type epoxy resin such as phthalic acid diglycidyl ester, tetrahydrophthalic acid diglycidyl ester, hexahydrophthalic acid diglycidyl ester, diglycidyl p-oxybenzoate, salicylic acid glycidyl ether-glycidyl ester or dimer acid glycidyl ester, and its hydrogenated product may, for example, be mentioned. Further, a glycidyl amine type epoxy resin such as triglycidyl isocyanurate, an N,N'-glycidyl derivative of cyclic alkylene urea or an N,N,O-triglycidyl derivative of p-aminophenol, and its hydrogenated product, may, for example, be mentioned. Further, a copolymer of glycidyl(meth)acrylate with a radical polymerizable monomer such as ethylene, vinyl acetate or a (meth)acrylic acid ester, may, for example, be mentioned. Further, a polymer composed mainly of a conjugated diene compound such as an epoxidized polybutadiene, or one obtained by epoxidizing an unsaturated carbon double bond in such a polymer partially hydrogenated, may, for example, be mentioned. Further, one having an unsaturated carbon double bond of a conjugated diene compound epoxidized in a block copolymer having polymerized blocks composed mainly of a vinyl aromatic compound and polymerized blocks composed mainly of a conjugated diene compound or polymerized blocks of its partially hydrogenated product in the same molecule, such as epoxidized SBS may, for example, be mentioned. Further, a polyester resin having at least one, preferably at least two epoxy groups, per molecule, may, for example, be mentioned. Further, an urethane-modified epoxy resin or a polycaprolactone-modified epoxy resin, having a urethane bond or a polycaprolactone bond introduced into the structure of the above epoxy resin, may, for example, be mentioned. Such a modified epoxy resin may, for example, be a rubber-modified epoxy resin obtained by incorporating a rubber component such as NBR, CTBN, polybutadiene or acrylic rubber to the above epoxy resin. Further, in addition to the epoxy resin, a resin or oligomer having at least one oxirane ring may be incorporated. Further, a fluorene-containing epoxy resin, a thermosetting resin or composition containing fluorene groups, or its cured product, may, for example, be mentioned. Such fluorene-containing epoxy resins are highly heat resistant and thus preferably employed.

The above oxetane resin is an organic compound formed by polymerization of a precursor (hereinafter referred to as an oxetane monomer) having at least one oxetane ring. The number of oxetane rings in such an oxetane resin precursor is preferably from 1 to 7 per molecule, more preferably at least 2 per molecule. Here, the number of oxetane rings per molecule of the precursor is obtained by dividing the total number of oxetane rings in the oxetane resin precursor by a total number of molecules in the oxetane resin. Such an oxetane resin precursor is not particularly limited, and for example, the following oxetane resins may be mentioned. They may be used alone or in combination as a mixture of two or more of them.

A compound having one oxetane in its molecule may, for example, be 3-ethyl-3-hydroxymethyloxatane, 3-ethyl-3-(phenoxymethyl)oxetane, 3-ethyl-3-(2-ethylhexyloxymethyl)oxetane, 3-ethyl{[-3-(triethoxysilyl)propoxy]methyl}oxetane or 3-ethyl-3-methacryloxymethyloxetane. A compound having two oxetanes in its molecule may, for example, be di[1-ethyl(3-oxetanyl)]methyl ether, 1,4-bis{[(3-ethyl-3-oxetanyl)methoxy]methyl}benzene or 4,4'-bis[(3-ethyl-3-oxetanyl)methoxymethyl]biphenyl. A compound having 3 or 4 oxetane rings may, for example, be a reaction product of a branched polyalkyleneoxy group or a polysiloxy group with a 3-alkyl-3-methyloxetane. Commercial oxetane resins include, for example, ARON OXETANE OXT-101, OXT-121, OXT-211, OXT-221, OXT-212, OXT-610, OXT-213 (manufactured by TOAGOSEI CO., LTD.), ETERNACOLL OXETANE EHO, OXBP, OXMA, OXTP (manufactured by UBE INDUSTRIES, LTD.).

With respect to the ratios of the oxetane resin and the epoxy resin, it is preferred that in 100 parts by weight of their mixture, the oxetane resin is from 5 to 95 parts by weight. More preferably, the oxetane resin is from 20 to 90 parts by weight. If the oxetane resin is smaller than 5 parts by weight, photocuring ability tends to be low, and if it exceeds 95 parts by weight, the photocuring speed tends to be low, whereby it becomes difficult to obtain a cured product having sufficient physical properties.

A copolymerizable monomer other than the oxetane monomer may also be copolymerized. For example, a (meth)acrylate monomer having an oxetane ring or epoxy ring in its molecule, an amine compound, a polyaminoamide compound prepared from an amine compound, a tertiary amine compound, an imidazole compound, a hydrazide compound, a melamine compound, an acid anhydride, a phenol compound or a mercapto compound may be mentioned.

The acrylic resin precursor may, for example, be a monofunctional (meth)acrylate compound having one (meth)acryloyl group in its molecule, a polyfunctional (meth)acrylate compound having 2 or 3 (meth) acryloyl groups in its molecule, a styrene compound, an acrylic acid derivative, an acrylate compound having from 4 to 8 (meth)acryloyl groups in its molecule, an epoxy (meth)acrylate compound or a (meth)acrylate compound having an urethane bond.

The monofunctional (meth)acrylate compound having one (meth)acryloyl group in its molecule may, for example, be methyl (meth)acrylate, 2-hydroxyethyl (meth)acrylate, phenyl (meth)acrylate, benzyl (meth)acrylate or cyclohexyl (meth)acrylate.

Particularly, a mono(meth)acrylate having an alicyclic structure may preferably be employed, since the heat resistance will be high. Specific examples of the mono(meth)acrylate having an alicyclic structure include e.g. (hydroxy-acryloyloxy)tricyclo[$5.2.1.0^{2,6}$]decane, (hydroxy-methacryloyloxy)tricyclo[$5.2.1.0^{2,6}$]decane, (hydroxy-acryloyloxy)pentacyclo[$6.5.1.1^{3,6}.0^{2,7}.0^{9,13}$]pentadecane, (hydroxy-methacryloyloxy)pentacyclo[$6.5.1.1^{3,6}.0^{2,7}.0^{9,13}$]pentadecane, (hydroxymethyl-acryloyloxymethyl)tricyclo[$5.2.1.0^{2,6}$]decane, (hydroxymethyl-methacryloyloxymethyl)tricyclo[$5.2.1.0^{2,6}$]decane, (hydroxymethyl-acryloyloxymethyl)pentacyclo[$6.5.1.1^{3,6}.0^{2,7}.0^{9,13}$]pentadecane, (hydroxymethyl-methacryloyloxymethyl)pentacyclo[$6.5.1.1^{3,6}.0^{2,7}.0^{9,13}$]pentadecane, (hydroxyethyl-acryloyloxyethyl)tricyclo[$5.2.1.0^{2,6}$]decane, (hydroxyethyl-methacryloyloxyethyl)tricyclo[$5.2.1.0^{2,6}$]decane, (hydroxyethyl-acryloyloxyethyl)pentacyclo[$6.5.1.1^{3,6}.0^{2,7}.0^{9,13}$]pentadecane and (hydroxyethyl-methacryloyloxyethyl)pentacyclo[$6.5.1.1^{3,6}.0^{2,7}.0^{9,13}$]pentadecane. Further, their mixture may also be mentioned.

The polyfunctional (meth)acrylate compound having 2 or 3 (meth)acryloyl groups in its molecule may, for example, be ethylene glycol di(meth)acrylate, diethylene glycol di(meth)acrylate, triethylene glycol di(meth)acrylate, tetraethylene glycol or higher polyethylene glycol di(meth)acrylate, 1,3-butylene glycol di(meth)acrylate, 1,6-hexanediol di(meth)acrylate, neopentyl glycol di(meth)acrylate, 2-hydroxy-1,3-di(meth)acryloxypropane, 2,2-bis[4-(meth)acryloyloxyphenyl]propane, trimethylolpropane tri(meth)acrylate, bis(hydroxy)tricyclo[$5.2.1.0^{2,6}$]decane=diacrylate, bis(hydroxy)tricyclo[$5.2.1.0^{2,6}$]decane=dimethacrylate, bis(hydroxy)tricyclo[$5.2.1.0^{2,6}$]decane=acrylate methacrylate, bis(hydroxy)pentacyclo[$6.5.1.1^{3,6}.0^{2,7}.0^{9,13}$]pentadecane=diacrylate, bis(hydroxy)pentacyclo[$6.5.1.1^{3,6}.0^{2,7}.0^{9,13}$]pentadecane=dimethacrylate, bis(hydroxy)pentacyclo[$6.5.1.1^{3,6}.0^{2,7}.0^{9,13}$]pentadecane=acrylate methacrylate, 2,2-bis[4-(β-(meth)acryloyloxyethoxy)phenyl]propane, 2,2-bis[4-(β-(meth)acryloyloxyethoxy)cyclohexyl]propane or 1,4-bis[(meth)acryloyloxymethyl]cyclohexane.

The styrene compound may, for example, be styrene, chlorostyrene, divinylbenzene or α-methylstyrene.

The (meth)acrylic acid derivative other than an ester may, for example, be an acrylamide, a methacrylamide, an acrylonitrile or a methacrylonitrile.

Among them, an alicyclic structure-containing bis(meth)acrylate compound is preferably employed. For example, bis(acryloyloxy)tricyclo[$5.2.1.0^{2,6}$]decane, bis(methacryloyloxy)tricyclo[$5.2.1.0^{2,6}$]decane, (acryloyloxy-methacryloyloxy)tricyclo[$5.2.1.0^{2,6}$]decane, bis(acryloyloxy)pentacyclo[$6.5.1.1^{3,6}.0^{2,7}.0^{9,13}$]pentadecane, bis(methacryloyloxy)pentacyclo[$6.5.1.1^{3,6}.0^{2,7}.0^{9,13}$]pentadecane, (acryloyloxy-methacryloyloxy)pentacyclo[$6.5.1.1^{3,6}.0^{2,7}.0^{9,13}$]pentadecane, bis(acryloyoxymethyl)tricyclo[$5.2.1.0^{2,6}$]decane, bis(methacryloyloxymethyl)tricyclo[$5.2.1.0^{2,6}$]decane, (acryloyloxymethyl-methacryloyloxymethyl)tricyclo[$5.2.1.0^{2,6}$]decane, bis(acryloyloxymethyl)pentacyclo[$6.5.1.1^{3,6}.0^{2,7}.0^{9,13}$]pentadecane, bis(methacryloyloxymethyl)pentacyclo[$6.5.1.1^{3,6}.0^{2,7}.0^{9,13}$]pentadecane, (acryloyolxymethyl-methacryloyloxymethyl)pentacyclo[$6.5.1.1^{3,6}.0^{2,7}.0^{9,13}$]pentadecane, bis(acryloyloxyethyl)tricyclo[$5.2.1.0^{2,6}$]decane, bis(methacryloyloxyethyl)tricyclo[$5.2.1.0^{2,6}$]decane, (acryloyloxyethyl-methacryloyloxyethyl)tricyclo[$5.2.1.0^{2,6}$]decane, bis(acryloyloxyethyl)pentacyclo[$6.5.1.1^{3,6}.0^{2,7}.0^{9,13}$]-pentadecane, bis(methacryloyloxyethyl)pentacyclo[$6.5.1.1^{3,6}.0^{2,7}.0^{9,13}$]pentadecane, (acryloyloxyethyl-methacryloyloxyethyl)pentacyclo[$6.5.1.1^{3,6}.0^{2,7}.0^{9,13}$]pentadecane, and a mixture thereof, may be mentioned.

Among them, one selected from bis(acryloyloxymethyl)tricyclo[$5.2.1.0^{2,6}$]decane, bis(methacryloyloxymethyl)tricyclo[$5.2.1.0^{2,6}$]decane and (acryloyloxymethyl-methacryloyloxymethyl)tricyclo[$5.2.1.0^{2,6}$]decane, is preferred. Some of these bis(meth)acrylates may be used in combination.

As the (meth)acrylate having from 4 to 8 (meth)acryloyl groups in its molecule, a (meth)acrylic acid ester of a polyol may be used. Specifically, pentaerythritol tetra(meth)acrylate, pentaerythritol tri(meth)acrylate, dipentaerythritol hexa(meth)acrylate, dipentaerythritol penta(meth)acrylate, dipentaerythritol tetra(meth)acrylate, dipentaerythritol tri(meth)acrylate, tripentaerythritol octa(meth)acrylate, tripentaerythritol hepta(meth)acrylate, tripentaerythritol hexa(meth)acrylate, tripentaerythritol penta(meth)acrylate, tripentaerythritol tetra(meth)acrylate or tripentaerythritol tri (meth)acrylate may, for example, be mentioned.

Now, specific examples of the epoxy(meth)acrylate include, e.g. a bisphenol A type epoxy resin, a bisphenol F type epoxy resin, a phenol novolac type epoxy resin, a compound having an alicyclic epoxy group, a bisphenol A type propylene oxide-addition type terminal glycidyl ether, and a reaction product of a fluorene epoxy resin or the like with (meth)acrylic acid. Specifically, bisphenol A diglycidyl ether=di(meth)acrylate, bisphenol A dipropylene oxide diglycidyl ether=di(meth)acrylate, ethylene glycol diglycidyl ether=di(meth)acrylate, propylene glycol diglycidyl ether=di (meth)acrylate, neopentyl glycol diglycidyl ether=di(meth) acrylate, 1,6-hexanediol diglycidyl ether=di(meth)acrylate, glycerol diglycidyl ether=di(meth)acrylate, trimethylolpropane triglycidyl ether=tri(meth)acrylate, 2-hydroxy-3-phenoxypropyl (meth)acrylate, 3,4-epoxycyclohexylmethyl (meth)acrylate, 3,4-epoxycyclohexylethyl (meth)acrylate, 3,4-epoxycyclohexylbutyl(meth)acrylate and 3,4-epoxycyclohexylmethylamino(meth)acrylate, may, for example, be mentioned.

The (meth)acrylate having an urethane bond in its molecule may, for example, be an urethane oligomer having from 2 to 10 (preferably from 2 to 5) (meth)acryloyl groups per molecule. For example, a (meth)acryloyl group-containing urethane oligomer produced by reacting an urethane polymer obtainable by reacting a diol and a diisocyanate, with a hydroxy group-containing (meth)acrylate, may be mentioned.

The diol to be used here may, for example, be polyethylene glycol, polypropylene glycol, polytetramethylene glycol, polyhexamethylene glycol, polyheptamethylene glycol, polydecamethylene glycol or a polyether diol obtained by ring-opening polymerization of two or more ion-polymerizable cyclic compounds. The ion-polymerizable cyclic compound may, for example, be a cyclic ether such as ethylene oxide, propylene oxide, butene-1-oxide, isobutene oxide, 3,3-bischloromethyl oxetane, tetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether or benzoic acid glycidyl ester. Further, it is also possible to use a polyether diol obtained by ring-opening copolymerization of the above ion-polymerizable cyclic compound with a cyclic imine such as ethyleneimine, a cyclic lactone such as glycolic acid lactide, or a dimethylcyclopolysiloxane. Specific combinations of two or more such ion-polymerizable cyclic compounds include, for example, tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, and butene oxide and ethylene oxide. Such a ring opened copolymer of an ion-polymerizable cyclic compound may be bonded randomly or in a block form.

The above-described polyether diols are available also as commercial products, such as PTMG1000, PTMG2000 (manufactured by Mitsubishi Chemical Corporation), PPG1000, EXCENOL2020, 1020 (manufactured by ASAHI-OLIN, LTD.), PEG1000, UNISAFE DC1100, DC1800 (manufactured NOF Corporation), PPTG2000, PPTG1000, PTG400, PTGL2000 (manufactured by Hodogaya Chemical Co., Ltd.), Z-3001-4, Z-3001-5, PBG2000A, PBG2000B (manufactured by DAI-ICHI KOGYO SEIYAKU CO., LTD.).

Other than the above-mentioned polyether diols, a polyester diol, a polycarbonate diol or a polycaprolactone diol may, for example, be mentioned. Such a diol may be used in combination with the polyether diol. The type of polymerization of such structural units is not particularly limited, and it may be any of random polymerization, block polymerization and graft polymerization. The polyester diol to be used here may, for example, be a polyester polyol obtained by reacting a polyhydric alcohol such as ethylene glycol, polyethylene glycol, propylene glycol, polypropylene glycol, tetramethylene glycol, polytetramethylene glycol, 1,6-hexanediol, neopentyl glycol, 1,4-cyclohexane dimethanol, 3-methyl-1,5-pentanediol, 1,9-nonanediol or 2-methyl-1,8-octanediol, with a polybasic acid such as phthalic acid, isophthalic acid, terephthalic acid, maleic acid, fumaric acid, adipic acid or sebacic acid. As commercial products, Kuraray Polyol P2010, PMIPA, PKA-A, PKA-A2 and PNA-2000 (manufactured by KURARAY CO., LTD.) are, for example, available.

Further, the polycarbonate diol may, for example, be 1,6-hexane polycarbonate, and as commercial products, DN-980, 981, 982 and 983 (manufactured by NIPPON POLYURETHANE INDUSTRY, CO., LTD.) and PC-8000 (manufactured by US PPG) may, for example, be mentioned.

Further, the polycaprolactone diol may, for example, be polycaprolactone diol obtained by reacting ε-caprolactone with a dihydric diol such as ethylene glycol, polyethylene glycol, propylene glycol, polypropylene glycol, tetramethylene glycol, polytetramethylene glycol, 1,2-polybutylene glycol, 1,6-hexanediol, neopentyl glycol, 1,4-cyclohexane dimethanol or 1,4-butanediol. These diols are available as commercial products such as PLACCEL 205, 205AL, 212, 212AL, 220 and 220AL (manufactured by DAICEL CHEMICAL INDUSTRIES, LTD.).

Many of diols other than those mentioned above may also be used. Such diols include, for example, ethylene glycol, propylene glycol, 1,4-butanediol, 1,5-pentanediol, 1,6-hexanediol, neopentyl glycol, 1,4-cyclohexane dimethanol, an ethylene oxide-added diol of bisphenol A, a butylene oxide-added diol of bisphenol A, an ethylene oxide-added diol of bisphenol F, a butylene oxide-added diol of bisphenol F, an ethylene oxide-added diol of hydrogenated bisphenol A, a butylene oxide-added diol of hydrogenated bisphenol A, an ethylene oxide-added diol of hydrogenated bisphenol F, a butylene oxide-added diol of hydrogenated bisphenol F, a dimethylol compound of dicyclopentadiene, tricyclodecane dimethanol, β-methyl-δ-valerolactone, hydroxy-terminal polybutadiene, hydroxy-terminal hydrogenated polybutadiene, castor oil-modified polyol, a terminal diol compound of polydimethylsiloxane, and polydimethylsiloxane carbitol-modified polyol.

Further, other than the combined use of the above diols, it is possible to use a diamine in combination with a diol having a polyoxyalkylene structure, and such a diamine may, for example, be a diamine such as ethylenediamine, tetramethylenediamine, hexamethylenediamine, paraphenylenediamine or 4,4'-diaminodiphenylmethane, a diamine containing a hetero atom, or a polyether diamine.

As a preferred diol, a polytetramethylene ether glycol being a polymer of 1,4-butanediol, may be mentioned. A preferred molecular weight of such a diol is usually from 50 to 15,000, particularly preferably from 500 to 3,000, by the number average molecular weight.

On the other hand, the diisocyanate may, for example, be 2,4-tolylene diisocyanate, 2,6-tolylene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexamethylene diisocyanate, methylenedicyclohexyl diisocyanate, methylenebis(4-cyclohexyl diisocyanate), 2,2,4-trimethylhexamethylene diisocyanate, 1,4-hexamethylene diisocyanate, bis(2-isocyanateethyl)fumarate, 6-isopropyl-1,3-phenyl diisocyanate, 4-diphenylpropane diisocyanate, isophorone diisocyanate, norbornane diisocyanate or lysine diisocyanate. These diisocyanates may be used alone or in combination as a mixture of two or more of them. Among them, a diisocyanate having an alicyclic structure such as isophorone diisocyanate, norbornene diisocyanate or methylenedicyclohexyl diisocyanate is preferably employed.

Further, the hydroxy group-containing (meth)acrylate compound to be used for the reaction may, for example, be 2-hydroxyethyl(meth)acrylate, 2-hydroxypropyl (meth)acrylate, 2-hydroxybutyl(meth)acrylate, 2-hydroxy-3-phenyloxypropyl (meth)acrylate, 1,4-butanediol mono(meth)acrylate, 2-hydroxyalkyl (meth)acryloylphosphate, 4-hydroxycyclohexyl(meth)acrylate, 1,6-hexanediol mono(meth)acrylate, neopentyl glycol mono(meth)acrylate, trimethylolpropane di(meth)acrylate, trimethylolethane di(meth)acrylate, pentaerythritol tri(meth)acrylate, dipentaerythritol penta(meth)acrylate, or a compound obtained by an addition reaction of (meth)acrylic acid with a glycidyl group-containing compound such as an alkyl glycidyl ether, an allyl glycidyl ether or a glycidyl(meth)acrylate. Among them, particularly preferred is 2-hydroxyethyl(meth)acrylate or 2-hydroxypropyl (meth)acrylate.

Useful commercial urethane oligomers include, for example, EB2ECRYL220 (manufactured by DAICEL-CYTEC COMPANY LTD.), ART RESIN UN-3320HA (manufactured by Negami Chemical Industrial Co., Ltd.), ART RESIN UN-3320HB (manufactured by Negami Chemical Industrial Co., Ltd.), ART RESIN UN3320HC (manufactured by Negami Chemical Industrial Co., Ltd.), ART RESIN UN-330 (manufactured by Negami Chemical Industrial Co., Ltd.) and ART REIN UN-901T (manufactured by Negami Chemical Industrial Co., Ltd.), NK-OLIGO U-4HA (manufactured by Shin-Nakamura Chemical Co., Ltd.), NK-OLIGO U-6HA (manufactured by Shin-Nakamura Chemical Co., Ltd.), NK-OLIGO U-324A (manufactured by Shin-Nakamura Chemical Co., Ltd.), NK-OLIGO U-15HA (manufactured by Shin-Nakamura Chemical Co., Ltd.), NK-OLIGO U-108A (manufactured by Shin-Nakamura Chemical Co., Ltd.), NK-OLIGO U-200AX (manufactured by Shin-Nakamura Chemical Co., Ltd.), NK-OLIGO U-122P (manufactured by Shin-Nakamura Chemical Co., Ltd.), NK-OLIGO U-5201 (manufactured by Shin-Nakamura Chemical Co., Ltd.), NK-OLIGO U-340AX (manufactured by Shin-Nakamura Chemical Co., Ltd.), NK-OLIGO U-511 (manufactured by Shin-Nakamura Chemical Co., Ltd.), NK-OLIGO U-512 (manufactured by Shin-Nakamura Chemical Co., Ltd.), NK-OLIGO U-311 (manufactured by Shin-Nakamura Chemical Co., Ltd.), NK-OLIGO UA-W1 (manufactured by Shin-Nakamura Chemical Co., Ltd.), NK-OLIGO UA-W2 (manufactured by Shin-Nakamura Chemical Co., Ltd.), NK-OLIGO UA-W3 (manufactured by Shin-Nakamura Chemical Co., Ltd.), NK-OLIGO UA-W4 (manufactured by Shin-Nakamura Chemical Co., Ltd.), NK-OLIGO UA-4000 (manufactured by Shin-Nakamura Chemical Co., Ltd.), NK-OLIGO UA-100 (manufactured by Shin-Nakamura Chemical Co., Ltd.), Shikoh UV-1400B (manufactured by Nippon Synthetic Chemical Industry Co., Ltd.), Shikoh UV-1700B (manufactured by Nippon Synthetic Chemical Industry Co., Ltd.), Shikoh UV-6300B (manufactured by Nippon Synthetic Chemical Industry Co., Ltd.), Shikoh UV-7550B (manufactured by Nippon Synthetic Chemical Industry Co., Ltd.), Shikoh UV-7600B (manufactured by Nippon Synthetic Chemical Industry Co., Ltd.), Shikoh UV-7605B (manufactured by Nippon Synthetic Chemical Industry Co., Ltd.), Shikoh UV-7610B (manufactured by Nippon Synthetic Chemical Industry Co., Ltd.), Shikoh UV-7620EA (manufactured by Nippon Synthetic Chemical Industry Co., Ltd.), Shikoh UV-7630B (manufactured by Nippon Synthetic Chemical Industry Co., Ltd.), Shikoh UV-7640B (manufactured by Nippon Synthetic Chemical Industry Co., Ltd.), Shikoh UV-6630B (manufactured by Nippon Synthetic Chemical Industry Co., Ltd.), Shikoh UV-7000B (manufactured by Nippon Synthetic Chemical Industry Co., Ltd.), Shikoh UV-7510B (manufactured by Nippon Synthetic Chemical Industry Co., Ltd.), Shikoh UV-7461TE (manufactured by Nippon Synthetic Chemical Industry Co., Ltd.), Shikoh UV-3000B (manufactured by Nippon Synthetic Chemical Industry Co., Ltd.), Shikoh UV-3200B (manufactured by Nippon Synthetic Chemical Industry Co., Ltd.), Shikoh UV-3210EA (manufactured by Nippon Synthetic Chemical Industry Co., Ltd.), Shikoh UV-3310B (manufactured by Nippon Synthetic Chemical Industry Co., Ltd.), Shikoh UV-3500BA (manufactured by Nippon Synthetic Chemical Industry Co., Ltd.), Shikoh UV-3520TL (manufactured by Nippon Synthetic Chemical Industry Co., Ltd.), Shikoh UV-3700B (manufactured by Nippon Synthetic Chemical Industry Co., Ltd.), Shikoh UV-6100B (manufactured by Nippon Synthetic Chemical Industry Co., Ltd.), and Shikoh UV-6640B (manufactured by Nippon Synthetic Chemical Industry Co., Ltd.).

The number average molecular weight of the (meth)acrylate having an urethane bond in its molecule is preferably from 1,000 to 100,000, more preferably from 2,000 to 10,000. Among them, an urethane acrylate having methylene dicyclohexyl diisocyanate and polytetramethylene ether glycol, is preferably employed, since it is excellent in transparency, low birefringence, flexibility, etc.

The phenol resin precursor may, for example, be one prepared by reacting a phenol such as phenol or cresol with formaldehyde to prepare a novolac or the like and curing it with e.g. hexamethylene tetramine.

The urea resin precursor may, for example, be a polymerization reaction product of e.g. urea with e.g. formaldehyde.

The melamine resin precursor may, for example, be a polymerization reaction product of e.g. melamine with e.g. formaldehyde.

The unsaturated polyester resin may, for example, be a resin prepared by dissolving an unsaturated polyester obtained from e.g. an unsaturated polybasic acid and e.g. a polyhydric alcohol, in a monomer polymerizable therewith, followed by curing.

The silicone resin precursor may be one having an organopolysiloxane as the main structure.

The polyurethane resin precursor may, for example, be a polymerization reaction product of a diol such as glycol with a diisocyanate.

The diallyl phthalate resin precursor may be a reaction product of a diallyl phthalate monomer with a diallyl phthalate prepolymer.

The curing agent and the curing catalyst for such thermosetting resins are not particularly limited. For example, an amine compound, a polyaminoamide compound prepared from an amine compound, a tertiary amine compound, an imidazole compound, a hydrazide compound, a malemine compound, an acid anhydride, a phenol compound, a thermal latent cation polymerization catalyst, a dicyanamide and a derivative thereof may be mentioned. They may be used alone or in combination as a mixture of two or more of them.

The photocurable resin in the present invention is not particularly limited and may, for example be a precursor of e.g. the above-mentioned epoxy resin, acrylic resin or oxetane resin.

Further, the above-mentioned curable resin may optionally be used in the form of a curable composition having a chain transfer agent, an ultraviolet absorber, a filler, a silane coupling agent, etc. incorporated as the case requires.

With respect to the above chain transfer agent, a polyfunctional mercaptan compound having two or more thiol groups in its molecule may be used as a chain transfer agent, whereby it is possible to impart a suitable toughness to the cured product. Such a mercaptan compound may, for example, be a 2- to 6-hydric thioglycolic acid or thiopropionic acid ester, such as pentaerythritol tetrakis(β-thiopropionate), pentaerythritol tetrakis(β-thioglycolate), trimethylolpropane tris(β-thiopropionate), trimethylolpropane tris(β-thioglycolate), diethylene glycol bis(β-thiopropionate), diethylene glycol bis(β-thioglycolate), dipentaerythritol hexakis(β-thiopropionate) or dipentaerythritol hexakis(δ-thioglycolate); a ω-SH group-containing triisocyanurate such as tris[2-(β-thiopropionyloxy)ethyl]triisocyanurate, tris[2-(β-thioglyconyloxy)ethyl]triisocyanurate, tris[2-(β-thiopropionyloxyethoxy)ethyl]triisocyanurate, tris[2-(β-thioglyconyloxyethoxy)ethyl]triisocyanurate, tris[2-(β-thiopropionyloxy)propyl]triisocyanurate or tris[2-(δ-thioglyconyloxy)propyl]triisocyanurate; or an α,ω-SH group-containing compound such as benzene dimercaptane, xylylene dimercaptane or 4,4'-dimercaptodiphenyl sulfide. Among them, it is preferred to use one or more selected from pentaerythritol tetrakis(β-thiopropionate), trimethylolpropane tris(β-thiopropionate), tris[2-(β-thiopropionyloxyethoxy)ethyl]triisocyanurate, etc. In a case where such a mercaptan compound is incorporated, it is incorporated in a proportion of usually at most 30 wt % based on the total amount of the matrix material.

The ultraviolet absorber is one selected from the group consisting of benzophenone ultraviolet absorbers and benzotriazole ultraviolet absorbers. Such ultraviolet absorbers may be used alone or in combination as a mixture of two or more of them. Specifically, benzophenone type compounds such as 2,4-dihydroxybenzophenone, 2-hydroxy-4-methoxybenzophenone, 2-hydroxy-4-octoxybenzophenone, 2-hydroxy-4-octadecyloxybenzophenone, 2,2'-dihydroxy-4-methoxybenzophenone and 2,2'-dihydroxy-4,4'-dimethoxybenzophenone, benzotriazole compounds such as 2-(2'-hydroxy-5-methylphenyl)benzotriazole, 2-(2'-hydroxy-3',5'-ditertiarybutylphenyl)benzotriazole and 2-(2'-hydroxy-3'-tertiarybutyl-5'-methylphenyl)benzotriazole, and other compounds such as malonic acid ester type Hostavin PR-25 (manufactured by Clariant) and oxalic anilide type Sanduvor VSU (manufactured by Clariant), may, for example, be mentioned. In a case where such an ultraviolet absorber is incorporated, it is usually incorporated in a proportion of from 0.01 to 1 wt %, based on the total amount of the matrix material.

As a filler, inorganic particles or an organic polymer may, for example, be added in addition to the cellulose fibers. For example, inorganic particles such as silica particles, titania particles or alumina particles; a transparent cycloolefin polymer such as ZEONEX (manufactured by ZEON CORPORATION) or ARTON (manufactured by JSR); and a general-purpose thermoplastic polymer such as polycarbonate or PMMA, may, for example, be mentioned. Among them, it is preferred to employ silica particles of nano size, since it is thereby possible to maintain the transparency. Further, it is preferred to use a polymer having a structure similar to an ultraviolet curable monomer, since it is thereby possible to dissolve the polymer to a high concentration.

Further, a silane coupling agent may be incorporated. For example, vinyl trichlorosilane, vinyl tris(β-methoxyethoxy)silane, vinyl triethoxysilane, vinyl trimethoxysilane, γ-((meth)acryloxypropyl)trimethoxysilane, β-(3,4-epoxycyclohexyl)ethyl trimethoxysilane, γ-glycidoxypropyl trimethoxysilane, γ-glycidoxypropylmethyl diethoxysilane, N-β(aminoethyl)-γ-aminopropyl trimethoxysilane, N-β(aminoethyl)-γ-aminopropylmethyl dimethoxysilane, γ-aminopropyl trimethoxysilane, N-phenyl-γ-aminopropyl trimethoxysilane, γ-merpcatopropyl trimethoxysilane or γ-chloropropyl trimethoxysilane may be mentioned. Among them, γ-((meth)acryloxypropyl)trimethoxysilane, γ-((meth)acryloxypropyl)methyl dimethoxysilane, γ-((meth)acryloxypropyl)methyl diethoxysilane, γ-((meth)acryloxypropyl)triethoxysilane, γ-(acryloxypropyl)trimethoxysilane or the like has a (meth)acryl group in its molecule and thus is preferred in a case where a (meth)acrylate is employed, since it can be copolymerized therewith. The silane coupling agent is incorporated usually in an amount of from 0.1 to 50 wt %, based on the total weight of the matrix material. It is preferably from 1 to 20 wt %, particularly preferably from 1 to 20 wt %. If it is less than 0.1 wt %, no adequate effect by its incorporation can be obtained, and if it exceeds 50 wt %, an optical property such as transparency of the cured product is likely to be impaired.

The curable composition to combine the resin to the cellulose nonwoven fabric can be polymerized and cured by a known method to obtain a cured product.

For example, thermal setting or radiation curing may be mentioned, and preferred is radiation curing. The radiation may, for example, be infrared rays, visible rays, ultraviolet rays and electron rays, preferably light, more preferably light having a wavelength of from about 200 nm to 450 nm, further preferably ultraviolet rays having a wavelength of from 300 to 400 nm.

Specifically, it may, for example, be a method wherein a thermal polymerization initiator to generate radicals under heating is preliminarily added to the curable composition, followed by heating for polymerization (hereinafter sometimes referred to as "thermal polymerization"), a method wherein a photopolymerization initiator to generate radicals or an acid under irradiation with radiation such as ultraviolet rays is preliminarily added to the curable composition, followed by irradiation with the radiation for polymerization (hereinafter sometimes referred to as "photopolymerization"), or a method wherein a thermal polymerization initiator and a photopolymerization initiator are preliminarily added together, followed by polymerization by the combination of heat and light. In the present invention, photopolymerization is more preferred.

As the photopolymerization initiator, a photoradical-generating agent or a photocation polymerization initiator is usually employed. Photopolymerization initiators may be used alone or in combination as a mixture of two or more of them. As the photoradical-generating agent, a compound known to be useful for this application may be used. For example, benzophenone, benzoin methyl ether, benzoin propyl ether, diethoxyacetophenone, 1-hydroxycyclohexyl phenyl ketone, 2,6-dimethylbenzoyldiphenylphosphine oxide or 2,4,6-trimethylbenzoyldiphenylphosphine oxide may, for example, be mentioned. Among them, benzophenone or 2,4,6-trimethylbenzoyldiphenylphosphine oxide is preferred.

The photocation polymerization initiator is a compound to initiate cation polymerization when irradiated with active energy rays such as ultraviolet rays or electron rays. For example, an aromatic sulfonium salt as a photopolymerization initiator may be bis[4-(diphenylsulfonio)phenyl]sulfide bishexafluorophosphate, bis[4-(diphenylsulfonio)phenyl] sulfide bishexafluoroantimonate, bis[4-(diphenylsulfonio) phenyl]sulfide bishexafluoroborate, bis[4-(diphenylsulfonio) phenyl]sulfide tetrakis(pentafluorophenyl)borate, diphenyl-4-(phenylthio)phenylsulfoniumhexafluoro, diphenyl-4-(phenylthio)phenylsulfoniumhexafluoroantimonate, diphenyl-4-(phenylthio)phenylsulfoniumtetrafluoroborate, diphenyl-4-(phenylthio)phenylsulfoniumtetrakis(pentafluorophenyl)borate, triphenylsulfoniumhexafluorophosphate, triphenylsulfoniumhexafluoroantimonate, triphenylsulfoniumtetrafluoroborate, triphenylsulfoniumtetrakis(pentafluorophenyl)borate, bis[4-(di(4-(2-hydroxyethoxy))phenylsulfonio)phenyl]sulfide bishexafluorophosphate, bis[4-(di(4-(2-hydroxyethoxy))phenylsulfonio)phenyl]sulfide bishexafluoroantimonate, bis[4-(di(4-(2-hydroxyethoxy)) phenylsulfonio)phenyl]sulfide tetrafluoroborate, or bis[4-(di (4-(2-hydroxyethoxy))phenylsulfonio)phenyl]sulfide tetrakis(pentafluorophenyl)borate. An aromatic iodonium salt as a photopolymerization initiator may, for example, be diphenyliodonium hexafluorophosphate, diphenyliodonium hexafluoroantimonate, diphenyliodonium tetrafluoroborate, diphenyliodonium tetrakis(pentafluorophenyl)borate, bis (dodecylphenyl)iodonium hexafluoroantimonate, bis(dodecylphenyl)iodonium tetrakis(pentafluorophenyl)borate, 4-methylphenyl-4-(1-methylethyl)phenyliodonium hexafluorophosphate, 4-methylphenyl-4-(1-methylethyl) phenyliodonium hexafluoroantimonate, 4-methylphenyl-4-(1-methylethyl)phenyliodonium hexafluoroborate or 4-methylphenyl-4-(1-methylethyl)phenyliodonium tetrakis (pentafluorophenyl)borate. An aromatic diazonium salt as a photopolymerization initiator may, for example, be phenyldiazonium hexafluorophosphate, phenyldiazonium hexafluoroantimonate, diphenyliodonium tetrafluoroborate or diphenyliodonium tetrakis(pentafluorophenyl) borate. An aromatic ammonium salt as a photopolymerization initiator may, for example, be 1-benzyl-2-cyanopyridinium hexafluorophosphate, 1-benzyl-2-cyanopyridinium hexafluoroantimonate, 1-benzyl-2-cyanopyridinium tetrafluoroborate, 1-benzyl-2-cyanopyridinium tetrakis(pentafluorophenyl)borate, 1-(naphthylmethyl)-2-cyanopyridinium hexafluorophosphate, 1-(naphthylmethyl)-2-cyanopyridinium hexafluoroantimonate, 1-(naphthylmethyl)-2-cyanopyridinium tetrafluoroborate or 1-(naphthylmethyl)-2-cyanopyridinium tetrakis(pentafluorophenyl)borate. A (2,4-cyclopentadien-1-yl)[(1-methylethyl)benzene]-iron salt as a photopolymerization initiator may, for example, be (2,4-cyclopentadien-1-yl) [(1-methylethyl)benzene]-iron(II) hexafluorophosphate, (2,4-cyclopentadien-1-yl)[(1-methylethyl)benzene]-iron(II) hexafluoroantimonate, (2,4-cyclopentadien-1-yl)[(1-methylethyl)benzene]-iron(II) tetrafluoroborate or (2,4-cyclopentadien-1-yl)[(1-methylethyl)benzene]-iron(II) tetrakis(pentafluorophenyl)borate. Commercial products of such photocation polymerization initiators include, for example, UVI6990 and UVI6979 manufactured by Union Carbide Corporation; SP-150, SP-170 and SP-172 manufactured by ADEKA; IRGACURE 261 and IRGACURE 250 manufactured by Ciba Geigy; RHODORSIL PI2071 and JMF-2456 manufactured by RHODIA; and San-Aid SI-60L, SI-80L, SI-100L, SI-110L, SI-180L and SI-100L manufactured by SANSHIN CHEMICAL INDUSTRY CO., LTD.

Such photocation polymerization initiators may be used alone or in combination as a mixture of two or more of them.

The amount is not particularly limited, but it is usually at least 0.01 part by weight, preferably at least 0.1 part by weight, more preferably at least 0.5 part by weight, per 100 parts by weight of the total amount of the oxetane resin and the epoxy resin monomer. Its upper limit is usually 10 parts by weight, preferably 5 parts by weight, more preferably 1 part by weight. If the amount of the photopolymerization initiator is too much, the polymerization proceeds rapidly, whereby not only the birefringence of the obtained resin molded product tends to be large, but also its hue tends to deteriorate. Further, due to absorption by the initiator, light will not reach the opposite side of the irradiation with light, whereby a non-cured portion will result. Further, the product tends to be colored yellow, and deterioration of the hue becomes substantial. On the other hand, if the irradiation with light is too little, the polymerization may not sufficiently proceed.

Further, in addition to the photocation polymerization initiator, a curing agent to cure the epoxy resin or the oxetane resin may be added. For example, an amine compound, a polyaminoamide compound prepared from an amine compound, a tertiary amine compound, an imidazole compound, a hydrazide compound, a melamine compound, an acid anhydride, a phenol compound, a latent heat cation polymerization catalyst, dicyanamide or a derivative thereof may, for example, be mentioned. Such curing agents may be used alone or in combination as a mixture of two or more of them. The latent heat cation polymerization catalyst may, for example, be ADEKA OPTON CP-66 or CP-77 (manufactured by ADEKA), San-Aid SI-15, SI-20, SI-25, SI-40, SI-45, SI-47, SI-60, SI-80, SI-100, SI-100L, SI-110L, SI-145, SI-150, SI-160 or SI-180L (manufactured by SANSHIN CHEMICAL INDUSTRY CO., LTD.).

Further, a photosensitizer may be incorporated. Specifically, pyrene, perylene, acridine orange, thioxanthone, 2-chlorothioxanthone or benzoflavin may, for example, be mentioned. A commercially available photosensitizer may, for example, be ADEKA IPTOMER SP-100 (manufactured by ADEKA).

The amount of the photopolymerization initiator is usually at least 0.001 part by weight, preferably at least 0.01 part by weight, more preferably at least 0.05 part by weight, per 100 parts by weight of the total of the polymerizable compounds in the curable composition. Its upper limit is usually 5 parts by weight, preferably 1 part by weight, more preferably 0.1 part by weight. If the amount of the photopolymerization initiator is too much, the polymerization tends to proceed rapidly, whereby not only the birefringence of the obtainable resin molded product tends to large, but also its hue tends to deteriorate. For example, if the concentration of the initiator exceeds 5 parts by weight, due to the absorption by the initiator, light will not reach the opposite side of the irradiation with ultraviolet rays, whereby a non-cured portion is likely to result. Further, the product tends to be colored yellow, and deterioration of the hue tends to be substantial. On the other hand, if the concentration is too low, even if irradiation with ultraviolet rays is carried out, the polymerization may not sufficiently proceed.

The thermal polymerization initiator may, for example, be a hydroperoxide, a dialkyl peroxide, a peroxyester, a diacyl peroxide, a peroxycarbonate, a peroxyketal or a ketone peroxide. Specifically, benzoyl peroxide, diisopropyl peroxycarbonate, t-butyl peroxy(2-ethylhexyanoate)dicumyl peroxide, di-t-butyl peroxide, t-butyl peroxybenzoate, t-butyl hydroperoxide, diisopropylbenzene hydroperoxide or 1,1,3,3-tetramethylbutyl hydroperoxide may, for example, be employed. If thermal polymerization is initiated during irradiation with light, it becomes difficult to control the polymerization. Therefore, such a thermal polymerization initiator preferably has a one minute half life temperature of at least 120° C. Such polymerization initiators may be used alone or in combination as a mixture of two or more of them.

The quantity of radiation to be irradiated is optional within a range where the photopolymerization initiator generates radicals or cation species. However, if it is extremely small, the polymerization tends to be incomplete, whereby the thermal resistance and mechanical properties of the cured product tend to be insufficient. On the other hand, if it is extremely excessive, deterioration by light such as yellowing of the cured product is likely to result. Therefore, it is preferred to apply ultraviolet rays of from 300 to 450 nm within a range of from 0.1 to 200 $J/cm^2$ depending upon the monomer composition and the type and amount of the photopolymerization initiator. Further preferably, such ultraviolet rays are applied within a range of from 1 to 20 $J/cm^2$. It is more preferred to apply the radiation as divided into a plurality of times. Namely, in the first irradiation, from about 1/20 to 1/3 of the total amount of irradiation is applied, and the necessary residual amount is applied in the second and subsequent irradiation, whereby a cured product having a smaller birefringence can be obtained. Specific examples of the lamp to be used include a metal halide lamp, a high pressure mercury lamp, an ultraviolet LED lamp and an electrodeless mercury lamp.

For the purpose of promptly complete the polymerization, photopolymerization and thermal polymerization may be carried out simultaneously. In such a case, the curable composition is heated within a range of from 30 to 300° C., while being simultaneously irradiated with radiation, to carry out curing. In such a case, a thermal polymerization initiator may be added to the curable composition to complete the polymerization. However, if it is added in a large amount, such brings about an increase of the birefringence and deterioration of the hue of the cured product. Therefore, the thermal polymerization initiator is used in an amount of from 0.1 to 2 wt %, more preferably from 0.3 to 1 wt %, based on the total amount of the curable resin monomer component.

<Physical Properties>

In the present invention, among such matrix materials, an amorphous synthetic polymer is particularly preferred in order to obtain a highly durable fiber composite excellent in transparency. With respect to the amorphous degree, one having a crystallinity of at most 10%, particularly at most 5%, is preferred. Further, in order to obtain a low water absorptive composite, it is preferred to select a matrix material containing a less amount of hydrophilic functional groups such as hydroxy groups, carboxy groups or amino groups.

Here, the crystallinity can be calculated from the densities of the amorphous portion and the crystalline portion.

[Method for Combining Fibers and Matrix Material]

The method for combining the fibers and the matrix material is not particularly limited, and specifically, the following methods may be mentioned.

The description will be made with reference to a cellulose nonwoven fabric, sheet or particles, as a typical example of the fibers. However, other fibers may also be combined by the same methods.

The following methods (a) to (h) may be mentioned as methods to obtain the polymer cellulose composite of the present invention.

(a) A method of impregnating a monomer to a cellulose nonwoven fabric, sheet or particles, followed by polymerization.

(b) A method of impregnating a thermosetting resin precursor or a photocurable resin precursor to a cellulose nonwoven fabric, sheet or particles, followed by curing.

(c) A method of impregnating a resin solution to a cellulose nonwoven fabric, sheet or particles, followed by drying and then by bonding by e.g. hot pressing.

(d) A method of impregnating a melt of a thermoplastic resin to a cellulose nonwoven fabric, sheet or particles, followed by bonding by e.g. hot pressing.

(e) A method of alternately laminating a thermoplastic resin sheet and a cellulose nonwoven fabric or sheet, followed by bonding by e.g. hot pressing.

(f) A method of applying a monomer, a thermosetting resin precursor or a photocurable resin precursor on one side or both sides of a cellulose nonwoven fabric or sheet, followed by curing.

(g) A method of applying a resin solution to one side or both sides of a cellulose nonwoven fabric or sheet, followed by removing the solvent to form a composite.

(h) A method of melt-kneading cellulose particles and a thermoplastic resin, followed by molding into a sheet shape or a desired shape.

Among them, to the cellulose nonwoven fabric, the method (a), (b), (c) or (d) is preferred, to the cellulose sheet, the method (e), (f) or (g) is preferred, and to the cellulose fiber particles, the method (h) is preferred.

The method (a) of impregnating a monomer followed by polymerization, may be a method of impregnating a polymerizable monomer or oligomer to a cellulose nonwoven fabric, sheet or particles and polymerizing the monomer or oligomer by e.g. thermal treatment to obtain a polymer cellulose composite. Usually, a polymerization catalyst to be used for the polymerization of a monomer may be used as a polymerization initiator.

The method (b) of impregnating a thermosetting resin precursor or a photocurable resin precursor, followed by curing, may be a method of impregnating a thermosetting resin precursor such as an epoxy resin monomer, or a mixture of a photocurable resin precursor such as an acryl resin monomer and a curing agent, to a cellulose nonwoven fabric, sheet or particles and curing the thermosetting resin precursor or photocurable resin precursor by e.g. heat or active energy rays to obtain a polymer cellulose composite.

The method (c) of impregnating a resin solution, followed by drying and then by bonding by e.g. hot pressing, may be a method of dissolving a resin in a solvent, impregnating such a solution to a cellulose nonwoven fabric, sheet or particles, followed by drying to obtain a high molecular weight cellulose composite. In such a case, a method for obtaining a high performance composite may be mentioned wherein after drying, void spaces formed by drying the solvent are closed by e.g. hot pressing.

The method (d) of impregnating a melt to a thermoplastic resin, followed by bonding by e.g. hot pressing, may be a method wherein the thermoplastic resin is melted by thermal treatment at a temperature of at least the glass transition temperature or the melting point and impregnated to a cellulose nonwoven fabric, sheet or particles, followed by bonding by e.g. hot pressing to obtain a polymer cellulose composite. The thermal treatment is preferably carried out under pressure, and it is effective to use an installation having a vacuum hot pressing function.

The method (e) of alternately laminating a thermoplastic resin sheet and a cellulose nonwoven fabric or sheet, followed by bonding by e.g. hot pressing, may be a method wherein a thermoplastic resin film or sheet is disposed on one side or both sides of the cellulose nonwoven fabric or sheet, followed by hot pressing as the case requires, to bond the thermoplastic resin to the cellulose nonwoven fabric or sheet. In such a case, an adhesive or primer may, for example, be applied to the surface of the cellulose nonwoven fabric or sheet, followed by bonding. In order not to include air bubbles at the time of bonding, it is possible to employ a method of passing though a pair of rolls under pressure or a method of pressing under a vacuum condition.

The method (f) of applying a monomer, a thermosetting resin precursor or a photocurable resin precursor on one side or both sides of a cellulose nonwoven fabric or sheet, followed by curing, may be a method wherein a thermosetting resin precursor using a thermal polymerization initiator is applied to one side or both sides of a cellulose nonwoven fabric or sheet, followed by heating for curing to bond them, or a method wherein a curable resin precursor using a photopolymerization initiator is applied to one side or both sides of a cellulose nonwoven fabric or sheet, followed by irradiation with active energy rays such as ultraviolet rays for curing. After applying a thermosetting or photocurable resin precursor on a cellulose-nonwoven fabric or sheet, a cellulose-nonwoven fabric may further be overlaid to form a multilayer structure, which may then be cured.

The method (g) of applying a resin solution on one side or both sides of a cellulose nonwoven fabric or sheet, followed by removing the solvent to form a composite, may be a method wherein a resin solution having a solvent-soluble resin dissolved is prepared and applied to one side or both sides of a cellulose nonwoven fabric or sheet, followed by removing the solvent by heating.

A plurality of composites of the cellulose fibers and resin thus produced may be overlaid to obtain a laminate. At that time, a resin sheet not containing the composite containing the cellulose fibers may be laminated. In order to bond the composites to one another, or a resin and a composite, an adhesive may be applied, or an adhesive sheet may be interposed. Otherwise, the laminate may be subjected to hot press treatment for integration.

The method (h) of melt-kneading cellulose particles and a thermoplastic resin, followed by molding into a sheet or a desired shape, may preferably be a method of dry blending cellulose particles and a thermoplastic resin, followed by melting, or a method of melt kneading them. In the method of dry blending followed by melting, the two are uniformly mixed by e.g. a tumbler blender, a ribbon blender, a V-form blender or a Henschel mixer, and then, an additive such as an antioxidant may be added to the mixture, as the case requires, followed by forming into a composite via a molten state. Specifically, such a mixture is, for example, simply melted or melt-kneaded by e.g. a single screw or twin screw extruder, a roll mill, a Banbury mixer, a kneader or a blender. In the case of melt kneading, the two are melt-kneaded together with an additive such as an antioxidant which may be used as the case requires.

For example, the melt kneading is carried out by means of a single screw or twin screw extruder, a roll mill, a Banbury mixer, a kneader or a blender. Thereafter, the mixture is extruded from a T-die to form a sheet or injected into a mold to form it into a desired shape.

In the present invention, a plurality of composites may be overlaid to obtain a laminate. At that time, a resin sheet not containing a composite containing cellulose fibers may be laminated. By subjecting the laminate to hot press treatment, the laminate can be made thick. Such a thick composite material may be used for glazing or as a structural material.

[Physical Properties of Cellulose Fiber Composite]

Now, the physical properties of the cellulose fiber composite of the present invention will be described.

<Cellulose Content>

The content of cellulose fibers in the cellulose fiber composite of the present invention is usually at least 1 wt % and at most 99 wt %, and the content of the matrix material is at least 1 wt % and at most 99 wt %. To obtain the low property of linear thermal expansion, the content of cellulose fibers is at least 1 wt %, and the content of the matrix material is at most 99 wt %. To obtain the transparency, the content of cellulose fibers is at most 99 wt %, and the content of the matrix material is at least 1 wt %. With respect to preferred ranges, the content of cellulose fibers is from 2 wt % to 90 wt %, and the content of the matrix material is from 10 wt % to 98 wt %. With respect to more preferred ranges, the content of cellulose fibers is from 5 wt % to 80 wt %, and the content of the matrix material is from 20 wt % to 95 wt %. Especially, in the cellulose fiber composite of the present invention, it is preferred that the content of cellulose fibers is at most 70 wt %, and the content of the matrix material is at least 30 wt %, more preferably the content of the cellulose fibers is at most 60 wt %, and the content of the matrix material is at least 40 wt %. Further, it is preferred that the content of the cellulose fibers is at least 10 wt %, and the content of the matrix material is at most 90 wt %, more preferably the content of the cellulose fibers is at least 15 wt %, and the content of the matrix material is at most 85 wt %, further preferably the content of the cellulose fibers is at least 20 wt %, and the content of the matrix material is at most 80 wt %.

The contents of the cellulose fibers and the matrix material in the cellulose fiber composite can be obtained, for example, from the weight of the cellulose nonwoven fabric before impregnation of the resin as the matrix material and the weight of the cellulose fiber composite after the impregnation. Further, the cellulose fiber composite may be immersed in a solvent in which the matrix resin is soluble to remove only the resin, and the contents can be obtained from the weight of the remained cellulose nonwoven fabric. Otherwise, the contents may be obtained by a method of obtaining them from the specific gravity of the resin or by quantitatively analyzing functional groups of the resin or cellulose by means of NMR or IR.

<Thickness>

The thickness of the cellulose fiber composite of the present invention is preferably at least 10 μm and at most 10 cm. By making the cellulose fiber composite to have such a thickness, the strength can be maintained. The thickness of the cellulose fiber composite is more preferably at least 50 μm and at most 1 cm, further preferably at least 80 μm and at most 250 μm.

Further, the cellulose fiber composite of the present invention is preferably in a membrane form (film form) or a plate form having such a thickness, but it is not limited to a flat membrane or flat plate and may be in a membrane form or a plate form having a curved surface. Further, it may be in another irregular shape. Further, the thickness may not necessarily be uniform and may be partially varied.

<Yellowness>

The cellulose fiber composite of the present invention has a characteristic such that the yellowness index (YI value) is at most 20 as measured in accordance with JIS K7105 after the cellulose fiber composite having a thickness of 100 μm is heated at 190° C. under an oxygen partial pressure of at most 0.006 MPa for 1 hour. Such a yellowness index is more preferably at most 10, further preferably at most 5.

The yellowness index of the cellulose fiber composite can be measured, for example, by means of a color computer manufactured by Suga Test Instruments Co., Ltd.

The cellulose to be used for the cellulose fiber composite of the present invention may sometimes take on a yellow tinge derived from the raw material. Especially when a raw material derived from wood is employed, it may take on a yellow tinge depending upon the refining degree. Once cellulose fibers take on a yellow tinge, the composite will also be thereby influenced and may take on a yellow tinge, such being undesirable. Further, due to the resin to be combined, the composite may take on a yellow tinge. In the present invention, for example, cellulose fibers are chemically modified, or a matrix material having high transparency is employed, to obtain a cellulose fiber composite substantially free from such coloration.

<Haze>

The cellulose fiber composite of the present invention is a composite having high transparency i.e. a small haze, since cellulose fibers having a fiber diameter less than the wavelength of visible light are used. The haze value of the cellulose fiber composite of the present invention is at most 5, preferably at most 3, more preferably at most 2, particularly preferably at most 1, as a value measured with respect to the cellulose fiber composite having a thickness of 100 µm in accordance with JIS K7136, so that it is useful as a transparent material for various applications. The haze of the cellulose fiber composite can be measured, for example, by a haze meter manufactured by Suga Test Instruments Co., Ltd., whereby a value of illuminant C is employed.

<Water Absorption>

The cellulose fiber composite of the present invention is characterized in that it is a composite having a low water absorption such that the water absorption is at most 1% as measured with respect to the cellulose fiber composite having a thickness of 100 µm in accordance with JIS K7209 (method D). Such a water absorption is preferably at most 0.8%, more preferably at most 0.5%, particularly preferably at most 0.3%. If the water absorption exceeds 1%, when a composite dehydrated in the manufacturing process is left to stand in air, it absorbs moisture and will thereby be elongated to undergo a dimensional change, such being undesirable.

<Total Light Transmittance>

The cellulose fiber composite of the present invention preferably has a total light transmittance of at least 60%, more preferably at least 70%, particularly preferably at least 80%, at least 82%, at least 84%, at least 86%, at least 88%, especially at least 90%, as measured with respect to the cellulose fiber composite having a thickness of 50 µm in its thickness direction in accordance with JIS K7105. If such a total light transmittance is less than 60%, the composite tends to be translucent or opaque, and it may become difficult to use it in an application where the transparency is required. The total light transmittance can be measured by using, for example, a haze meter manufactured by Suga Test Instruments Co., Ltd., whereby a value of illuminant C is employed.

<Parallel Light Transmittance>

Further, the parallel light transmittance is measured with respect to the fiber composite having a thickness of 50 µm in its thickness direction in accordance with JIS K7105. The parallel light transmittance is preferably at least 57%, at least 70%, particularly preferably at least 80%, especially preferably at least 89%. If such a parallel light transmittance is lower than 57%, scattered light tends to be substantial, and the haze tends to be high, and, for example, in an application to an organic light-emitting diode device, pixels tend to be vague, and the color tends to fade or bleed. The parallel light transmittance can be measured by using, for example, a haze meter manufactured by Suga Test Instruments Co., Ltd., whereby a value of illuminant C is employed.

<Coefficient of Linear Thermal Expansion>

The cellulose fiber composite of the present invention is preferably a composite having a low coefficient of linear thermal expansion at a level of from 1 to 50 ppm/K. The coefficient of linear thermal expansion of the cellulose fiber composite of the present invention is more preferably at most 30 ppm/K, particularly preferably at most 20 ppm/K. That is, for example, in an application to a substrate, the coefficient of linear thermal expansion of an inorganic thin film transistor is at a level of 15 ppm/K. Therefore, if the coefficient of linear thermal expansion of the cellulose fiber composite exceeds 50 ppm/K, at the time of lamination with the inorganic film, the difference in the coefficient of linear thermal expansion between the two layers becomes so large that cracks, etc. tend to form. Therefore, the coefficient of linear thermal expansion of the cellulose fiber composite of the present invention is particularly preferably from 5 to 20 ppm/K.

Here, the coefficient of linear thermal expansion is measured by the method disclosed in Examples given hereinafter.

<Volume Percent of Matrix Material-Filled Portion>

In the cellulose fiber composite of the present invention, void spaces in the cellulose nonwoven fabric used, are filled with the matrix material at the time of forming the composite. Accordingly, the porosity at the cellulose portion of the cellulose fiber composite of the present invention, i.e. the volume percent of the matrix material-filled portion, is preferably at least 35 vol %, more preferably at least 35 vol % and at most 60 vol %.

As mentioned above, the porosity of the cellulose portion of the cellulose fiber composite can be measured by e.g. a spectroscopic analysis or an image analysis under SEM observation or TEM observation of the cross section of the composite.

<Tensile Strength>

The cellulose fiber composite of the present invention has a tensile strength of preferably at least 40 MPa, more preferably at least 100 MPa. If the tensile strength is lower than 40 MPa, no adequate strength tends to be obtainable, such being influential over its use in an application where a force is exerted, such as a structural material.

<Tensile Modulus of Elasticity>

The cellulose fiber composite of the present invention has a tensile modulus of elasticity of preferably from 0.2 to 100 GPa, more preferably from 1 to 50 GPa. If the tensile modulus of elasticity is lower than 0.2 GPa, no adequate strength tends to be obtainable, such being influential over its use in an application where a force is exerted, such as a structural material.

The cellulose fiber composite of the present invention is characterized in that it comprises fibers having an average fiber diameter of at most 30 nm and a matrix material and has a haze of at most 5 as measured with respect to the fiber composite having a thickness of 100 µm in accordance with JIS K7136. In a case where such a fiber composite is used as a substrate for displays, high transparency, a low coefficient of linear thermal expansion and sufficient elastic modulus are required. If the transparency is low, the obtainable image is dark and has a low contrast. If the coefficient of linear thermal expansion is high, when heated in a process for producing a display, due to a difference in the coefficient of thermal expansion between the substrate and the transistor mounted on the substrate, the transistor is likely to break, or the substrate is likely to warp or bend. If the elastic modulus is low, the substrate is likely to be bent by its own weight, and it becomes difficult to form a flat surface. Therefore, it becomes difficult to form a transistor or other elements with good precision. On the other hand, if the elastic modulus is too high, the substrate tends to be hard and brittle, thus leading to such a trouble that the substrate itself will break. Further, in the case of a composite containing fibers, if the fiber diameter is large, when the fibers are exposed on the surface of the substrate, the irregularities of the surface become large. If the smoothness of the surface is poor, such will be a cause of dark spots in the case of an organic light-emitting diode device. From such a viewpoint, the average fiber diameter is required to be at most 30 nm. Further, in the transparency, the parallel light transmittance is important.

If the parallel light transmittance is low i.e. if the scattering of light is substantial or the haze is high, the pixels tend to be vague, and the color tends to fade or bleed. In the case of a composite containing fibers, if the fiber diameter is not sufficiently small as compared with the wavelength of light, scattering of light is likely to result. From such a viewpoint, the haze is required to be at most 5. If the average fiber diameter is large or the haze is large, such is problematic in that the surface smoothness deteriorates, or the parallel light transmittance decreases.

[Uses]

The cellulose fiber composite of the present invention can be made to be a composite having high transparency, high strength, low water absorption and small haze and is excellent in optical properties, and thus, it is suitable for a display, substrate or panel for e.g. liquid crystal displays, plasma displays, organic light-emitting diode displays, field emission displays, rear projection TV, etc. Further, it is suitable for a substrate for solar cells such as silicon solar cells or the dye-sensitized solar cells.

In its use as a substrate, a barrier layer, ITO, TFT or the like may be laminated. Further, it is useful as a window material for automobiles, a window material for railway vehicles, a window material for houses or a window material for offices or plants. As a window material, a film such as a fluorinated coating film or a hard coat film, or an impact resistant or light resistant material may be laminated, as the case requires.

Further, taking advantage of its properties such as a low coefficient of linear thermal expansion, high elasticity, high strength, etc., it can be used also as a structural material. It is particularly useful as a material for automobiles, such as glazing, an interior material, an external plate or a bumper, a casing for a personal computer, a home electrical component, a packaging material, a building material, a construction material, a fishery material or other industrial materials.

EXAMPLES

Now, the present invention will be described in further detail with reference to Preparation Examples, Working Examples and Comparative Examples, but it should be understood that the present invention is by no means restricted by the following Examples. In the following, the physical properties, etc. of the prepared samples were measured or evaluated by the following measuring or evaluating methods.

<Cellulose Concentration of Cellulose Dispersion>

For the measurement of the concentration of cellulose contained in a cellulose dispersion, the water content (%) was obtained in accordance with JAPAN TAPPI No. 56 "Determination of moisture content for analysis", and the water content was deducted from 100% to obtain the cellulose fiber concentration. That is, when the weight of the cellulose dispersion before drying is S (g), and the weight after drying the dispersion at 105° C.±2° C. for 2 hours, followed by cooling to room temperature in a desiccator, is L (g), the water content M (%) can be obtained by the following formula, and the cellulose concentration C (%) can also be obtained.

$$M=(S-L)/S \times 100$$

$$C=100-M$$

<Measurement of Viscosity of Cellulose Dispersion>

With respect to a cellulose dispersion, the viscosity was measured as follows. Using as a viscoelasticity-measuring apparatus, ARES100FRT manufactured by RHEOMETRIC SCIENTIFIC, a cellulose dispersion adjusted to a predetermined concentration was dropped in an amount of 1.5 ml on a stage adjusted to 25° C.±0.1° C., and cone-plates having a diameter of 50 mm and an angle of 0.04 rad were set with a gap of 50 μm, whereupon the steady shear viscosity was measured while raising the shear rate to 1, 2, 3, 5, 8, 13, 20, 32, 50, 80 and 126 $s^{-1}$, to obtain a steady shear viscosity at the time when the shear rate was 10 $s^{-1}$.

<Cellulose Residual Ratio in Cellulose Dispersion>

As a centrifugal separator, himac CR22G manufactured by Hitachi Koki Co., Ltd. was used, and as an angle rotor, R20A2 was used. Eight centrifuging tubes of 50 ml were set at an angle of 34° from the axis of rotation. The amount of a cellulose dispersion put in one centrifuging tube was 30 ml. The centrifugal separation was carried out at 18,000 rpm for 30 minutes. At that time, the centrifugal force of the rotor was calculated to be 38,900 G. After the centrifugal separation, 3 ml of the upper portion of the centrifuging tube was sampled by a dropper, and the cellulose concentration was measured. The cellulose concentration contained in the 10% supernatant after the centrifugal separation was divided by the cellulose concentration before the centrifugal separation to obtain a value, which was multiplied by 100 to obtain the cellulose residual ratio (%).

<Average Fiber Diameter of Cellulose Fibers in Cellulose Dispersion>

The fiber diameter of cellulose fibers in a cellulose dispersion before ultrasonic treatment was confirmed by an optical microscope. The fiber diameter of cellulose fibers in the cellulose dispersion after ultrasonic treatment was obtained by removing the dispersion medium in the dispersion by drying, followed by measurement by observation under e.g. SEM or TEM. An average of measured values at 10 points excluding the maximum and minimum among randomly selected 12 points, was taken as the average fiber diameter.

<Visible Light Transmittance of Cellulose Dispersion>

A cellulose dispersion was diluted with water to adjust the cellulose concentration to be 0.1 wt %. Using spectrophotometer U4000 manufactured Hitachi, Ltd. and a quartz cell having an optical path length of 10 mm, water was put as a reference, and a cellulose dispersion having the concentration adjusted as described above was put as a sample, whereupon the light transmittance spectra at wavelengths of from 300 nm to 900 nm were measured.

<Haze of Cellulose Nonwoven Fabric>

With respect to the obtained cellulose nonwoven fabric, the haze value by illuminant C was measured by using a haze meter manufactured by Suga Test Instruments Co., Ltd. in accordance with JIS K7136.

<Thick Fiber Content in Cellulose Nonwoven Fabric>

The cellulose nonwoven fabric is cut into a proper size and impregnated with an impregnation oil (IMMERSION OIL TYPE B, manufactured by CARGILLE LABORATORIES; refractive index: 1.52) on a slide glass and then covered with a cover glass. In this state, the sample was left to stand for 12 hours and then observed by a polarizing microscope (optical microscope manufactured by Nikon) to obtain the volume fraction of fibers having a fiber diameter of at least 400 nm in the total fibers. In the observation by the polarizing microscope, after selecting a visual field representing the sample shape, the sample was observed under a crossed Nicols condition, whereby while rotating the sample every 15°, it was photographed at from 10- to 40-fold magnification, and the photographs thereby obtained were combined to obtain an image of fiber shapes not depending on the in-plane orientation angle.

<SEM Observation of Surface of Cellulose Nonwoven Fabric>

A cellulose nonwoven fabric was cut into a proper size and fixed on a test table. By a magnetron sputtering apparatus (E-1030, manufactured by Hitachi, Ltd.), a platinum palladium vapor deposition was carried out in a thickness of about 20 Å. Using scanning electron microscopes (S-4100 and S-4500, manufactured by Hitachi, Ltd.), the shape of fibers was observed at each of 50-, 100-, 1,000-, 10,000- and 50,000-fold magnifications. At that time, in order to reduce a damage to the sample, the acceleration voltage of the electron rays was adjusted to be from 1.5 to 2.0 kV. At each magnification, a visual field representing the sample shape was photographed.

[Chemical Modification Ratio of Cellulose Nonwoven Fabric]

0.05 g of a cellulose nonwoven fabric was accurately weighed, and 6 ml of methanol and 2 ml of distilled water are added thereto. The mixture is stirred at from 60 to 70° C. for 30 minutes, and then 10 ml of a 0.05 N sodium hydroxide aqueous solution is added thereto. This mixture is stirred at from 60 to 70° C. for 15 minutes and further stirred at room temperature for 1 day. The mixture is titrated by a 0.02 N hydrochloric acid aqueous solution by using phenolphthalein.

Here, from the amount Z (ml) of the 0.02 N hydrochloric acid aqueous solution required for the titration, the value Q (mol) of the substituent introduced by the chemical modification can be obtained by the following formula.

$$Q(\text{mol}) = 0.05(N) \times 10(\text{ml})/1000 - 0.02(N) \times Z(\text{ml})/1000$$

The relation between the value Q of this substituent and the chemical modification ratio X (mol %) can be calculated by the following formula (cellulose=$(C_6O_5H_{10})_n$=$(162.14)_n$, number of hydroxy groups per repeating unit=3, molecular weight of OH=17). In the following, T is the molecular weight of the substituent.

$$\frac{\text{Amount of sample}}{162.14 + (T-17) \times \frac{3X}{100}} = \frac{Q}{\frac{3X}{100}}$$

This formula is solved as follows.

$$X = \frac{100}{3} \times \frac{162.14 \times Q}{\{\text{Amount of sample} - Q \times (T-17)\}}$$

[Porosity of Cellulose Nonwoven Fabric]

The porosity was obtained by the following formula from the area, thickness and weight of a cellulose nonwoven fabric.

$$\text{Porosity(vol \%)} = \{1 - B/(M \times A \times t)\} \times 100$$

Here, A is the area ($cm^2$) of a nonwoven fabric, t (cm) is the thickness, B is the weight (g) of the nonwoven fabric, M is the density of the cellulose, and in the present invention, M=1.5 g/$cm^3$ is assumed. For the thickness of the cellulose nonwoven fabric, measurements at 10 points selected at various positions of the nonwoven fabric were carried out by using film thickness meter (IP65 manufactured by Mitsutoyo), and the average value was adopted.

[Fiber Diameter in Cellulose Fiber Composite]

The fiber diameter in a cellulose fiber composite can be ascertained as follows. For the fiber diameter of cellulose fibers in a resin cured product, the composite is fractured as it is or after cooling by e.g. liquid nitrogen as the case requires, to expose the fracture surface, and the fracture surface is observed by e.g. SEM or TEM. The fiber diameter of cellulose fibers can be obtained by averaging measured values of 10 points randomly selected. As a method for obtaining the average, a diagonal line is drawn on the observed SEM photograph, and 12 points of fibers in its vicinity are randomly selected, and an average value of 10 points excluding the thickest fiber and the finest fiber was calculated and taken as the average fiber diameter.

[Haze of Cellulose Fiber Composite or Resin Cured Product]

A haze value by illuminant C was measured by using a haze meter manufactured by Suga Test Instruments Co., Ltd. in accordance with JIS K7136.

[Total Light Transmittance of Cellulose Fiber Composite or Resin Cured Product]

A total light transmittance by illuminant C was measured by using a haze meter manufactured by Suga Test Instruments Co., Ltd. in accordance with JIS K7105.

[Parallel Light Transmittance of Cellulose Fiber Composite or Resin Cured Product]

A parallel light transmittance by illuminant C was measured by using a haze meter manufactured by Suga Test Instruments Co., Ltd. in accordance with JIS K7105.

[Yellowness Index of Cellulose Fiber Composite or Resin Cured Product]

The obtained composite was heated at 190° C. under vacuum (oxygen partial pressure: 0.004 MPa) for 1 hour, and then the yellowness index was measured by using color computer manufactured by Suga Test Instruments Co., Ltd. in accordance with JIS K7105.

[Tensile Modulus of Elasticity of Cellulose Fiber Composite and Glass Transition Temperature of Resin Cured Product]

The obtained composite was cut into a size of 10 mm in width×40 mm in length by a laser cutter. This sample was measured by using DMS6100 manufactured by SII. At a chuck distance of 20 mm in a tensile mode at a frequency of 10 Hz from −100° C. to 250° C. at a rate of 2° C./min; the tensile modulus of elasticity was measured by the storage elastic modulus E' (unit: GPa) at 23° C.; and the glass transition temperature was measured by tan δ.

[Coefficient of Linear Thermal Expansion of Cellulose Fiber Composite or Resin Cured Product]

The obtained composite was cut into a size of 3 mm in width×30 mm in length by a laser cutter. This sample was heated from room temperature to 180° C. at 5° C./min, then cooled from 180° C. to 25° C. at 5° C./min and again heated from 25° C. to 180° C. at 5° C./min, by using TMA120 manufactured by SII at a chuck distance of 20 mm in a tensile mode and a load of 10 g in a nitrogen atmosphere, whereby the coefficient of linear thermal expansion was obtained from the measured values from 60° C. to 100° C. during the second heating.

[Water Absorption of Cellulose Fiber Composite or Resin Cured Product]

In accordance with JIS 7209 (Method D), the obtained composite was left to stand for 24 hours in an oven at 50° C., and then, the weight ($W_0$) was measured. Thereafter, it was left to stand for 24 hours in an atmosphere at 23° C. under a humidity of 50% and then, the weight ($W_1$) was measured. The water absorption was calculated by the following formula.

$$\text{Water absorption}(\%) = (W_1 - W_0)/W_0 \times 100$$

The total light transmittance and the parallel light transmittance of a cellulose fiber composite or a resin cured product are values with respect to a cellulose fiber composite or a resin cured product having a thickness of 50 µm, and the yellowness, haze and water absorption are values with respect to a cellulose fiber composite or a resin cured product having a thickness of 100 µm. Therefore, in a case where the thickness of a cellulose fiber composite or a resin cured product produced in the following Example or Comparative Example was not 50 µm or 100 µm, the respective values were obtained by proportional calculations.

Preparation Example 1

Preparation of Cellulose Dispersion

Douglas fir (Oregon pine) wood powder (manufactured by Miyashita Co., Ltd.) having an average maximum length of 250 µm and an average minimum length of 50 µm was degreased at 80° C. with a 2 wt % sodium carbonate aqueous solution. The degreased wood powder was washed with demineralized water and then immersed in an aqueous solution containing 0.66 wt % of sodium chlorite and 0.14 wt % of acetic acid, at 80° C. for 5 hours, to remove lignin. The obtained product was washed with demineralized water and then subjected to filtration, and the recovered refined cellulose was washed with demineralized water and then immersed in a 5 wt % potassium hydroxide aqueous solution for 16 hours to remove hemicellulose. Thereafter, washing with demineralized water was carried out.

Preparation Example 2

Ultrahigh Pressure Homogenizer Treatment

The cellulose dispersion in Production Example 1 was adjusted to 0.5 wt % and subjected to treatment by a ultrahigh pressure homogenizer (Ultimaizer System manufactured by Sugino Machine Ltd.). The pressure during the treatment was 245 MPa, the pore diameter of the outlet was 150 µm, and the treatment was carried out 10 times. The average fiber diameter of cellulose in this cellulose dispersion was 15 nm as observed by TEM. Further, the cellulose in this dispersion was confirmed to have a cellulose type I crystal structure from the wide angle X-ray diffraction image.

Preparation Example 3

Preparation of Cellulose Nonwoven Fabric

The cellulose dispersion obtained in Preparation Example 2 was diluted with water so that the cellulose concentration would be 0.127 wt % and adjusted to 150 ml, and 30 ml of 2-propanol was gently added from above, followed by filtration under reduced pressure. As the filter, KG-90 manufactured by Advantec was used, and on a glass filter, a PTFE membrane filter having a pore diameter of 1.0 µm, manufactured by Advantec, was placed. The effective filtration area was 48 cm². The reduced pressure filtration was carried out under a reduced pressure degree of −0.09 MPa (absolute vacuum degree: 10 kPa), whereby a deposit of cellulose fibers was obtained on the PTFE membrane filter. Such a cellulose deposit was press-dried by a pressing machine heated to 120° C. under a pressure of 0.15 MPa for 5 minutes to obtain a cellulose nonwoven fabric.

Preparation Example 4

Preparation of Acetylated Cellulose Nonwoven Fabric

The cellulose nonwoven fabric obtained in Preparation Example 3 was immersed in 100 ml of acetic anhydride and heated at 100° C. for 7 hours. Then, it was thoroughly washed with distilled water and finally immersed in 2-propanol for 10 minutes. Then, it was press-dried at 120° C. under 2 MPa for 5 minutes to obtain an acetylated cellulose nonwoven fabric having a thickness of 62 µm.

The chemical modification ratio of this nonwoven fabric was 33 mol %. Further, the porosity was 56 vol %.

Further, by its SEM observation, it was confirmed that one having a fiber diameter of 500 nm or more was not contained. The average fiber diameter was 15 nm. Further, the fiber length was confirmed to be at least 100 nm. The yellowness index of the obtained acetylated cellulose nonwoven fabric was 11.4.

Preparation Example 5

Preparation of Acetylated Cellulose Nonwoven Fabric

The cellulose nonwoven fabric obtained in Preparation Example 3 was immersed in 100 ml of a solution of acetic anhydride:acetic acid=9:1 and left to stand still at room temperature for 5 days. Thereafter, it was thoroughly washed with distilled water and finally immersed in 2-propanol for 10 minutes. Then, it was press-dried at 120° C. under 0.14 MPa for 5 minutes to obtain an acetylated cellulose nonwoven fabric having a thickness of 38 µm. The chemical modification ratio of this nonwoven fabric was 7 mol %. Further, the porosity was 28 vol %.

Preparation Example 6

Preparation of Bacterial Cellulose Sheet

Nata de coco (manufactured by Fujicco Co., Ltd., thickness: 1 cm, fiber content: 1 vol %, water content: 99 vol %) which is a bacterial cellulose gel used as a foodstuff, was employed. Such a water-containing bacterial cellulose was immersed in 2-propanol and then press-dried at 120° C. under 0.14 MPa for 5 minutes to obtain a bacterial cellulose sheet having a thickness of 50 µm and a porosity of 42 vol %.

Example 1

The acetylated cellulose nonwoven fabric obtained in Preparation Example 4 was impregnated with a solution prepared by mixing 96 parts by weight of bis(methacryloyloxymethyl)tricycle[$5.2.1.0^{2,6}$]decane, 4 parts by of pentaerythritoltetrakis(β-thiopropionate), 0.05 part by weight 2,4,6-trimethylbenzoyldiphenylphosphine oxide (Lucirin TPO, manufactured by BASF) and 0.05 part by weight of benzophenone, and left to stand still over night under reduced pressure. The impregnated nonwoven fabric was sandwiched between a pair of glass plates and irradiated by an electrodeless mercury lamp ("bulb D" manufactured by Fusion UV Systems K.K.) while being passed under an irradiance of 400 mW/cm² at a line speed of 7 m/min. The UV energy at that time was 0.12 J/cm². This operation was carried out twice by turning over the glass surface. The temperature of the glass surface after the ultraviolet irradiation was 25° C. Then, it was irradiated under an irradiance of 1,900 mW/cm² at a line speed of 2 m/min. The UV energy at that time was 2.7 J/cm². This operation was carried out eight times by turning over the glass surface. The temperature of the glass surface after the ultraviolet irradiation was 44° C. The total UV energy was 21.8 J/cm². After completion of the ultraviolet irradiation, the glass plates were removed, and the product was heated at 190° C. for 1 hour in a vacuum oven to obtain a good cellulose fiber composite having a thickness of 96 μm. The obtained composite had a tensile modulus of elasticity of 8.1 GPa at 23° C. The physical properties are presented in Table 1.

For the irradiance of ultraviolet rays, the illuminance of ultraviolet rays of from 320 to 390 nm was measured at 23° C. by using an ultraviolet illuminometer "UV-M02" manufactured by ORC Manufacturing Co., Ltd. and using an attachment "UV-35".

Example 2

The acetylated cellulose nonwoven fabric obtained in Preparation Example 4 was impregnated with a mixed liquid comprising 100 parts by weight of hydrogenated bisphenol A epoxy resin YX8000 (manufactured by JER) being an epoxy compound of a photocurable resin precursor and 1 part by weight of a curing agent SP170 (manufactured by ADEKA) and left to stand still overnight under reduced pressure. The impregnated nonwoven fabric was sandwiched between a pair of glass plates and irradiated by the same lamp as in Example 1 while being passed under an irradiance of 1,900 mW/cm² at a line speed of 2 m/min. The UV energy at that time was 2.7 J/cm². This operation was carried out 12 times by turning over the glass surface. The temperature of the glass surface after the ultraviolet irradiation was 55° C. The total UV energy was 32.4 J/cm². After completion of the ultraviolet irradiation, the glass plates were removed, and the product was heated at 190° C. for 1 hour in a vacuum oven to obtain a good cellulose fiber composite having a thickness of 106 μm. The physical properties are presented in Table 1.

Example 3

The acetylated cellulose nonwoven fabric obtained in Preparation Example 4 was impregnated with a mixed liquid comprising 100 parts by weight of bisphenol A epoxy resin 828EL (manufactured by JER) being an epoxy compound of a photocurable resin precursor and 1 part by weight of a curing agent SP170 (manufactured by ADEKA) and left to stand still overnight under reduced pressure. The impregnated nonwoven fabric was sandwiched between a pair of glass plates and irradiated by the same lamp as in Example 1 while being passed under an irradiance of 1,900 mW/cm² at a line speed of 2 m/min. The UV energy at that time was 2.7 J/cm². This operation was carried out 16 times by turning over the glass surface. The temperature of the glass surface after the ultraviolet irradiation was 60° C. The total UV energy was 43.2 J/cm². After completion of the ultraviolet irradiation, the glass plates were removed, and the product was heated at 190° C. for 1 hour in a vacuum oven to obtain a good cellulose fiber composite having a thickness of 103 μm. The physical properties are presented in Table 1.

Example 4

The acetylated cellulose nonwoven fabric obtained in Preparation Example 4 was impregnated with a mixed liquid comprising 100 parts by weight of hydrogenated bisphenol type epoxy resin YX8000 (manufactured by JER) being a thermosetting resin precursor and 5 parts by weight of a curing agent CP-77 (manufactured by ADEKA) and left to stand still overnight under reduced pressure. The impregnated nonwoven fabric was sandwiched between a pair of glass plates and left to stand still in an oven of 100° C. for 3 hours for thermosetting. After the curing, the glass plates were removed to obtain a good cellulose fiber composite having a thickness of 98 μm. The physical properties are presented in Table 1.

Example 5

A good cellulose fiber composite having a thickness of 105 μm was obtained in the same manner as in Example 1 except that the cellulose nonwoven fabric obtained in Preparation Example 3 was used instead of the acetylated cellulose nonwoven fabric obtained in Example 4. The physical properties are presented in Table 1.

Example 6

A cellulose dispersion was prepared by the method disclosed in Preparation Example 2 except that the number of ultrahigh pressure homogenizer treatment was changed to five times. This dispersion was subjected to ultrasonic treatment by using ultrasonic homogenizer UH-600S manufactured by SMT (frequency: 20 kHz, effective power density: 22 W/cm²). With respect to the conditions for the ultrasonic treatment, using straight type chip (made of a titanium alloy) of 36 mmφ, tuning was carried out by an output volume 8, and ultrasonic treatment was carried out by a 50% intermittent operation for 60 minutes at the optimum tuning position. Here, the 50% intermittent operation is an operation wherein ultrasonic waves are applied for 0.5 second, followed by pausing for 0.5 second.

The cellulose dispersion was cooled from the exterior of the treatment container with cool water of 5° C., and the treatment was carried out while the temperature of the dispersion was maintained to be 15° C.±5° C. Further, the treatment was carried out with stirring by a magnetic stirrer. The cellulose concentration of the cellulose dispersion after the treatment was diluted to 0.355 wt %. This cellulose dispersion had a steady shear viscosity of 8.6 mPa·s at a shear rate of 10 s⁻¹.

Thereafter, centrifugal separation treatment was carried out by using a centrifugal separator (himac CR22G) manufactured by Hitachi Koki Co., Ltd. and using R20A2 as an angle rotor. Eight centrifuging tubes of 50 ml were set at an angle of 34° from the axis of rotation. The amount of the cellulose dispersion to be put in one centrifuging tube was 30 ml. The centrifugal separation operation was carried out at 18,000 rpm for 10 minutes. At that time, the centrifugal force by the rotor was calculated to be 38,900 G. The average fiber diameter of cellulose contained in the supernatant dispersion having the precipitate removed was 10 nm by TEM observation. A TEM photograph of the dispersion after the ultrasonic treatment is shown in FIG. 1. The residual ratio of cellulose contained in the supernatant was 98%.

The cellulose in this dispersion was confirmed to have a cellulose type I crystal structure from the wide angle X-ray diffraction image.

Figure 5:
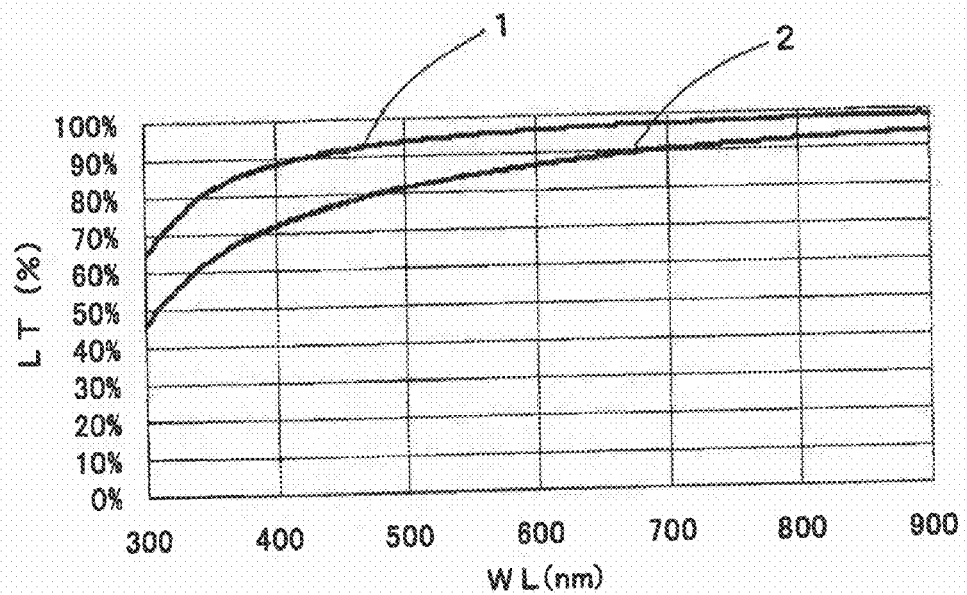
FIG. 5 is a chart showing the light transmittances of the cellulose dispersions used for the production of cellulose nonwoven fabrics in Example 6 (1 in the Fig.) and Example 15 (2 in the Fig.). The abscissa represents the wavelength (WL), and the ordinate represents the light transmittance (LT).

Further, the visible light transmittance of this dispersion was measured whereby it was 98% at 800 nm, 95% at 550 nm and 88% at 400 nm. A chart of such a light transmittance is shown in FIG. 5.

This cellulose dispersion was sheeted by the method of Preparation Example 3 to form a cellulose nonwoven fabric, the surface of which was observed by SEM, whereby nano fiber cellulose having an average fiber diameter of 10 nm was observed.

Further, this cellulose nonwoven fabric had a thickness of 66 μm, and the porosity was calculated by the above-mentioned formula and found to be 58 vol %.

Figure 2:
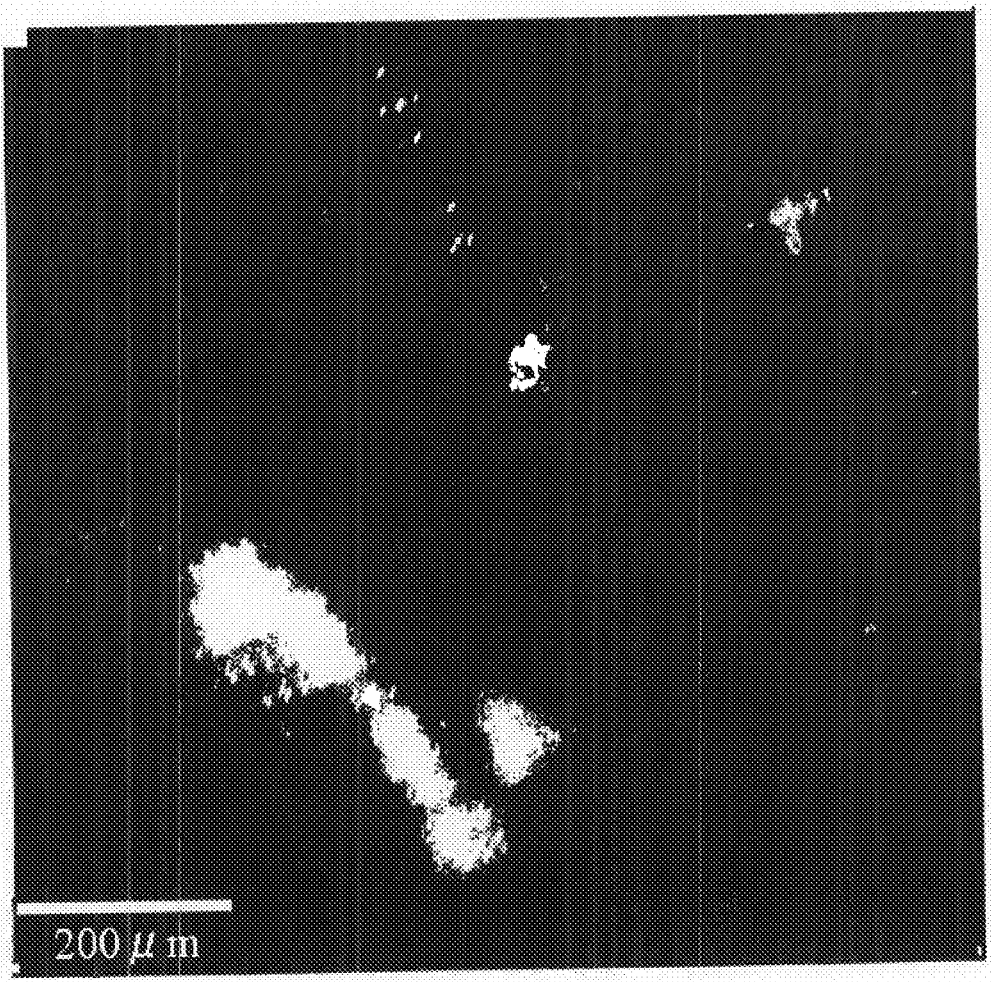
FIG. 2 is a photograph of the cellulose nonwoven fabric as impregnated with an oil, obtained in Example 6.

This cellulose nonwoven fabric was immersed in an oil to ascertain the presence of thick fibers, whereby fibers of 400 nm or more were not observed at all. A photograph taken at that time is shown in FIG. 2. This cellulose nonwoven fabric was impregnated with a photocurable resin composition liquid by the method disclosed in Example 1 and photocured by the method disclosed in Example 1 to prepare a composite. The cellulose content in the obtained composite was 46 wt %, and the thickness was 75 μm.

The haze of this composite was measured by the above-described method and found to be 0.97%. Further, the total light transmittance was 90%, the parallel light transmittance was 89% and the coefficient of linear thermal expansion was 17 ppm/K. The glass transition temperature (Tg) was 190° C., as obtained from tan δ.

Example 7

The cellulose dispersion prepared by the method disclosed in Preparation Example 1 was used, and this dispersion was adjusted to a cellulose concentration of 0.1 wt % and then subjected to ultrasonic treatment for 4 hours by the method disclosed in Example 6.

This cellulose dispersion had a steady shear viscosity of 16 mPa·s at a shear rate of 10 s$^{-1}$.

Thereafter, centrifugal separation treatment was carried out by using a centrifugal separator (himac CR22G) manufactured by Hitachi Koki Co., Ltd. and using R20A2 as an angle rotator. Eight centrifuging tubes of 50 ml were set at an angle of 34° from the axis of rotation. The amount of the cellulose dispersion to be put in one centrifuging tube was 30 ml. The centrifugal separation operation was carried out at 18,000 rpm for 10 minutes. At that time, the centrifugal force by the rotor was calculated to be 38,900 G. The average fiber diameter of cellulose contained in the supernatant dispersion having the precipitate removed, was 20 nm by SEM observation. The residual ratio of cellulose contained in the supernatant was 92%.

The cellulose in this cellulose dispersion was confirmed to have a cellulose type I crystal structure from the wide angle X-ray diffraction image. Further, the visible light transmittance of this dispersion was measured and found to be 98% at 800 nm, 96% at 550 nm and 92% at 400 nm.

Using this cellulose dispersion, a cellulose nonwoven fabric was prepared in the same manner as the method disclosed in Preparation Example 3. The obtained cellulose nonwoven fabric had a thickness of 47 μm and a porosity of 46 vol %.

This nonwoven fabric was impregnated with a photocurable resin composition liquid by the method disclosed in Example 1 and photocured by the method disclosed in Example 1 to prepare a composite. The cellulose content in the obtained composite was 60 wt %, and the thickness was 58 μm. The haze of this composite was 4.0, the total light transmittance was 73%, the parallel light transmittance was 70%, and the coefficient of linear thermal expansion was 15 ppm/K.

Example 8

A process of dispersing the cellulose dispersion obtained in Preparation Example 1 in acetic acid, followed by filtration, was carried out three times to replace water by acetic acid. Per 1 g of the cellulose, 50 ml of toluene, 40 ml of acetic acid and 0.2 ml of a 60% perchloric acid aqueous solution were mixed, and the cellulose substituted with acetic acid was added thereto. Then, 1 ml of acetic anhydride was added, and an acetylation reaction was carried out with stirring for 1 hour. After the reaction, the reaction liquid was filtered, followed by washing with methanol and demineralized water in this order. This cellulose was formed into a 0.5 wt % aqueous suspension, and by using a millstone type grinder SUPER-MASSCOLLOIDER MKCA6-2 manufactured MASUKO SANGYO CO., LTD. and using a millstone of GC6-80, an operation of introducing the suspension from an inlet with a gap distance of 80 μm at a rotational speed of 1,500 rpm, was carried out twice. Further, it was passed through an ultrahigh pressure homogenizer (Ultimaizer System manufactured by Sugino Machine Ltd.) under 150 MPa twice and under 245 MPa ten times. This cellulose dispersion was diluted to a cellulose concentration of 0.25 wt % and then subjected to ultrasonic treatment by using ultrasonic homogenizer UH-600S (frequency: 20 kHz, effective power density: 22 W/cm$^2$) manufactured by SMT. Using straight type chip (made of a titanium alloy) of 36 mmφ, tuning was carried out with an output volume 8, and ultrasonic treatment was carried out by a 50% intermittent operation for 60 minutes at the optimum tuning position. The 50% intermittent operation means an operation wherein ultrasonic waves are applied for 0.5 second, followed by pausing for 0.5 second.

The cellulose dispersion was cooled from the exterior of the treatment container with cool water of 5° C., and treatment was carried out while the temperature of the dispersion was maintained at 15° C.±5° C. Further, the treatment was carried out with stirring by a magnetic stirrer.

This cellulose dispersion was further diluted to 0.13 wt %, followed by centrifugal separation. As the centrifugal separator, himac CR22G manufactured by Hitachi Koki Co., Ltd. was used, and R20A2 was used as an angle rotor. Eight centrifuging tubes of 50 ml were set at an angle of 34° from the axis of rotation. The amount of the cellulose dispersion to be put in one centrifuging tube was 30 ml. The centrifugal separation operation was carried out at 18,000 rpm for 30 minutes, and the supernatant was collected.

This cellulose dispersion was sheeted by the method in Preparation Example 3 to obtain a white acetylated cellulose nonwoven fabric. This nonwoven fabric had a thickness of 44 μm and a chemical modification ratio of 9.0 mol %. Further, the porosity was 46 vol %.

This nonwoven fabric was impregnated with a photocurable resin composition liquid by the method disclosed in Example 1 and photocured by the method disclosed in Example 1 to prepare a composite. The cellulose content in the obtained composite was 38 wt %, and the thickness was 82 μm. The haze of this composite was 0.34, the total light transmittance was 91%, the parallel light transmittance was 90%, and the coefficient of linear thermal expansion was 23 ppm/K.

Example 9

The cellulose dispersion obtained in Preparation Example 2 was diluted with water to 0.2 wt %, and 100 g thereof was put into a filter having a diameter of 90 mm using PTFE having a pore diameter of 1 μm. When the solid content became about 5 wt %, 2-propanol was put for substitution. Press drying was carried out at 120° C. under 0.15 MPa for 5 minutes to obtain a cellulose nonwoven fabric.

This cellulose nonwoven fabric was impregnated with 100 ml of acetic anhydride and heated at 100° C. for 7 hours. Then, it was thoroughly washed with distilled water and finally immersed in 2-propanol for 10 minutes, followed by press-drying at 120° C. under 0.15 MPa for 5 minutes to obtain an acetylated cellulose nonwoven fabric of 62 μm. The chemical modification ratio of this nonwoven fabric was 33 mol %. Further, the porosity was 56 vol %.

50 Parts by weight of an oxetane resin OXT-211 (manufactured by TOAGOSEI CO., LTD.), 40 parts by weight of OXT-221 (manufactured by TOAGOSEI CO., LTD.), 10 parts by weight of hydrogenated bisphenol type epoxy resin YX8000 (manufactured by JER) and 5 parts by weight of a curing agent SP170 (manufactured by ADEKA) were thoroughly mixed at 60° C. to prepare a composition. To this mixed liquid, the above acetylated cellulose nonwoven fabric was immersed. The composition-impregnated nonwoven fabric was sandwiched between an pair of glass plates via a silicone rubber spacer having a thickness of 0.1 mm and passed under an electrodeless mercury lamp ("bulb D" manufactured by Fusion UV Systems K.K.) at an illuminance of 400 mW/cm$^2$ at a line speed of 2 m/min. The UV energy was 0.43 J/cm$^2$. The irradiated glass surface was turned over, and this operation was repeated twice. Then, at an illuminance of 1,900 mW/cm$^2$ at a line speed of 2 m/min, irradiation was carried out six times in the same manner as above by turning over the glass surface for every irradiation. The temperature of the glass surface after the ultraviolet irradiation was 44° C. The total UV energy was 17.5 J/cm$^2$. After completion of the ultraviolet irradiation, the glass plate were removed, followed by heating at 190° C. for 1 hour in a vacuum oven to obtain a composite.

Here, the illuminance of ultraviolet rays of from 320 to 390 nm was measured at 23° C. by ultraviolet illuminometer "UV-M02" manufactured by ORC Manufacturing Co., Ltd. using an attachment "UV-35".

The coefficient of linear thermal expansion of this sample was measured by the above-mentioned method and found to be as low as 12 ppm/K. Further, the total light transmittance was measured by the above-mentioned method and found to be 90%, and thus sufficient transparency was obtained. The results are shown in Table 1. A good composite sheet was obtained with the surface free from wrinkles.

Example 10

A cellulose fiber composite was prepared by the method disclosed in Example 9 except that 20 parts by weight of an oxetane resin OXT-211 (manufactured by TOAGOSEI CO., LTD.), 80 parts by weight of bisphenol type epoxy resin 828EL (manufactured by JER) and 5 parts by weight of a curing agent SP170 (manufactured by ADEKA) were thoroughly mixed at 60° C. to prepare a composition. The results are shown in Table 1. Good results were obtained.

Example 11

A cellulose fiber composite was prepared by the method disclosed in Example 9 except that 50 parts by weight of an oxetane resin OXT-221 (manufactured by TOAGOSEI CO., LTD.), 40 parts by weight of an oxetane resin ETERNACOL-LOXBP (manufactured by UBE INDUSTRIES, LTD.), 10 parts by weight of bisphenol type epoxy resin 828EL (manufactured by JER) and 5 parts by weight of a curing agent SP170 (manufactured by ADEKA) were thoroughly mixed at 60° C. to prepare a composition. The results are shown in Table 1. Good results were obtained.

Example 12

A cellulose fiber composite was prepared by the method disclosed in Example 9 except that 50 parts by weight of an oxetane resin OXT-211 (manufactured by TOAGOSEI CO., LTD.), 40 parts by weight of OXT-221 (manufactured by TOAGOSEI CO., LTD.), 10 parts by weight of an epoxy resin KL-613 (manufactured by KURARAY CO., LTD.) and 1 part by weight of a curing agent SP170 (manufactured by ADEKA) were thoroughly mixed at 60° C. to prepare a composition. The results are shown in Table 1. Good results were obtained.

Example 13

The cellulose dispersion obtained in Preparation Example 1 was adjusted to a cellulose concentration of 0.5 wt %, and by using a high pressure homogenizer manufactured by GAULIN, treatment was carried out 20 times under a jetting pressure of 35 MPa. The average fiber diameter of cellulose fibers in the dispersion was 5 μm. The ultrasonic treatment of Example 6 was carried out for 60 minutes. The average fiber diameter of cellulose in the dispersion was 10 nm by the TEM observation. The cellulose in this cellulose dispersion was confirmed to have a cellulose type I crystal structure from the wide angle X-ray diffraction image.

The cellulose concentration in the cellulose dispersion after the treatment was diluted to 0.125 wt %. This cellulose dispersion had a steady shear viscosity of 32 mPa·s at a shear rate of 10 s$^{-1}$. Further, centrifugal separation was carried out 18,000 rpm (38,900 G), whereby the residual ratio of cellulose contained in the supernatant was 90%.

Further, the visible light transmittance of this dispersion was measured and found to be 99% at 800 nm, 99% at 550 nm and 96% at 400 nm.

This cellulose dispersion was sheeted by the method of Preparation Example 3 to form a cellulose nonwoven fabric, the surface of which was observed by SEM, whereby nanofiber cellulose having an average fiber diameter of 10 nm was observed. The thickness of the obtained cellulose nonwoven fabric was 37 μm, and the porosity was 60 vol %.

This cellulose nonwoven fabric was impregnated with a photocurable resin composition by the method of Example 1 and photocured by the method disclosed in Example 1 to prepare a composite. The cellulose content in the obtained composite was 42 wt %, and the thickness was 44 μm. The haze of this composite was 0.81%, and the total light transmittance was 93%. The parallel light transmittance was 92%, and the coefficient of linear thermal expansion was 20 ppm/K.

Example 14

Using a millstone type grinder SUPERMASSCOLLOIDER MKCA6-2 manufactured MASUKO SANGYO CO., LTD. and using a millstone of GC6-80, the raw material dispersion obtained in Preparation Example 1 and adjusted to a cellulose concentration of 0.5 wt %, was introduced in an amount of 1 liter from the raw material inlet by adjusting a gap distance to be 80 μm at a rotational speed of 1,500 rpm. The treated cellulose dispersion passed through the grinder, was again introduced into the raw material inlet, and the dispersion was passed through the grinder in a total of ten times. The cellulose dispersion after such treatment will hereinafter be referred to as "grinder-treated cellulose dispersion".

Here, during this microfibrillating treatment, the cellulose was always maintained in a state wet with water at a solvent content (water content) of at least 90 wt % without being completely dried.

Using the obtained grinder-treated cellulose dispersion (average fiber diameter of cellulose fibers in the dispersion: 500 nm, cellulose concentration: 0.534 wt %), ultrasonic treatment was carried out in the same manner as the method disclosed in Example 6 except that ultrasonic irradiation treatment time was changed to 60 minutes. The average fiber diameter of cellulose in this cellulose dispersion was 10 nm by the TEM observation. Further, the cellulose in this dispersion was confirmed to have a cellulose type I crystal structure from the wide angle X-ray diffraction image.

The cellulose concentration of the cellulose dispersion after the treatment was diluted to 0.125 wt %. This cellulose dispersion had a steady shear viscosity of 50 mPa·s at a shear rate of $10\ s^{-1}$. Further, centrifugal separation was carried out at 18,000 rpm (38,900 G), whereby the residual ratio of cellulose contained in the supernatant was 88%.

Further, the visible light transmittance of this dispersion was measured and found to be 95% at 800 nm, 92% at 550 nm and 88% at 400 nm.

Using the cellulose dispersion, a cellulose nonwoven fabric was prepared by the method disclosed in Preparation Example 3. The obtained cellulose nonwoven fabric had a thickness of 50 μm and a porosity of 48 vol %.

This nonwoven fabric was impregnated with a photocurable resin by the method disclosed in Example 1 to prepare a composite. The cellulose content in the obtained composite was 65 wt %, and the thickness was 54 μm. The haze of this composite was 2.0%, the total light transmittance was 76%, and the coefficient of linear thermal expansion was 13 ppm/K.

Example 15

Figure 3:
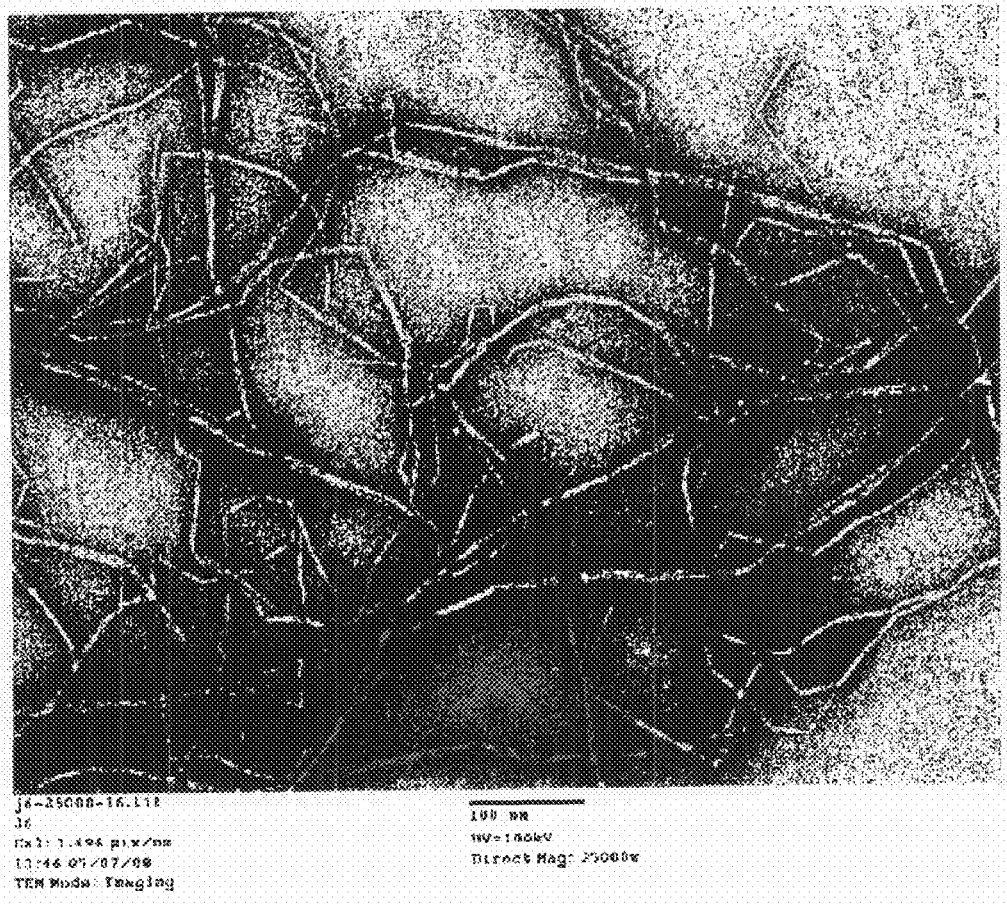
FIG. 3 is a TEM photograph (25,000 magnifications) of the cellulose dispersion (10) treated by a high pressure homogenizer, used in Example 15.

The average fiber diameter of cellulose in the high pressure homogenizer-treated cellulose dispersion obtained in Preparation Example 2 was 15 nm by the TEM observation. This TEM photograph is shown in FIG. 3. Further, the cellulose in this dispersion was confirmed to have a cellulose type I crystal structure by the wide angle X-ray diffraction image.

This cellulose dispersion was diluted to a cellulose concentration of 0.301 wt %. This cellulose dispersion had a steady shear viscosity of 17 mPa·s at a shear rate of $10\ s^{-1}$. Further, centrifugal separation was carried out at 18,000 rpm (38,900 G), whereby the residual ratio of cellulose contained in the supernatant was 57%.

Further, the visible light transmittance of this dispersion was measured and found to be 93% at 800 nm, 84% at 550 nm and 72% at 400 nm. A chart of this light transmittance is shown in FIG. 5.

Using this cellulose dispersion, a cellulose nonwoven fabric was prepared by the method disclosed in Preparation Example 3.

Figure 4:
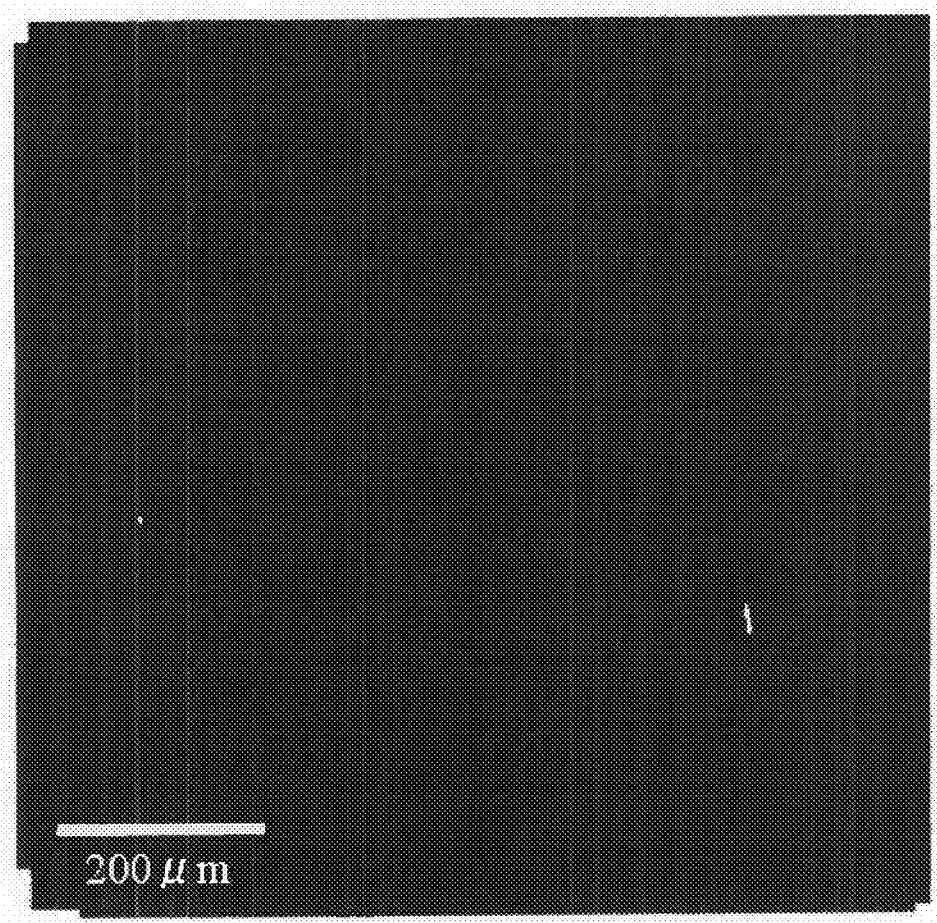
FIG. 4 is a photograph of the cellulose nonwoven fabric as impregnated with an oil, obtained in Example 15.

The obtained cellulose nonwoven fabric had a thickness of 63 μm and a porosity of 59 vol %. This cellulose nonwoven fabric was impregnated with an oil to ascertain the presence of thick fibers, whereby a few fibers having a diameter of 400 nm or more were observed. The photograph at that time is shown in FIG. 4.

This nonwoven fabric was impregnated with a photocurable resin by the method disclosed in Example 1 to prepare a composite. The cellulose content in the obtained composite was 52 wt %, and the thickness was 75 μm. The haze of this composite was 1.3%, the total light transmittance was 91%, the parallel light transmittance was 90%, and the coefficient of linear thermal expansion was 18 ppm/K.

Example 16

A cellulose nonwoven fabric was obtained in the same manner as in Example 6 except that 2-propanol was not added at the time of the filtration by the PTFE membrane filter in the production of the cellulose nonwoven fabric.

This cellulose nonwoven fabric had a thickness of 33 μm, a porosity of 6 vol % and a haze of 18% in a thickness of 50 μm. This cellulose nonwoven fabric was a transparent sheet having a low haze value in spite of the fact that it is a sheet formed solely by cellulose fibers.

Example 17

A cellulose nonwoven fabric was obtained in the same manner as in Example 15 except that 2-propanol was not added at the time of the filtration by the PTFE membrane filter in the production of the cellulose nonwoven fabric.

This cellulose nonwoven fabric had a thickness of 35 μm, a porosity of 25 vol % and a haze of 48% in a thickness of 50 μm. This cellulose nonwoven fabric was a transparent sheet having a low haze value in spite of the fact that it is a sheet formed solely by cellulose fibers.

Example 18

A cellulose dispersion was prepared by the method disclosed in Preparation Example 2 except that the number of ultrahigh pressure homogenizer treatment was changed to five times. This dispersion was adjusted to a cellulose concentration of 0.5 wt % and continuously irradiated with ultrasonic waves for 60 minutes while being circulated at a rate of 3 liters/min in a total amount of 5 liters to an apparatus having two UIP2000 manufactured by Nihon SiberHegner (frequency: 20 kHz, effective power density: 90 W/cm$^2$, horn tip made of titanium alloy and having a diameter of 50 mmφ) connected in series. At that time, the dispersion was cooled from the exterior of the piping and the ultrasonic treatment container with water of 6° C.

This dispersion was diluted to 0.447 wt %, and the steady shear viscosity was 10 mPa·s as measured at a shear rate of $10\ s^{-1}$. Centrifugal separation was carried out at 18,000 rpm for 10 minutes by the method disclosed in Example 6 by using the centrifugal separator manufactured by Hitachi Koki Co., Ltd. and using angle rotor R20A2. The residual ratio of cellulose contained in the supernatant was 90%. The cellulose in this dispersion was confirmed to have a cellulose type I crystal structure from the wide angle X-diffraction image.

The dispersion after the ultrasonic treatment was subjected to centrifugal separation continuously by using the centrifugal separator (himac CR22G) manufactured by Hitachi Koki Co., Ltd. and changing the angle rotor to R18c, by supplying the dispersion at a rate of 100 ml per minute. The rotational speed of the rotor was 18,000 rpm.

This cellulose dispersion was sheeted by the method of Preparation Example 3. The average fiber diameter was 10 nm.

This cellulose nonwoven fabric had a thickness of 60 μm and a porosity of 47.0 wt %.

This nonwoven fabric was impregnated with a photocurable resin composition liquid by the method disclosed in Example 1 and photocured by the method disclosed in Example 1 to obtain a composite. The cellulose content in the obtained composite was 35 wt %, and the thickness was 100

µm. The haze of this composite was 1.1, the total light transmittance was 90%, the parallel light transmittance was 89%, and the coefficient of linear thermal expansion was 19 ppm/K.

Comparative Example 1

A cellulose fiber composite having a thickness of 92 µm was obtained by the same method as in Example 1 except that the acetylated cellulose nonwoven fabric obtained in Preparation Example 5 was used instead of the acetylated cellulose nonwoven fabric obtained in Preparation Example 4.

Comparative Example 2

A cellulose fiber composite having a thickness of 96 µm was obtained by the same method as in Example 1 except that the bacteria cellulose sheet obtained in Preparation Example 6 was used instead of the acetylated cellulose nonwoven fabric obtained in Preparation Example 4.

Comparative Example 3

In Example 1, without using the acetylated cellulose nonwoven fabric, only the photocurable resin was cured under the same condition to prepare a cured product of the resin alone having a thickness of 83 µm.

Comparative Example 4

A cellulose dispersion was prepared by the method disclosed in Preparation Example 2 except that the number of ultrahigh pressure homogenizer treatment was changed to once. This cellulose dispersion had a cellulose concentration of 0.487 wt %. The average fiber diameter of cellulose in this cellulose dispersion was 1 µm by the SEM observation. Further, the cellulose in this dispersion was confirmed to have a cellulose type I crystal structure from the wide angle X-ray diffraction image.

Using this cellulose dispersion, a cellulose nonwoven fabric was prepared by the method disclosed in Preparation Example 3. The obtained cellulose nonwoven fabric had a thickness of 77 µm and a porosity of 63 wt %.

This cellulose nonwoven fabric was impregnated with a photocurable resin composition liquid by the method disclosed in Example 1 and photocured by the method disclosed in Example 1 to prepare a composite. The cellulose content in the obtained composite was 42 wt %, and the thickness was 83 µm. The haze of this composite was 38, and the total light transmittance was 88%.

Comparative Example 5

A cellulose dispersion was prepared by the method disclosed in Preparation Example 1. The cellulose concentration at that time was 0.484 wt %. This cellulose dispersion was non-uniform, and the cellulose underwent sedimentation by its own weight. The average fiber diameter of cellulose in this cellulose dispersion was 130 µm by the SEM observation. Further, the cellulose in this dispersion was confirmed to have a cellulose type I crystal structure from the wide angle X-ray diffraction image.

Using this cellulose dispersion, a cellulose nonwoven fabric was prepared by the method disclosed in Preparation Example 3. This cellulose nonwoven fabric was very brittle, and sheeting irregularities were substantial.

The physical properties of the cellulose fiber composites obtained in Examples 1 to 15 and 18 and Comparative Examples 1, 2, 4 and 5, and the resin cured product obtained in Comparative Example, are summarized in Table 1. In Table 1, the cellulose fiber content in each cellulose fiber composite is also presented.

Further, each of the cellulose fiber composites obtained in Examples 1 to 15 and 18 and Comparative Examples 1, 2, 4 and 5 was one wherein a resin was filled in void space portions of the nonwoven fabric employed, and the porosity of the nonwoven fabric and the volume proportion of the resin-filled portions in the cellulose fiber composite were substantially equal.

TABLE 1

| | Physical properties, etc. of cellulose nonwoven fabric | | | Physical properties, etc. of cellulose fiber composite or resin cured product | | | | | | | | | | |
|---|---|---|---|---|---|---|---|---|---|---|---|---|---|---|
| | Chemical modification ratio (mol %) | Porosity (vol %) | Thickness (µm) | Cellulose content (wt %) | Thickness (µm) | Haze (%) | Average fiber diameter (nm) | Total light transmittance (%) | Parallel light transmittance (%) | Coefficient of linear thermal expansion (ppm/K) | YI value | Water absorption (%) | Tensile modulus of elasticity (GPa) | Glass transition temp. (° C.) |
| Ex. 1 | 33 | 56 | 62 | 40 | 96 | 1.8 | 15 | 90 | 88 | 18 | 5.4 | 0.6 | 8.1 | 190 |
| Ex. 2 | 33 | 56 | 62 | 42 | 106 | 2.2 | 15 | 89 | 87 | 15 | 6.8 | 0.8 | — | — |
| Ex. 3 | 33 | 56 | 62 | 39 | 103 | 2.5 | 15 | 88 | 86 | 20 | 6.1 | 0.7 | — | — |
| Ex. 4 | 33 | 56 | 62 | 40 | 98 | 2.1 | 15 | 89 | 87 | 17 | 8.2 | 0.6 | — | — |
| Ex. 5 | 0 | 46 | 62 | 44 | 105 | 2.3 | 15 | 88 | 86 | 18 | 31.4 | 0.8 | — | 190 |
| Ex. 6 | 0 | 58 | 66 | 46 | 75 | 0.97 | 10 | 90 | 89 | 17 | 54.2 | 0.8 | — | 190 |
| Ex. 7 | 0 | 46 | 47 | 60 | 58 | 4 | 20 | 73 | 70 | 15 | 62.7 | 0.8 | — | 190 |
| Ex. 8 | 9.0 | 46 | 44 | 38 | 82 | 0.34 | 10 | 91 | 90 | 23 | 8.7 | 0.6 | — | 190 |
| Ex. 9 | 33 | 56 | 62 | 57 | 100 | 1.7 | 14 | 90 | 89 | 12 | — | — | 6.5 | 80 |
| Ex. 10 | 33 | 56 | 62 | 55 | 100 | 2.5 | 14 | 89 | 87 | 15 | — | — | 6.5 | 113 |
| Ex. 11 | 33 | 56 | 62 | 60 | 100 | 1.8 | 14 | 91 | 89 | 20 | — | — | 6 | 140 |
| Ex. 12 | 33 | 56 | 62 | 58 | 100 | 4.8 | 14 | 89 | 85 | 18 | — | — | — | — |
| Ex. 13 | 0 | 60 | 37 | 42 | 44 | 0.81 | 10 | 93 | 92 | 20 | — | — | — | 190 |
| Ex. 14 | 0 | 48 | 50 | 65 | 54 | 2 | 10 | 76 | 74 | 13 | — | — | — | 190 |
| Ex. 15 | 0 | 59 | 63 | 52 | 75 | 1.3 | 15 | 91 | 90 | 18 | — | — | — | 190 |
| Ex. 16 | 0 | 6 | 50 | — | — | 18 | 10 | — | — | — | — | — | — | — |
| Ex. 17 | 0 | 25 | 35 | — | — | 48 | 15 | — | — | — | — | — | — | — |
| Ex. 18 | 0 | 47 | 60 | 35 | 100 | 1.1 | 10 | 90 | 89 | 19 | — | — | — | — |
| Comp. Ex. 1 | 7 | 28 | 38 | 38 | 92 | 30 | 15 | 76 | 53 | 16 | 38.2 | 0.7 | — | 190 |

TABLE 1-continued

| | Physical properties, etc. of cellulose nonwoven fabric | | | Physical properties, etc. of cellulose fiber composite or resin cured product | | | | | | | | | | |
|---|---|---|---|---|---|---|---|---|---|---|---|---|---|---|
| | Chemical modification ratio (mol %) | Porosity (vol %) | Thickness (μm) | Cellulose content (wt %) | Thickness (μm) | Haze (%) | Average fiber diameter (nm) | Total light transmittance (%) | Parallel light transmittance (%) | Coefficient of linear thermal expansion (ppm/K) | YI value | Water absorption (%) | Tensile modulus of elasticity (GPa) | Glass transition temp. (° C.) |
| Comp. Ex. 2 | 0 | 42 | 50 | 45 | 96 | 8.6 | 50 | 82 | 75 | 18 | 5.8 | 0.9 | — | 190 |
| Comp. Ex. 3 | — | — | — | 0 | 83 | 0.3 | — | 92 | 92 | 150 | 1.7 | 0.5 | — | 190 |
| Comp. Ex. 4 | 0 | 63 | 77 | 42 | 83 | 38 | 1,000 | 88 | 56 | — | — | — | — | 190 |
| Comp. Ex. 5 | 0 | — | — | — | — | — | 130,000 | — | — | — | — | — | — | — |

From Table 1, it is evident that the cellulose fiber composite of the present invention has high transparency, low water absorption and low coefficient of linear thermal expansion.

INDUSTRIAL APPLICABILITY

According to the present invention, a fiber composite having high transparency, low water absorption and low coefficient of linear thermal expansion is provided. The fiber composite of the present invention is useful as a plastic material to be substituted for glass in various industrial fields, and particularly, taking advantage of its excellent properties such as high transparency, low water absorption and low coefficient of linear thermal expansion, it is useful as a substrate material for various displays, a substrate for solar cells, a window material, etc.

The entire disclosures of Japanese Patent Application No. 2007-330490 filed on Dec. 21, 2007, Japanese Patent Application No. 2007-332326 filed on Dec. 25, 2007 and Japanese Patent Application No. 2008-126172 filed on May 13, 2008 including specifications, claims, drawings and summaries are incorporated herein by reference in their entireties.

The invention claimed is:

1. A fiber composite comprising:
   fibers having an average fiber diameter of at most 30 nm, and
   a matrix material,
   wherein said fiber composite has a haze of at most 5 according to JIS K 7136 when the fiber composite has a thickness of 100 μm, and
   wherein said fiber composite has a yellowness index of at most 20 according to JIS K7105 after the fiber composite, having a thickness of 100 μm, is heated at 190° C. under an oxygen partial pressure of at most 0.006 MPa for 1 hour.

2. The fiber composite according to claim 1, wherein the fibers are cellulose.

3. The fiber composite according to claim 1, wherein the fibers are chemically modified.

4. The fiber composite according to claim 1, which has a coefficient of linear thermal expansion of at least 1 ppm/K and at most 50 ppm/K.

5. The fiber composite according to claim 1, wherein the matrix material is a polymer material.

6. The fiber composite according to claim 1, which has a thickness of at least 10 μm and at most 10 cm.

7. A process for producing the fiber composite as defined in claim 1, comprising:
   microfibrillating fibers by an ultrahigh-pressure homogenizer to reduce the pressure by letting the fibers jet from a pressure of at least 100 MPa and/or by ultrasonic waves having a frequency of at least 15 kHz and at most 1 MHz and an effective power density of at least 1 W/cm², to obtain the fibers having an average fiber diameter of at most 30 nm; and
   combining the fibers having an average fiber diameter of at most 30 nm and the matrix material.

8. A substrate comprising the fiber composite as defined in claim 1.

9. A window material comprising the fiber composite as defined in claim 1.

10. A fiber composite comprising:
    fibers having an average fiber diameter of at most 30 nm, and
    a matrix material,
    wherein said fiber composite has a haze of at most 5 according to JIS K 7136 when the fiber composite has a thickness of 100 μm, and
    wherein said fiber composite has a water absorption of at most 1% according to JIS K7209 (method D) when the fiber composite has a thickness of 100 μm.

11. The fiber composite according to claim 10, which has a coefficient of linear thermal expansion of at least 1 ppm/K and at most 50 ppm/K.

12. The fiber composite according to claim 10, wherein the fibers are cellulose.

13. The fiber composite according to claim 10, wherein the fibers are chemically modified.

14. The fiber composite according to claim 10, wherein the matrix material is a polymer material.

15. The fiber composite according to claim 10, which has a thickness of at least 10 μm and at most 10 cm.

16. A process for producing the fiber composite as defined in claim 10, comprising:
    microfibrillating fibers by an ultrahigh-pressure homogenizer to reduce the pressure by letting the fibers jet from a pressure of at least 100 MPa and/or by ultrasonic waves having a frequency of at least 15 kHz and at most 1 MHz and an effective power density of at least 1 W/cm², to obtain the fibers having an average fiber diameter of at most 30 nm; and
    combining the fibers having an average fiber diameter of at most 30 nm and the matrix material.

17. A substrate comprising the fiber composite as defined in claim 10.

18. A window material comprising the fiber composite as defined in claim 10.

* * * * *